United States Patent Office 3,839,426
Patented Oct. 1, 1974

3,839,426
COMPOUNDS AND PREPARATION THEREOF
Patrick J. Jefferies, Erlanger, Ky., and Nathan N. Crounse, Cincinnati, Ohio, assignors to Sterling Drug Inc., New York, N.Y.
No Drawing. Continuation-in-part of application Ser. No. 777,884, Nov. 21, 1968, which is a continuation-in-part of application Ser. No. 551,868, May 23, 1966. This application July 1, 1970, Ser. No. 51,690
Int. Cl. C07c 103/18
U.S. Cl. 260—501.15      2 Claims

ABSTRACT OF THE DISCLOSURE

Water-soluble quaternary ammonium dyestuffs useful for coloring natural fibers, synthetic fiber-forming materials and cellulosic materials in shades of blue and turquoise are obtained by the interaction of N-(carboxylic-acylamino-lower-alkyl) tertiary amines with a phthalocyanine residue bearing from one to five halogenomethyl groups; and water-soluble reds, oranges and yellows are obtained by diazonium couplings between dyestuff residues and quaternary ammonium halides in which three of the substituents attached to the quaternary nitrogen atom are selected from the group consisting of lower-alkyl, lower-alkenyl, hydroxy-lower-alkyl and N-(carboxylic-acylamino-lower-alkyl) and, the fourth substituent either furnishes the diazotizable amino group or serves as the coupling agent. Removal of the acyl group in the N-(carboxylic-acylamino-lower-alkyl)substituent by hydrolysis produces additional dyestuffs having enhanced substantivity and shades close to those of their carboxylic-acylamino precursors.

---

This application is a continuation-in-part of our prior copending application Ser. No. 777,884, filed Nov. 21, 1968, and now abandoned, which in turn is a continuation-in-part of our now-abandoned application Ser. No. 551,-868, filed May 23, 1966.

This invention relates to cationic dyestuffs. More particularly, the present invention relates to novel water-soluble quaternary ammonium dyestuffs useful in the dyeing art, particularly for coloring natural fibers, synthetic fiber-forming material and cellulosic materials such as threads, sheets, fibers, filaments, textile fabrics and the like, as well as in the manufacture of paper, varnishes, inks, coatings, and plastics.

The dyestuffs of the instant invention are of the formula

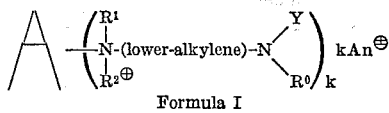

Formula I and of the formula

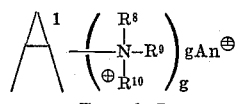

Formula Ia where in Formula I $R^0$ is hydrogen, lower-alkyl or hydroxy-lower-alkyl; $R^1$ is lower-alkyl, lower-alkenyl or hydroxy-lower-alkyl; $R^2$ is lower-alkyl, lower-alkenyl, hydroxy-lower-alkyl or -(lower-alkylene)-$NR^0Y$ or $R^1$ and $R^2$ together with the nitrogen atom, are pyrrolidine, piperidine or 4-lower-alkanoyl piperazine; Y is hydrogen or

wherein R is hydrogen, lower-alkyl, lower-alkenyl, phenyl or phenyl-lower-alkyl; An is an anion; A is a member selected from the group consisting of (1) a phthalocyanine dyestuff residue attached to the quaternary ammonium nitrogen atom through a methylene bridge or (2) an aromatic azo dyestuff residue attached to the quaternary ammonium nitrogen atom through a lower-alkylene bridge; and k is a small integer whose value is dependent on the nature of A such that it has a range from one to two when A is (2) an aromatic azo dyestuff residue as described above and a range from one to five when A is (1) a phthalocyanine residue as described above.

In Formula Ia, $R^8$ is lower-alkyl, lower-alkenyl or hydroxy-lower-alkyl; $R^9$ is lower-alkyl or hydroxy-lower-alkyl; $R^{10}$ is lower-alkyl or lower-alkenyl; $A^1$ is an aromatic azo dyestuff residue attached to the quaternary ammonium nitrogen atom through a lower-alkylene bridge; and g is a small integer whose value is dependent on the nature of $A^1$ such that it has a range from one to two.

The terms "lower-alkyl," "lower-alkenyl," and "lower-alkylene" have the same respective meanings as hereinafter given.

(1) THE PHTHALOCYANINE DYESTUFFS

In the first of its composition of matter aspects, the invention sought to be patented resides in the concept of the novel water-soluble quaternary ammonium phthalocyanine compounds having the formula

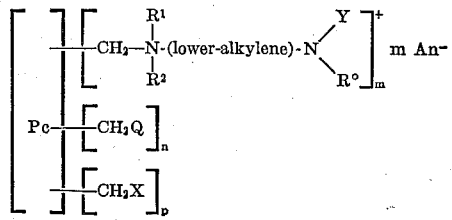

Formula II wherein m is an integer from one to five, n is an integer from zero to two, and p is an integer from zero to four, wherein $m+n+p$ does not exceed 5; Pc is a phthalocyanine residue; Q is hydroxy, lower-alkoxy, hydroxy-lower-alkoxy, phenoxy, amino or hydrazino; $R^0$ is hydrogen, lower-alkyl or hydroxy-lower-alkyl; $R^1$ is lower-alkyl, lower alkenyl or hydroxy-lower-alkyl; $R^2$ is lower-alkyl, lower-alkenyl, hydroxy-lower-alkyl or -(lower-alkylene)-$NR^0Y$ or $R^1$ and $R^2$ together with the nitrogen atom are pyrrolidino, piperidine or 4-lower-alkanoyl piperazino; Y is hydrogen or

wherein R is hydrogen, lower-alkyl, lower-alkenyl, phenyl or phenyl-lower-alkyl; An is an anion; and X is halogen, i.e., chlorine, bromine, iodine or fluorine, preferably chlorine or bromine.

A particular embodiment in accordance with this aspect of the invention comprises the water-soluble dyestuffs characterized by the presence in the molecule of from one to five N-(carboxylic-acylamino-lower-alkyl)-quaternary ammonium radicals in which the quaternary ammonium nitrogen atoms are each attached to a phthalocyanine residue through a methylene bridge. This embodiment of the invention is illustrated graphically by Formula III

FORMULA III wherein Pc is a phthalocyanine residue, m is an integer of from one to five, and An, R, $R^0$, $R^1$, and $R^2$ each have the same respective meanings indicated in relation to Formula II.

As used throughout, the term "lower-alkyl" is a saturated straight- or branched-chain aliphatic radical of from one to six carbon atoms. Lower-alkyl radicals are represented by, for example, methyl, ethyl, propyl, isopropyl, butyl, tert.-butyl, isobutyl, amyl, isoamyl, hexyl and the like.

As used herein, the term "An" represents Anion. By Anion is meant any monovalent ion derived from an organic or inorganic acid, H Anion, by the removal of an acidic hydrogen ion. Exemplary anions are, halide, hydroxy, alkanoate, nitrate, phosphate, alkylsulfonate and arylsulfonate. Other monovalent anions are found in the literature for example, Hackh's Chemical Dictionary, 3rd Edition (1946), at pages 12–13, and Chemical Abstracts, vol. 56, Nomenclature, at pages 72n–80n, both incorporated herein by specific reference thereto. As is known, one anion can be changed to another anion by use of conventional ion exchange methods. The halides, i.e. chloride, bromide, fluoride and iodide and in particular chloride and bromide are particularly preferred as the anion for the dyestuffs of this invention because of the generally ready availability of the quaternizing agents containing them. However, the scope of the compounds herein described and claimed is in no way to be thereto restricted.

As used throughout, the term "lower-alkoxy" means an alkoxy radical in which the aliphatic portion is a saturated straight- or branched-chain of from one to four carbon atoms. Lower-alkoxy radicals are presented by, for example, methoxy, ethoxy, propoxy, butoxy, isopropoxy, tert.-butoxy and the like.

As used throughout, the term "lower-alkenyl" is a straight- or branched-chain aliphatic radical of from two to six carbon atoms containing at least one carbon-to-carbon double bond. Lower-alkenyl radicals are represented by, for example, vinyl, allyl, methallyl, 2-butenyl, 2,4-pentadienyl, 3-hexenyl, and the like.

As used throughout, the term "(lower-alkylene)" means a divalent, saturated straight- or branched-chain aliphatic radical of from two to six carbon atoms having valence bonds attached to different carbon atoms. Thus, radicals represented by the term "(lower-alkylene)" are, for example, —CH₂—CH₂, —CH₂—CH₂—CH₂—,

—(CH₂)₄—,

—(CH₂)₅—, —(CH₂)₆—, —CH(CH₃)CH₂—,

—CH₂CH₂CH(CH₃)—CH₂—,

—CH₂—CH₂—CH(C₂H₅)—CH₂—, and the like.

The benzene ring of phenyl can bear substituents of the kind commonly employed in the phthalocyanine art. The presence of such substituents does not ordinarily affect adversely the properties of the resulting dyestuffs, and such substituted compositions are the full equivalents of the compositions claimed herein.

As used throughout, the term "carboxylic-acyl" is a radical derived by the removal of the hydroxy radical from a carboxylic acid. The carboxylic-acyl groups,

(shown alternatively herein as —COR) are represented by lower-alkanoyl, wherein R is lower-alkyl; lower-alkenoyl, wherein R is lower-alkenyl; benzoyl, wherein R is phenyl, which may be substituted on the benzene ring thereof without deleterious effects; and phenyl-lower alkanoyl, wherein R is phenyl-lower-alkyl. Examples of carboxylic-acyl groups include, for example, formyl, acetyl, propionyl, isobutyryl, acrylyl, methacrylyl, benzoyl, p-toluoyl, p-nitrobenzoyl, o-chlorobenzoyl, phthaloyl, phenylacetyl, p-methoxyphenylacetyl, and the like.

The term "Pc," defined as a phthalocyanine residue, represents a phthalocyanine from which m hydrogen atoms have been removed. The term "phthalocyanine" is used herein in the generic sense to mean the class of tetra-azaporphins in which each of four pyrrole nuclei is fused to an aromatic nucleus, e.g. that of benzene. Phthalocyanine itself (tetrabenzotetraazaporphin) is a well-known example of the class, but the usefulness of this invention is not limited thereto. Moreover, the phthalocyanine residue, Pc, can be metal-free, or it can contain a metal in complex combination, for example, copper, cobalt, nickel, iron, zinc and the like. In addition the phthalocyanine residue can be substituted with substituents known in the art to modify the shade and other physical characteristics of the phthalocyanines in general. Examples of such substituents include chloro, bromo, sulfonic acid, phenyl, benzoyl and methyl.

The "halogenomethyl" group in the starting material is represented by —CH₂F, —CH₂Cl, —CH₂Br and —CH₂I. Because they are much cheaper to prepare, we prefer to use as the starting material chloromethyl-substituted phthalocyanines which are conveniently prepared by methods known to the art.

As used throughout, the term "halogen" includes bromine, chlorine, iodine and fluorine.

A preferred embodiment in accordance with the phthalocyanine composition aspect of this invention comprises the highly water-soluble phthalocyanine dyestuffs, characterized by the presence in the molecule of from one to five N-(amino-lower-alkyl) quaternary ammonium radicals in which the quaternary ammonium nitrogen atoms are each attached to a phthalocyanine radical through a methylene bridge. These dyestuffs are preferred because of their high substantivity to various fibers and in particular to cellulosic materials. This embodiment of the invention is illustrated graphically by Formula IV

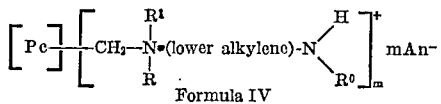

Formula IV wherein Pc, R⁰, R¹, R², m, An and (lower-alkylene) are as defined above in relation to Formula III.

Another particular embodiment in accordance with the phthalocyanine composition aspect of this invention comprises the water-soluble phthalocyanine dyestuffs characterized by the presence in the molecule of from one to five 4-(carboxylic-acyl)-piperazinium radicals. The dyestuffs according to this embodiment of the invention are illustrated graphically by Formula V

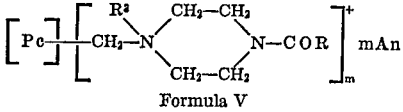

Formula V wherein Pc, R, m, and An are each as defined above and R³ is a member of the class consisting of lower-alkyl, hydroxy-lower-alkyl, and phenyl-lower-alkyl.

Still another particular embodiment in accordance with the phthalocyanine composition aspect of this invention comprises valuable and highly water-soluble dyestuffs obtained by removing the carboxylic-acyl group, —COR, from the dyestuffs of Formula V. The phthalocyanine dyestuffs produced according to this embodiment of the invention are characterized by the presence in the molecule of from one to five piperazinium radicals, and are illustrated graphically by Formula VI

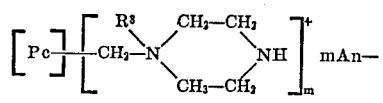

Formula VI wherein Pc, R³, m and An are as defined above. The dyestuffs of this embodiment of the invention are conveniently prepared by hydrolysis of the 4-(carboxylic-acyl)piperazinium dyestuffs illustrated by Formula V by heating said compounds in dilute aqueous alkali, or preferably in dilute aqueous mineral acid, for example dilute hydrochloric acid as described hereinbelow.

In the first of its process aspects, the invention sought to be patented resides in the concept of the process which comprises heating a halogenomethyl-substituted phthalocyanine, i.e., a phthalocyanine bearing from one to five halogenomethyl substituents, with a compound of the Formula

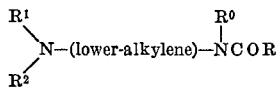

wherein R, $R^0$, $R^1$ and $R^2$ have the same respective meanings given hereinbefore, in a suitable medium, for example a polar solvent. Quaternization is usually complete in from two to forty-eight hours, depending upon the nature of the reactants, the nature of reaction medium, and the reaction temperature. The reaction generally proceeds readily at temperatures in the range 50–110° C. It is convenient to employ a reaction medium which boils within the specified range in order that the reaction temperature is maintained by merely refluxing the medium. Convenient media for carrying out the process according to this aspect of the invention include water; the lower alcohols, for example, methanol, ethanol, isopropyl alcohol, and the like; the lower-alkylene glycols, for example, ethylene glycol and propylene glycol; acetonitrile; and dimethylformamide. We generally prefer to use water or isopropyl alcohol as the reaction media because they have suitable boiling points and are inexpensive.

The starting materials for preparing the compounds of Formula III are known classes of compounds, the methods of preparation of which are described in the prior art. For example, the poly(halogenomethyl)phthalocyanines are prepared by causing phthalocyanines to react with formaldehyde and a hydrogen halide or alternatively from phthalocyanines and bis(halomethyl) ether. The carboxylic-acylamino-lower-alkylamines are prepared by acylating alkylenediamines in which one of the nitrogen atoms is disubstituted and the other is either unsubstituted or monosubstituted. The reaction is carried out according to conventional procedures by causing the amine function (bearing at least one hydrogen atom) of an alkylenediamine, $R^1R^2N$-lower-alkylene-$NHR^0$, to react with an acylating agent, for example, a carboxylic acid, carboxylic acid anhydride, carboxylic acid ester, or a carboxylic acid halide. Examples of such acylating agents include formic acid, acetic anhydride, phthalic anhydride, methyl benzoate, benzoyl chloride, and the like.

The dyestuffs of the embodiment of the invention illustrated by Formula IV are prepared by removing the carboxylic acyl groups, —COR, from the dyestucs of Formula III which contain from one to five carboxylic-acylamino-lower-akyl-quaternary ammonium halide radicals each bonded to the phthalocyanine group through a methylene bridge, as described above. The removal of the carboxylic acyl groups is conveniently accomplished through hydrolysis by heating the acylamino dyestuffs in admixture with dilute aqueous acid. We generally prefer to prepare the quaternary ammonium dyestuffs in the form of the chloride salt because the chlorides are inexpensive; therefore, we prefer to hydrolyze the acylamine groups with dilute hydrochloric acid in order to prevent introduction of extraneous anion contaminants. However, the hydrolysis is effectively accomplished by any of the common dilute mineral acids, for example, hydrochloric acid, hydrobromic acid, hydriodic acid, sulfuric acid, phosphoric acid, and the like, as well as by aqueous strong organic acids, for example p-toluene-sulfonic acid, benzenesulfonic acid, and the like. Moreover, inasmuch as carboxylic-acylamides are known to be hydrolyzed by aqueous alkali, such may also be used for the hydrolysis herein, but with concomitant introduction of the hydoxide ion as an anion contaminant.

The dyestuffs prepared according to the embodiments of the invention illustrated by Formula IV and Formula VI, each contain a basic amino group in addition to the quaternary ammonium group which characterizes all of the dyestuffs of our invention. It is obvious that the said phthalocyanine amino-basic dyestuffs can exist either in free base form or in acid-addition salt form. For the purpose of our invention, the two forms are full equivalents, because the dyestuffs are water-soluble in either form, and salt formation is believed not to affect the physical properties of the dyestuffs either adversely or beneficially.

The dyestuffs of the embodiment of the invention illustrated by Formula V are prepared by reacting a poly (halogenomethyl)phthalocyanine with a 4-carboxylic-acylated piperazine of the formula

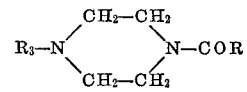

wherein R and $R^3$ are defined above. The reaction conditions for the preparation of dyestuffs according to this aspect of our invention are in all respects the same as those for the preparation of compounds of Formula III.

The acylated piperazine starting material is prepared by the conventional acylation of the appropriate mono-substituted piperazine, for example, N-methylpiperazine, N-ethylpiperazine, N-(2-hydroxyethyl)piperazine, N-benzylpiperazine, N-(chlorobenzyl)piperazine, and the like. In the preparation of the acylated amine reactants herein which also contain a hydroxyl group, the amine may be preferentially acylated by known methods, or the hydroxyl group as well as the amine group may be acylated and, if desired, the acyl group may be removed by hydrolysis after the formation of the water-soluble phthalocyanine dyestuffs described herein.

Although the dyestuffs obtained in accordance with the phthalocyanine composition and process aspects of the invention include especially those compositions depicted generically by Formulas III, IV, V and VI, it is possible, and indeed probable, that the preparative reaction lead to the formation of products containing functional groups, Q, resulting from the reaction of halogenomethyl groups with the solvent, particularly when the solvent is water or an alcohol. For example, when isopropyl alcohol is employed as the reaction medium, the formation of products containing one or more isopropoxymethyl moieties is likely. Similarly, when water is employed as the reaction medium, it is likely that products having one or more hydroxymethyl moieties will be formed. We also envisage the intentional incorporation of said substituents, for example, hydroxy, amino, hydrazino, hydroxy-lower-alkoxy, and phenoxy moieties in the dyestuffs in order to vary slightly the physical properties, for example, the shade and solubility, thereof. Such incorporation is easily accomplished by adding quantities of water, amines, hydrazines, lower alcohols, or phenols as reactants to the mixture before quaternization is complete. Compounds containing such groups in addition to the quaternary-ammonium functional groups which characterize our dyestuffs are within the scope of our invention.

(2) QUATERNARY AMMONIUM AZO DYESTUFFS

In a second composition of matter aspect, the invention sought to be patented resides in the concept of the novel water-soluble quaternary ammonium azo compounds having the formula

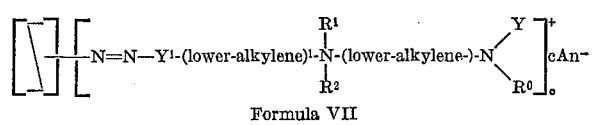

Formula VII wherein c is in integer from one to two; $R^0$ is hydrogen, lower-alkyl or hydroxy-lower-alkyl; $R^1$ is lower-alkyl, lower-alkenyl or hydroxy-lower-alkyl; R² is lower-alkyl, lower-alkenyl, hydroxy-lower-alkyl or -(lower-alkylene)-NR⁰Y or R¹ and R² together with the nitrogen atom, are pyrrolidino, piperidino or 4-lower-alkanoyl piperazino; Y is hydrogen or

wherein R is hydrogen, lower-alkyl, lower-alkenyl, phenyl or phenyl-lower-alkyl; An is an anion; Y¹ is a divalent moiety of the formula

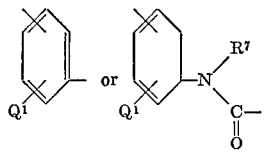

in which Q¹ is hydrogen, lower-alkyl, lower-alkoxy or halogen and R⁷ is hydrogen or lower-alkyl; and Z is a radical derived from the group of coupling components consisting of

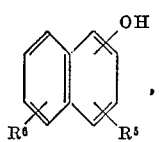

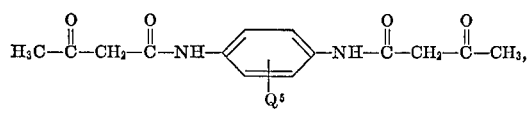

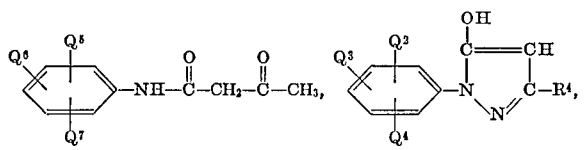

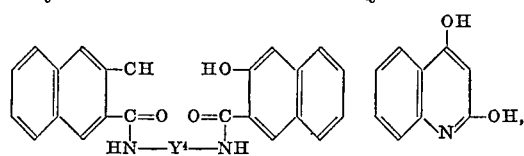

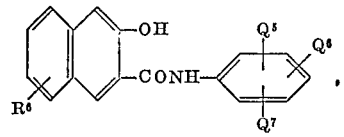

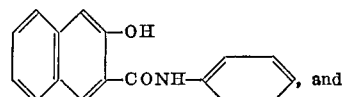

, and

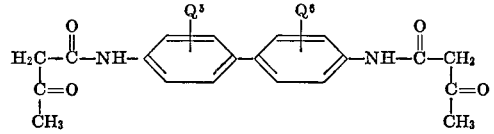

in which Q², Q³ and Q⁴ are each hydrogen, lower-alkyl, lower-alkoxy, hydroxy, nitro, amino, carbo-lower-alkoxy, carboxamido, sulphamyl or halogen; Q⁵ and Q⁶ are each hydrogen, lower alkyl, lower-alkoxy or halogen; Q⁷ is hydrogen, lower-alkyl, lower-alkoxy, nitro or halogen; R⁴ is lower-alkyl, lower-alkoxy, carboxamido or carbo-lower-alkoxy; R⁵ is hydrogen, lower-alkyl, halogen, benzoxazol-2-yl or benzimidazol-2-yl; R⁶ is hydrogen, lower-alkyl or halogen; and Y⁴ is 1,4-phenylene or 1,2-ethylene.

As used throughout, the term "(lower-alkylene)¹" means methylene or a divalent, saturated straight- or branched-chain aliphatic radical of from two to six carbon atoms wherein the valence bonds of the two to six carbon atom-containing radical are attached to different carbon atoms. Thus, radicals represented by the term "(lower-alkylene)¹" have from one to six carbon atoms and are, for example,

—CH₂—, —CH₂CH₂—,

—CH₂—CH₂—CH₂—,

—(CH₂)₄—, —(CH₂)₅—, —(CH₂)₆—,

—CH(CH₃)CH₂—,

—CH₂—CH₂—CH(CH₃)—CH₂—,

—CH₂—CH₂—CH(C₂H₅)—CH₂—, and the like.

In a third composition of matter aspect, the invention sought to be patented resides in the concept of the novel water-soluble quaternary ammonium azo compounds having the formula

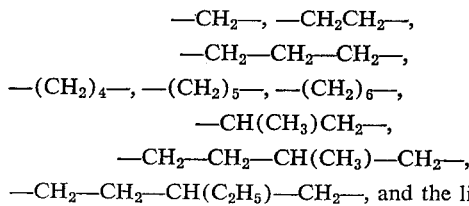

Formula VIII wherein c is an integer from one to two; R⁰ is hydrogen, lower-alkyl or hydroxy-lower-alkyl; R¹ is lower-alkyl, lower-alkenyl or hydroxy-lower-alkyl; R² is lower-alkyl, lower-alkenyl, hydroxy-lower-alkyl or -(lower-alkylene)-NR⁰Y or R¹ and R² together with the nitrogen atom are pyrrolidino, piperidino or 4-lower-alkanoyl piperazino; Y is hydrogen or

wherein R is hydrogen, lower-alkyl, lower-alkenyl, phenyl or phenyl-lower-alkyl; An is an anion; Y² is a divalent moiety of the formula

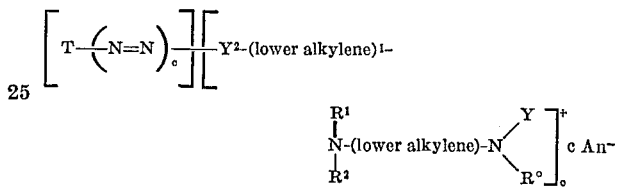

in which the free valence attached to the ring system is bonded to the azo group, and R⁷ is hydrogen or lower-alkyl; and T is either a monovalent residue selected from the group consisting of

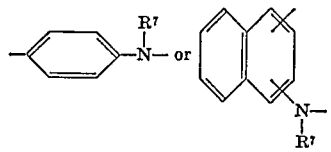

when c is one or a divalent residue from the group consisting of

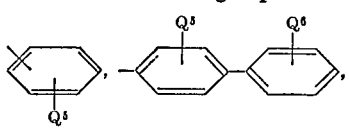

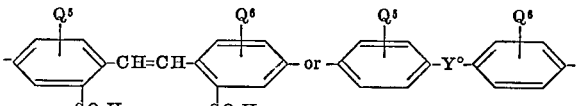

when c is two in which Q⁵ and Q⁶ are each hydrogen, lower-alkyl, lower-alkoxy or halogen, ( Q⁸ and Q¹⁰ are each hydrogen, lower-alkyl, nitro or halogen, $Q^9$ is hydrogen, lower-alkyl, acetamido, nitro or halogen and $Y^0$ is azo, methylene, oxo, thio, sulfonyl or ureylene.

In a fourth composition of matter aspect, the invention sought to be patented residues in the concept of the novel water-soluble quaternary ammonium azo compounds having the formula

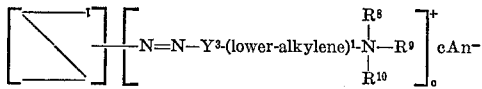

Formula IX wherein $c$ is an integer from one to two; $R^8$ is lower-alkyl, lower-alkenyl or hydroxy-lower-alkyl; $R^9$ is lower-alkyl or hydroxy-lower-alkyl; $R^{10}$ is lower-alkyl or lower-alkenyl; An is an anion; $Y^3$ is a divalent moiety of the formula

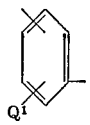

in which $Q^1$ is hydrogen, lower-alkyl, lower-alkoxy or halogen; and $Z^1$ is a radical derived from the group of coupling components consisting of

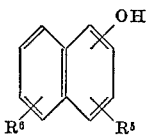

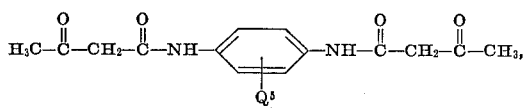

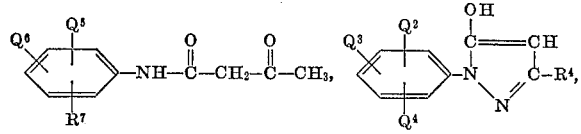

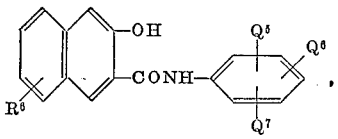

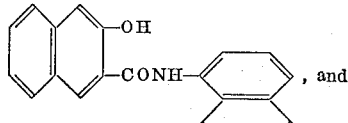, and

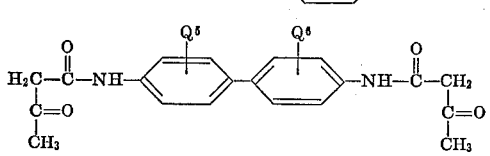

in which $Q^2$, $Q^3$ and $Q^4$ are each hydrogen, lower-alkyl, lower-alkoxy, hydroxy, nitro, amino, carbo-lower-alkoxy, carboxamido, sulphamyl or halogen; $Q^5$ and $Q^6$ are each hydrogen, lower-alkyl, lower-alkoxy or halogen; $Q^7$ is hydrogen, lower-alkyl, lower-alkoxy, nitro or halogen; $R^4$ is lower-alkyl, lower-alkoxy, carboxamido or carbo-lower-alkoxy; $R^5$ is hydrogen, lower-alkyl, halogen; benzoxazol-2-yl or benzimidazol-2-yl; and $R^6$ is hydrogen, lower-alkyl or halogen.

In a second process aspect, the invention sought to be patented in relation to the water-soluble quaternary ammonium azo compounds of Formula VII, resides in the concept of the process which comprises diazotizing an amine of the formula

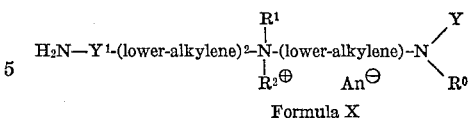

Formula X wherein An, $R^0$, $R^1$, $R^2$, Y and $Y^1$ are as defined above in relation to Formula VII, and coupling approximately $c$ molecular proportion of the diazonium salt with one molecular proportion of a coupling component, Z, which has the same meanings given hereinabove in relation to Formula VII.

In a third process aspect, the invention sought to be patented in relation to the water-soluble quaternary ammonium azo compounds of Formula VIII, resides in the concept of the process which comprises coupling approximately $c$ molecular proportions of a compound of the formula

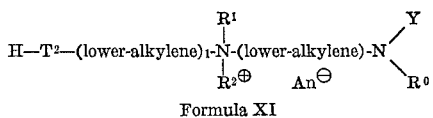

Formula XI wherein Anfi $R^0$, $R^1$, $R^2$, Y and $Y^2$ are as defined above in relation to Formula VIII, with one molecular porportion of the diazonium salt obtained by diazotization of an amine having the formula

wherein $c$ and T have the same meanings given hereinbefore in relation to Formula VIII.

In a fourth process aspect, the invention sought to be patented in relation to the water-soluble quaternary azo compounds of Formula IX, resides in the concept of the process which comprises diazotizing an amine of the formula

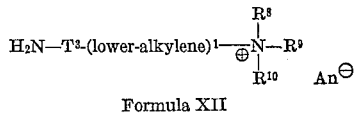

Formula XII wherein $Y^3$, $R^8$, $R^9$, $R^{10}$ and An are as defined above in relation to Formula IX, and coupling approximately $c$ molecular proportion of the diazonium salt with one molecular proportion of a coupling component, $Z^1$, which has the same meanings given hereinabove in relation to Formula IX.

In the preparation of the compounds of Formula VII, and of Formula IX and the ratio of the quantity of diazonium compound to coupling component is, of course, dependent on the number of coupling sites available in the coupling component. Thus when a single coupling site is present, for example in a 1-phenyl-2-pyrazolin-5-one, there is employed approximately one molecular proportion of the diazonium compound and when two coupling sites are available as, for example, in 4,4'-bi-o-acetoacetotoluidide (Naphthol AS–G), there are employed approximately two molecular proportions of the diazonium compound. In the preparation of those compounds of Formula VIII wherein two azo linkages are present, there is employed approximately one-half molecular proportion of the tetrazonium compound for reaction with approximately one molecular proportion of the quaternary ammonium coupling component. Since the reaction temperature has some effect on the shade of the resulting water-soluble quaternary ammonium dyestuffs, it is ordinarily desirable to maintain adequate control of the temperature of the reaction mixture in some predetermined manner. It is generally satisfactory to stir the reactants together at a temperature in the approximate range 0–35° C. to effect only an incomplete coupling reaction, and then heat the mixture at a higher temperature, for instance in the approximate range 40–60° C., preferably at 50–55° C., to complete the coupling reaction and develop the dyestuff. The reaction is begun in an alkaline aqueous medium but the pH of the reaction mixture drops during the process to a final value of about 5.0.

In a fifth process aspect, the invention sought to be patented in relation to the preparation of water-soluble quaternary ammonium azo compounds of Formula VII and of Formula VIII wherein Y is hydrogen, resides in the concept of the process which comprises hydrolyzing a compound of Formula VII or of Formula VIII wherein Y is —COR in which R is as defined above. As stated hereinbefore in the case of the phthalocyanine dyestuffs of our invention, the removal of the carboxylic acyl groups is conveniently accomplished through hydrolysis by heating the acylamino dyestuffs in admixture with dilute aqueous acid. Although the hydrolysis is effectively accomplished by the use of any of the common dilute mineral acids as well as by aqueous strong organic acids as previously enumerated, we here also prefer to hydrolyze the acylamine groups with a dilute aqueous acid whose anion is the same as the quaternary anion in order to prevent introduction of extraneous anion contaminants. Moreover, the carboxylic-acylamides of Formula VII and of Formula VIII may be hydrolyzed by aqueous alkali, but of course, with concomitant introduction of the hydroxide ion as an anion contaminant.

Alternatively, the compounds of Formula VII in which Y is hydrogen, can be prepared by coupling in approximately stoichiometric proportions a coupling component, Z, as defined in relation to Formula VII, with a diazotized amino compound of Formula X in which Y is hydrogen. Similarly, an alternate method for preparing the compounds of Formula VIII in which Y is hydrogen comprises coupling in approximately stoichiometric proportions a compound of Formula XI in which Y is hydrogen with a diazonium compound of the formula

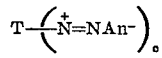

wherein c, T and An have the same meanings as hereinbefore indicated. Although the intermediates of Formula X and XI in which Y is hydrogen can be separately prepared and isolated for use in preparing the compounds of Formula VII and Formula VIII in which Y is hydrogen, it is not necessary to do so. It is particularly convenient to first hydrolyze the acylated intermediates of Formula X or of Formula XI and to then proceed directly with the diazotization and coupling in the same reaction vessel.

When preparing the compounds of Formula VII in which Y is hydrogen and $Y^1$ is

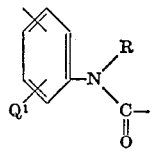

by hydrolysis of the corresponding compound of Formula VII in which Y is —COR, it is preferred to hydrolyze those compounds in which R is hydrogen or equivalently in which Y is formyl. The formyl group is preferred because it is readily hydrolyzed with minimal concomitant hydrolysis of the remaining amide group. In the same sense and for the same reason, it is preferred to employ those compounds of Formula X in which Y is formly when $Y^1$ is

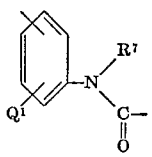

for the preparation of the corresponding intermediates of Formula X in which Y is hydrogen.

The water-soluble quaternary ammonium azo dyestuffs prepared according to this aspect of our invention contain one or more primary amino groups in addition to the quaternary ammonium group which characterizes all of the dyestuffs of our invention. The said amino-basic dyestuffs can, of course, exist either in free base form or in acid-addition salt form. For the purpose of our invention, the two forms are full equivalents, because the dyestuffs are water-soluble in ether form, and salt formation is believed not to affect the physical properties of the dyestuffs either adversely or beneficially.

In a fifth composition of matter aspect, the invention sought to be patented resides in the concept of the N-$R^1$-N-[(lower - alkylene)$^1$-$Y^1$-NH$_2$]-N-$R^2$-N-[(lower - alkylene)-NR$^0$Y] ammonium halides, the N-$R^1$-N-[(lower-alkylene)$^1$-$Y^2$-H]-N-$R^2$-N-[(lower-alkylene)-NR$^0$Y] ammonium halides, and the N-$R^8$-N[(lower-alkylene)-$Y^3$-NH$_2$]-N-$R^9$-N-$R^{10}$ ammonium halides represented and defined by Formulas X, XI, XII respectively which are useful intermediates in the preparation of the quaternary ammonium azo dyestuffs of the invention.

The manner and process of making and using the quaternary ammonium azo dyestuffs of the invention, and the best mode contemplated by the inventors of carrying out this invention, will now be described so as to enable any person skilled in the art to which it pertains to make and use the same.

The intermediate N-$R^1$-N-[(lower-alkylene)$^1$-$Y^1$-NH$_2$]-N-$R^2$-N-[(lower-alkylene)-NR$^0$Y] ammoniun halides of Formula X in which Y is —COR, are conveniently prepared in two steps, firstly by heating a halogeno-lower-alkylene-substituted nitrobenzene or a halogeno-lower-alkylene carboxylic acid N-$R^7$-nitroanilide with a compound of the formula

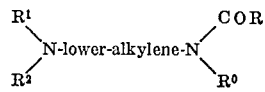

wherein R, $R^0$, $R^1$, $R^2$ and $R^7$ have the same respective meanings given hereinbefore, in a siutable medium, for example a polar solvent, to obtain the nitro-substituted precursors of the intermediates of Formula X wherein $Y^1$ is

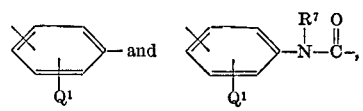

respectively. Quaternization is usually complete in from two to forty-eight hours, depending upon the nature of the reactants, the nature of the reaction medium, and the reaction temperature. The reaction generally proceeds readily at temperatures in the range 50–110° C. It is convenient to employ a reaction medium which boils within the specified range in order that the reaction temperature is maintained by merely refluxing the medium. Convenient media for carrying out the process according to this aspect of the invention include water; the lower-alcohols, for example methanol, ethanol, ispropyl alcohol, and the like; the lower-alkylene glycols, for example, ethylene glycol and propylene glycol; acetonitrile; and dimethylformamide. We generally prefer to use isopropyl alcohol or water as the reaction media because they have suitable boiling points and they are inexpensive. The N - $R^1$ - N - [(lower-alkylene)$^1$ - $Y^1$ - NO$_2$]-N-$R^2$-N-[(lower-alkylene)NR$^0$COR]ammonium halide thus obtained is then in the second step subjected to reduction of the nitro group to obtain the corresponding amino-substituted intermediates of Formula X in which Y is —COR. Reduction is carried out with powdered iron under essentially neutral conditions. The reduction generally proceeds readily in aqueous media at a temperature in the range 50–75° C. Alternatively, high-pressure, catalytic reduction is employed. We have found that when the latter method is used, reduction is conveniently and efficiently effected in aqueous media at approximately 600 pounds per square inch hydrogen pressure at a temperature between 60–80° C. Although any of the known poisoned reduction catalysts may be used, we prefer to use a platinum sulfide on charcoal catalyst.

The intermediates of Formula X in which Y is hydrogen are obtained by the hydrolysis of the corresponding compound of Formula X wherein Y is —COR. The hydrolysis is effectively accomplished by heating the acylamino intermediate in admixture with dilute aqueous acid as hereinbefore described.

Particularly preferred among the novel intermediates of Formula X and their corresponding precursors useful for the preparation of the dyestuffs of Formula VII, are those compounds represented by the formula

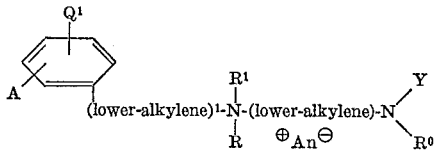

and by the formula

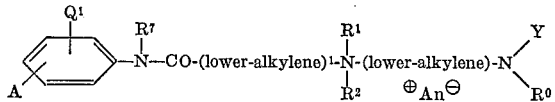

where in both formulas A is nitro or amino; $R^0$ is hydrogen, lower-alkyl or hydroxy-lower-alkyl; $Q^1$ is hydrogen, lower-alkyl, lower-alkoxy or halogen; $R^1$ is lower-alkyl, lower-alkenyl or hydroxy-lower-alkyl; $R^2$ is lower-alkyl, lower-alkenyl, hydroxy-lower-alkyl or -(lower-alkylene)-$NR^0Y$ or $R^1$ and $R^2$ together with the nitrogen atom, are pyrrolidino, piperidino or 4-lower-alkanyl piperazino; Y is hydrogen or

wherein R is hydrogen, lower-alkyl, lower-alkenyl, phenyl or phenyl-lower-alkyl; An is an anion; and in the latter formula $R^7$ is hydrogen or lower-alkyl.

The intermediate $N-R^8-N-[(lower-alkylene)-Y^3-NH_2]$-$N-R^9-N-R^{10}$ ammonium halides of Formula XII are conveniently prepared in two steps, first by heating a halogeno lower-alkylene-substituted nitrobenzene with a compound of the formula

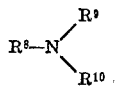

wherein $R^8$, $R^9$ and $R^{10}$ have the same respective meanings given hereinbefore without other media or in a suitable medium, for example a polar solvent, to obtain the nitro-substituted precursors of the intermediate of Formula XII. Quaternization is usually complete in from two to forty-eight hours and proceeds readily at temperatures in the range of 50–110° C. Convenient media for carrying out the process according to this aspect of the invention include water; the lower-alcohols, for example, methanol, ethanol, isopropyl alcohol, and the like; the loweralkylene glycols, for example, ethylene glycol; acetonitrile and dimethyl formamide. We generally prefer to use water as the reaction medium because it has a suitable boiling point and is inexpensive. The $N-R^8-N-[(lower-alkylene)-Y^3-NO_2]-N-R^9-N-R^{10}$ ammonium halide thus obtained is in the second step subjected to reduction of the nitro group to obtain the corresponding amino-substituted intermediates of Formula XII. Reduction is carried out with powdered iron under essentially neutral conditions. The reduction generally proceeds readily in aqueous media at a temperature in the range 50–75° C. Alternatively, high-pressure, catalytic reduction of the nitro group is employed in aqueous media at approximately 600 pounds per square inch hydrogen pressure at temperature between 60–80° C. in the presence of any of the known poisoned reduction catalysts.

Particularly preferred among the novel intermediates of Formula X and their corresponding precursors useful for the preparation of dyestuffs of Formula IX, are those compounds represented by the formula

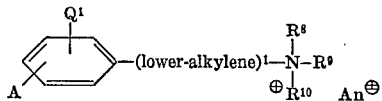

wherein A is nitro of amino; $Q^1$ is hydrogen, lower-alkyl, lower-alkoxy or halogen; $R^8$ is lower-alkyl, lower-alkenyl or hydroxylower-alkyl; $R^9$ is lower-alkyl or hydroxy-lower-alkyl; $R^{10}$ is lower-alkyl or lower-alkenyl; and An is an anion.

The halide quaternizing agents used as starting materials for preparing the intermediate compounds of Formula X and of Formula XII are a generally known class of compounds, and are readily prepared by methods well-known in the art. For example, the halogeno-lower-alkylene-substituted nitro-benzenes are prepared by nitration of the appropriate halogeno-lower-alkylene-substitute benzenes which in turn are prepared by the interaction of the corresponding hydroxy-lower-alkylene-substituted benzene with an hydrogen halide or an hydrogen halide-producing reactant, for example phosphorous oxychloride. Said hydroxy-lower-alkylene-substituted benzenes are likewise a generally known class of compounds and are prepared by methods well-known in the art. For example, the Grignard reagent formed from the appropriate aryl halide or the appropriate aralkyl halide is interacted with formaldehyde or an appropriate alkylene oxide for introduction of a hydroxy-alkyl group into the aromatic ring or addition thereof to the alkyl chain. The desired halogeno-lower-alkylene-substituted nitrobenzene isomer is separated by conventional techniques from the resultant mixture of nitrated products or alternatively, said mixture can be used *per se* for quaternization with subsequent separation of the desired quaternary ammonium intermediate. The halogeno-lower-alkylene carboxylic acid $N-R^7$ nitroanilides are prepared, for example, by interaction of a halogen-substituted alkanoyl halide with an $N-R^7$ substituted nitroaniline. The carboxylic-acylamino-lower-alkylamines are prepared as hereinbefore described.

The $N-R^8-N-R^9-N-R^{10}$ amines required for preparing the compounds of Formula XII are a known class of compounds, the methods of preparation of which are described in the prior art. For example, the direct alkylation of primary and secondary amines with a lower alkyl halide, a lower alkenyl halide or a hydroxy-lower-alkyl halide provides a convenient method for preparing the requisite tertiary amines.

The $N-R^1-N-[(lower-alkylene)^1-Y^2-H]-N-R^2-N-[(lower-alkylene)-NR^0Y]$ammonium halides of Formula XI in which Y is —COR, are conveniently prepared by heating an $N-R^7-N-(halo-lower-alkylene)$-substituted aniline with a compound of the formula

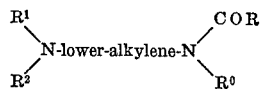

wherein R, $R^0$, $R^1$, $R^2$ and $R^7$ have the same respective meanings given hereinbefore, to obtain the intermediate of Formula XI wherein $Y^2$ is

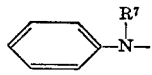

The reaction can be carried out without other amide or in a suitable medium for example, a polar solvent. Quaternization is usually complete in form two to forty-eight hours and proceeds readily at temperatures in the range of 50–110° C. Convenient media for carrying out the process according to this aspect of the invention include water; the lower-alcohols, for example, methanol, ethanol, isopropyl alcohol, and the like; the lower-alkylene glycols, for example, ethylene glycol and propylene glycol; acetonitrile and dimethylformamide.

Those intermediates represented by Formula XI in which Y is hydrogen are conveniently obtained by the hydrolysis of the corresponding acylamino compound of Formula XI wherein Y is —COR. The hydrolysis is accomplished by heating the acylamino intermediate in admixture with dilute aqueous acid as hereinbefore described.

Novel intermediates that are particularly preferred and useful for the preparation of the dyestuffs of Formula VIII and which are within the ambit of Formula XI, are those compounds represented by the formula

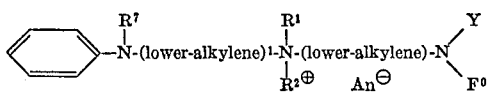

in which $R^0$ is hydrogen, lower-alkyl or hydroxy-lower-alkyl; $R^1$ is lower-alkyl, lower-alkenyl or hydroxy-lower-alkyl; $R^2$ is lower-alkyl, lower-alkenyl, hydroxy-lower-alkyl or -(lower-alkylene)-$NR^0Y$ or $R^1$ and $R^2$ together with the nitrogen atom are pyrolidino, piperidino or 4-lower-alkanoyl piperazino; $R^7$ is hydrogen or lower-alkyl; Y is hydrogen or

wherein R is hydrogen, lower-alkyl, lower-alkenyl, phenyl or phenyl-lower-alkyl; and An is an anion.

The halide quaternizing agents required for preparing the intermediate compounds of Formula XI are generally-known classes of compounds and are conveniently prepared by methods well-known in the art. For example, the N-$R^7$-(halo-lower-alkylene)-substituted anilines are prepared by causing an N-$R^7$-N-(hydroxy-lower-alkylene)-substituted aniline to react with an hydrogen halide. The carboxylic-acylamino-lower-alkylamines are prepared as hereinbefore described.

The new water-soluble quaternary ammonium-substituted dyestuffs of Formulas II, VII, VIII and IX disclosed herein are useful dyestuffs which can be applied to natural fibers, to fiber-forming synthetic materials and to cellulosic materials by methods conventional in the dyeing art since it has been found that the dyestuffs of this invention are substantive to wool, silk, nylon, rayon, polyacrylonitrile, cotton and paper. The dyed products thus obtained are stable to ultra-violet light and to washing. The novel dyes are especially valuable for imparting various shades of a stable turquoise, red or yellow color to cotton and to paper, both sized and unsized. For use in the paper trade, our dyes have several outstanding advantages over quaternary ammonium dyes in the prior art. First, our dyes are less prone to "bleed" when paper impregnated with the dyes is wet and placed in contact with moist white paper. This is a particularly desirable property for dyes designed for coloring paper to be used in facial tissues, napkins and the like, wherein it can be foreseen that the colored paper, while wet, may come in contact with other surfaces, such as textiles, paper and the like, which should be protected from stain. Another advantageous property of our new dyes for use in the paper trade is found in their high degree of color discharge when bleached with hypochlorite or "chlorine" bleach. This property of dyes is particularly desired by papermakers in order that dyed paper may be completely bleached prior to reprocessing. Still another advantageous property of our dyestuffs is found in their high resistance to a change of shade when used to color cellulosic materials, which have either previously been treated with or are treated subsequent to dyeing, with wet-strength resin.

The carboxylic-acylamino compounds and the free amino compounds of the instant invention are substantially equal with respect to their bleachability. With respect to shade, in general, the free amino compounds have slightly deeper shades than the carboxylic acryl-amino compounds. Presumably because of the availability of the free amine group to bond with the fiber and wet-strength resin or similar paper additives, the free amino compounds are, in general, less prone to bleed than are the carboxylic acylamino compounds both when wet with water alone and in the presence of soap.

Yet another advantage of the dyes of this invention is their property of being absorbed by cellulosic fibers from aqueous solution to a very high degree and at a very rapid rate. This property is advantageous to the paper industry, because it allows the dye to be added to the pulp just prior to formation of the sheet.

The structures of the novel compounds herein disclosed were established by their mode of synthesis and analysis of their infra-red absorption spectra, and were corroborated by the correspondence of calculated and found values of elemental analyses of representative samples.

Our invention is further illustrated by the following procedures and Examples, which are given for the purpose of illustration only, and not to limit the invention thereto. All parts are parts by weight.

PREPARATION OF INTERMEDIATES

A. Tetrakis(Chloromethyl)Copper Phthalocyanine

Copper phthalocyanine was chlormethylated according to known procedures by interacting 250 parts of acid pasted copper phthalocyanine with 435 parts of paraformaldehyde and 418 parts of phosphorus oxychloride in 825 parts of 98 percent sulfuric acid and 1630 parts of chlorosulfonic acid. Elemental analysis of the resulting bright blue powder were in excellent agreement with the calculated analysis of tetrakis(chloromethyl)copper phthalocyanine.

B. Carboxylic-Acylamino Lower-Alkylamines

The folowing N - $R^1$ - N - $R^2$-N-[(lower-alkylene)-$NR^0COR$]amines were prepared by interaction of the indicated unsymmetrically disubstituted alkylene diamine and acylating agent using procedures well-known in the art for acylation.

1. N - (3-Dimethylaminopropyl)formamide from 327 parts of N,N-dimethyl-1,3-propanediamine and 180 parts of 90 percent formic acid;
2. N,N-Bis(3-formamidopropyl)methylamine from 218 parts of N,N-bsi(3-aminopropyl)methylamine and 203 parts of 90 percent formic acid;
3. N - (3-Diethylaminopropyl)formamide from N,N-diethyl-1,3-propanediamine and 90 percent formic acid;
4. N - (3-Dimethylaminopropyl)benzamide from 107 parts of N,N-dimethyl-1,3-propanediamine and 141 parts of benzoyl chloride;
5. N - (3-Dimethylaminopropyl)acetamide from N,N-dimethyl-1,3-propanediamine and acetyl chloride;
6. N - (4 - Diethylamino - 1-methylbutyl)formamide from N,N-diethyl-4-methyl-1,4-diaminobutane and 90 percent formic acid;
7. N-(3-Dimethylaminopropyl)phthalamic acid; from 102 parts of N,N-dimethyl-1,3-propane diamine and 141 parts of phthalic anhydride;
8. N - (3-Diethanolaminopropyl)formamide from N-(3-aminopropyl)diethanolamine and 90 percent formic acid;
9. N - [2-(4-Formylpiperazino)ethyl]formamide from 2-(4-formylpiparazine)ethylamine and 90 percent formic acid; and
10. N-(2-Dimethylaminoethyl)formamide from 2-dimethylaminoethylamine and 90 percent formic acid.

The following carboxylic-acylamino lower-alkylamines which are within the purview of this invention, are prepared using art-known procedures by acylation of the indicated unsymmetrically substituted diamine with the indicated acylating reagent:

N-[2-(N-Ethyl - N - 1 - methylbutyl)aminoethyl]propionamide from 2-(N-ethyl-N-1-methylbutylamino)ethylamine and propionic anhydride;

N - (6 - Dimethylaminohexyl)iso-butyramide from 6-(dimethylamino)hexylamine and iso-butyryl chloride;

N-[2 - (N-Allyl - N - ethyl)aminoethyl]p-chlorobenzamide from 2-(N-allyl - N - ethylamino)ethylamine and p-chlorobenzoyl chloride;

N - [2 - (N - Ethyl - N - methyl)aminoethyl]propionamide from 2-(N-methyl -N - ethylamino)ethylamine and propionyl chloride;

N-(2 - Piperidinoethyl)acrylamide from 2 - piperidinoethylamine and ethyl acrylate;

N-[2 - (N-n-Butyl - N - isopropyl)aminoethyl]phenylacetamide from 2-(N-butyl - N - isopropylamino)ethylamine and ethyl phenylacetate;

N-(3 - Pyrrolidinylpropyl)valeramide from 3 - pyrolidinopropylamine and valeryl chloride;

N-(2 - Diallylaminoethyl)phenylpropionamide from 2-(diallylamino)ethylamine and ethyl phenylpropionate;

N-(2-Diethylaminopentyl) - 2 - methylacrylamide from 5-(diethylamino)pentylamine and methyl methacrylate;

N - (2 - Diisopropylaminoethyl)p - methoxybenzamide from 2 - (diisopropylamino)ethylamine and p-methoxybenzoylchloride;

N-(2 - Diisopentylaminoethyl)butyramide from 2-(diisopentylamino)ethylamine and butyryl chloride;

N-(2 - Dihexylaminoethyl)n - caproamide from 2 - dihexylaminoethylamine and caproyl chloride;

1-Benzyl - 4 - formyl piperazine from 1-benzylpiperazine and formic acid;

N-(6 - Diisobutylaminohexyl)acetamide from 6-(diisobutylamino)hexylamine and acetic anhydride;

N-(1-Methyl - 3 - diethylaminopropyl)acrylamide from 3-amino-N,N-diethylaminobutylamine and ethyl acrylate;

1-Ethyl-4-propionyl piperazine from 1-ethylpiperazine and propionyl chloride;

N-(2-Di-n-propylamino - 2 - methylethyl)p-nitrobenzamide from 2-methyl - 2 - di - n - propylaminoethylamine and ethyl p-nitrobenzoate;

N-[3 - (N-Methyl - N - 2 - acetamidoethyl)aminopropyl]acetamide from N-methyl-N-2-aminoethyl - 1,3 - propanediamine and acetyl chloride;

N-Methyl-N-[2 - (N-ethyl - N - methyl)aminoethyl] propionamide from N-methyl - 2 - (N-methyl-N-ethylamino)ethylamine and propionyl chloride;

N-(3 - Hydroxypropyl)-N-(3 - dimethylaminopropyl) formamide from N'-(3 - hydroxypropyl)-N,N-dimethyl-1,3-propanediamine and 90 percent formic acid;

N,N-Bis[3 - (N-methylformamido)propyl]methylamine from N,N-bis[3 - (N-methylamino)propyl]methylamine and 90 percent formic acid;

N-Isopropyl - N - (2 - piperidinoethyl)acrylamide from N-isopropyl - 2 - piperidinoethylamine and ethyl acrylate;

N-n-Hexyl - N - [2 - (N-ethyl-N-methyl)aminoethyl] propionamide from N-n-hexyl - 2 - (N-methyl-N-ethylamino)ethylamine and propionic anhydride;

N-Ethyl - N - (2-di-n-propylamino - 2 - methylethyl)p-nitrobenzamide from N-ethyl - 2 - methyl-2-di-n-propylaminoethylamine and ethyl p-nitrobenzoate;

N-(2 - Hydroxyethyl) - N - (4-diethylamino-1-methylbutyl)-formamide from N'-(2-hydroxyethyl)-N,N-diethyl-4-methyl-1,4-diaminobutane and 90 percent formic acid;

N-n-Butyl - N - [2 - (4 - formylpiperazino)ethyl]acetamide from N-n-butyl - 2 - (4 - formylpiperazino)ethylamine and acetic anhydride;

N-[3 - (N-Methylacetamido)propyl]-N-[2 - (N-methylacetamido)ethyl]methylamine from N - [3 - (N - methylamino)propyl] - N - [2 - (N-methylamino)ethyl]methylamine and acetyl chloride;

N-Methyl - N - (3 - pyrrolidinylpropyl)valeramide from N-methyl - 3 - pyrrolidinylpropylamine and valeryl chloride;

N - (2 - Diethanolamino - 1,1 - dimethylethyl)phenylacetamide from 2 - diethanolamino - 1,1 - dimethylethylamine and ethyl phenylacetate;

1-(2 - Hydroxyethyl) - 4 - (m-toluoyl)piperazine from N-(2-hydroxyethyl)piperazine and methyl m-toluate;

N-[3 - (N - Isopropyl-N-methyl)aminopropyl]salicylamide from 3-(N-isopropyl-N-methylamino)propylamine and methyl salicylate, and 1-Methallyl - 4 - valerylpiperazine from 1-methallylpiperazine and valeryl chloride.

C. N-R$^1$-N-[(Lower-alkylene)$^1$ - Y$^1$NH$_2$] - N - R$^2$ - N-[(Lower - Alkylene) - NR$^0$Y] Quaternary Ammonium Intermediates (Formula X)

1. N,N-Dimethyl-N-(3-amino-4-methoxybenzyl)-N-3-formamidopropylammonium chloride.

(a) To a refluxing solution of 35.4 parts of N-(3-dimethylaminopropyl)formamide in 40 parts of isopropyl alcohol there was added over a two hour period 50.4 parts of 4-methoxy - 3 - nitrobenzyl chloride. Refluxing was continued for four hours after which the reaction mixture was diluted with 100 parts of isopropyl alcohol and cooled to 20° C. The solid that separated was collected and washed with a small amount of fresh isopropyl alcohol and then dried in a vacuum oven to yield 71.1 parts of N,N-dimethyl-N-(3 - nitro - 4 - methoxybenzyl)-N-3-formamidopropylammonim chloride, as a cream colored solid which melted at 180–183° C.

(b) A mixture of 30.0 parts of iron powder, 6.0 parts of sodium acetate, and 120 parts of water was heated to 50° C. Heating was stopped and 33.1 parts of N,N-dimethyl-N-3-(nitro - 4 - methoxybenzyl)-N-3-formamidopropylammonium chloride was added over a period of two and a half hours at a rate such as to maintain the temperature at 50–55° C. At the end of the addition, heating was resumed at 50–55° C. for two hours. The reaction mixture was cooled to 25° C. and filtered with the aid of diatomaceous earth to obtain a pale yellow solution. A sample of the solution was analyzed for free amine content by diazotization using a standardized sodium nitrite solution. The analytical results indicated that N,N-dimethyl-N-(3 - amino - 4 - methoxybenzyl)-N-3-formamidopropylammonium chloride was obtained in nearly quantitative yield. The product was used directly in the form of its aqueous solution without isolation.

(c) A mixture of 166 parts of N,N-dimethyl-N-(3-nitro-4-methoxybenzyl) - N-3 - formamidopropylammonium chloride, 200 parts of water, and 3 parts of a 5 percent platinum sulfide on charcoal mixture was subjected to 600 pounds per square inch of hydrogen at 70–75° C. After two and one-third hours, when the total up take of hydrogen was approximately 92% of theory, absorption of hydrogen ceased. The reaction mixture was cooled and filtered with the aid of diatomaceous earth. A sample of the filtrate was analyzed for free amine content by diazotization using a standardized sodium nitrite solution. The results indicated that N,N-dimethyl-N-(3-amino-4-methoxybenzyl) - N-3-formamidopropylammonium chloride was obtained in nearly quantitative yield. The product was used directly in the form of an aqueous solution without isolation.

2. N,N-Dimethyl-N-(3-amino-4-methoxybenzyl)-N-3-benzamidopropylammonium chloride (a) Proceeding in a manner similar to that described above in 1a, and using N-(3-dimethylaminopropyl)-benzamide, and 3-nitro-4-methoxybenzyl chloride, there was obtained N,N-dimethyl-N-(3-nitro-4-methoxybenzyl)-N-3-benzamidopropylammonium chloride, as an off white solid which melted at 133–136° C.

(b) When the N,N - dimethyl-N-(3-nitro-4-methoxybenzyl)-N-3-benzamidopropylammonium chloride thus obtained is subjected to reduction by either of the methods of 1b or 1c above, there is obtained N,N-dimethyl-N-(3- amino-4-methoxybenzyl) - N-3-benzamidopropylammonium chloride.

3. N-Methyl-N-(3-amino-4-methoxybenzyl)-N,N-bis(3-formamidopropyl)ammonium chloride (a) A mixture of 54.0 parts of N,N-bis(3-formamidopropyl)methylamine, 50.4 parts of 4-methoxy-3-nitrobenzyl chloride, and 78 parts of acetonitrile was stirred at reflux for seven and a half hours. An additional 78 parts of acetonitrile was added to the reaction mixture causing an oil to separate. Heating at reflux was continued for an additional two hours and the 140 parts of acetonitrile was distilled away and 200 parts of water was added. The remaining acetonitrile was removed by distillation and the cooled reaction mixture was filtered with the aid of diatomaceous earth to obtain an aqueous solution of N-methyl-N-(3-nitro-4-methoxybenzyl)-N,N-bis(3-formamidopropyl)ammonium chloride. The solution was used directly for reduction of the nitro group.

(b) Proceeding in a manner similar to that described above in 1b, and using 75 parts of iron powder and 15.0 parts of sodium acetate, the N-methyl-N-(3-nitro-4-methoxybenzyl) - N,N-bis(3-formamidopropyl)ammonium chloride obtained in the form of its aqueous solution from 3a above was reduced to obtain 61 parts of N-methyl-N-(3-amino-4-methoxybenzyl) - N,N-bis(3-formamidopropyl)-ammonium chloride in the form of an aqueous solution.

4. N-Methyl-N-(3-amino-4-methoxybenzyl)-N,N-bis(3-aminopropyl)ammonium chloride trihydrochloride N - Methyl-N - (3-amino-4-methoxybenzyl)-N,N-bis(3-formamidopropyl)ammonium chloride obtained in 3b above was hydrolyzed by heating in a refluxing solution of 63 parts of water containing 24 parts of concentrated hydrochloric acid during two hours to obtain N-methyl-N - 3 - (amino - 4 - methoxybenzyl) - N,N-bis(3-aminopropyl)-ammonium chloride trihydrochloride.

5. N,N-Dimethyl-N-(4-aminophenyl)carbamylmethyl-N-3-formamidopropylammonium chloride (a) In a manner similar to that described above in 1a, and using 14.2 parts of N-(3-dimethylaminopropyl)formamide, 20.0 parts of 2-chloro-4'-nitroacetanilide, and 78 parts of isopropyl alcohol there was obtained 27.4 parts of N,N-dimethyl-N-(4-nitrophenyl)carbamylmethyl-N-3-formamidopropylammonium chloride as a white solid which melted at 195–196° C.

(b) Proceeding in a manner similar to that described above in 1b, and using 68.8 parts of N,N-dimethyl-N-(4-nitrophenyl)carbamylmethyl-N-3 - formamidopropylammonium chloride obtained above in 3a, 60.0 parts of iron powder, 12.0 parts of sodium acetate, and 250 parts of water there was obtained 33.0 parts of N,N-dimethyl-N-(4-aminophenyl)carbamylmethyl - N - 3-formamidopropylammonium chloride.

(c) Following the procedure described in 1c above, N,N-dimethyl-N-(4-nitrophenyl)carbamylmethyl - N - 3-formamidopropylammonium chloride was catalytically hydrogenated in aqueous solution at 70–75° C. and at 600 pounds per square inch in the presence of a 5 percent platinum sulfide on charcoal mixture to obtain N,N-dimethyl - N - (4-aminophenyl)carbamylmethyl - N - 3-formamidopropylammonium chloride.

6. N,N-Dimethyl-N-(4-aminophenyl)carbamylmethyl-N-3-aminopropylammonium chloride hydrochloride A solution of 10.0 parts of N,N-dimethyl-N-(4-nitrophenyl)carbamylmethyl - N - 3 - formamidopropylammonium chloride in 100 parts of water containing 6.0 parts of concentrated hydrochloric acid was heated for about two hours. The reaction mixture was rendered slightly alkaline by the addition of 50 percent aqueous sodium hydroxide and stored in the refrigerator for two days. The reaction mixture was then filtered to remove a small amount of solid and the filtrate was acidified with 48 parts of concentrated hydrochloric acid. Acetone was slowly added to the acidified filtrate until precipitation started. When precipitation of the product was complete, the solid was collected on a filter, washed with acetone, and dried at 75° C. to obtain 8.2 parts of N,N-dimethyl-N-(4-nitrophenyl)carbamylmethyl - N - 3 - aminopropylammonium chloride as the mono-hydrochloride salt, a white solid which melted at 244–245° C.

When the N,N-dimethyl-N-(4-nitrophenyl)carbamylmethyl-N-3-aminopropylammonium chloride hydrochloride thus obtained is neutralized with dilute alkali and then subjected to reduction according to the procedure of 1b above, there is obtained N,N-dimethyl-N-(4-aminophenyl)carbamylmethyl - N - 3-aminopropylammonium chloride.

7. N,N-Dimethyl-N-(3-amino 4-methoxybenzyl)-N-3-aminopropylammonium chloride

When N,N-dimethyl-N-(3-amino-4-methoxybenzyl)-N-3-formamidopropylammonium chloride obtained in 1b or 1c above is hydrolyzed by heating in a dilute aqueous solution of hydrochloric acid according to the procedure of 4 above, there is obtained N,N-dimethyl-N-(3-amino-4-methoxybenzyl)-N-3 - aminopropylammonium chloride as the dihydrochloride salt.

In addition to those for which detailed preparations are given above, the following N-R$^1$-N-[(lower-alkylene)$^1$-Y$^1$NH$_2$] - N - R$^2$ - N - [(lower-alkylene)-NR$^0$Y] quaternary ammonium intermediates are obtained when the indicated nitrophenyl-substituted quaternizing agent is interacted with the indicated tertiary amino compound according to a procedure similar to those given under 1a, 2, 3a, and 5a and the resulting nitro-substituted compound is reduced by a procedure similar to those given under 1b or 1c:

N,N-Dimethyl-N-2-(3-amino - 4 - methylphenyl)ethyl-N-3-formamidopropylammmonium chloride starting with N-(3-dimethylaminopropyl)formamide and 2-(4-methyl-3-nitrophenyl)ethyl chloride;

N-Methyl-N-3-(4 - aminophenyl)propyl - N,N - bis(3-formamidopropyl)ammonium chloride starting with N,N-bis(3-formamidopropyl)methylamine and 3 - (4 - nitrophenyl)propyl chloride;

N,N-Diethyl-N-6-(3-amino - 4 - methoxyphenyl)hexyl-N-3-formamidopropylammonium chloride starting with N-(3-diethylaminopropyl)formamide and 6-(4-methoxy-3-nitrophenyl)hexyl chloride;

N,N - Dimethyl-N-2-ethyl-4-(3-amino-5-chlorophenyl)butyl-N-3-benzamidopropylammonium chloride starting with N-(3-dimethylaminopropyl)benzamide and 2-ethyl-4-(3-chloro-5-nitrophenyl)butyl chloride;

N,N - Dimethyl-N-1-methyl-3-(4-amino-3-bromophenyl)propyl-N-3-acetamidopropylammonium chloride starting with N - (3 - dimethylaminopropyl)acetamide and 1-methyl-3-(3-bromo-4-nitrophenyl)propyl chloride;

N,N - Diethyl-N-3-(4-amino-2-chlorophenylcarbamyl)propyl-N-4-methyl-4-formamidobutylammonium chloride starting with N-(4-diethylamino-1-methylbutyl)formamide and 2',4-dichloro-4'-nitrobutyranilide;

N,N-dimethyl-N-(N-methyl-4-amino - 2-chlorophenylcarbamyl)methyl - N - 3 - phthalamidopropylammonium chloride starting with N-(3-dimethylaminopropyl)phthalamic acid and 2,2'-dichloro-N-methyl-4'-nitroacetanilide;

N,N-Bis(2-hydroxyethyl) - N - (3-amino-4-methoxybenzyl)-N-3-formamidopropylammonium chloride starting with N - (3 - diethanolaminopropyl)formamide and 4-methoxy-3-nitrobenzyl chloride;

1-[2-(3 - Amino - 4 - methylphenyl)ethyl]-1-2-formamidoethyl)-4-formylpiperazinium chloride starting with N - [2 - (4-formylpiperazinoethyl]formamide and 2-(4-methyl-3-nitrophenyl)ethyl chloride;

N-Ethyl-N-1-methylbutyl - N - [2 - (2-ethyl-4-aminophenylcarbamyl)ethyl] - N - 2 - propionamidoethylammonium chloride starting with N-[2-(N-ethyl-N-1-methylbutyl)aminoethyl]propionamide and 3-chloro-2'-ethyl-4'-nitropropionanilide;

N,N-Dimethyl - N - 3 - (4-aminophenyl)-propyl-N-6-iso-butyramidohexylammonium chloride starting with N-(6-dimethylaminohexyl)iso-butyramide and 3-(4-nitrophenyl)propyl chloride;

N-Methyl - N - ethyl-N-3-(4-aminophenyl)propyl-N-2-(N-methylpropionamido)ethylammonium bromide starting with N-methyl-N-[2-(N-ethyl-N-methyl)aminoethyl]propionamide and 3-(4-nitrophenyl)propyl bromide;

N,N-Dimethyl-N-(3-amino - 4 - methoxyphenyl)-N-3-[N - (3 - hydroxypropyl)formamido]propylammonium iodide starting with N-(3-hydroxypropyl)-N-(3-dimethylaminopropyl)formamide and 3-nitro-4-methoxybenzyl iodide;

N-Methyl-N-2-(4-methyl - 3 - aminophenyl)ethyl-N,N-bis[3-(N-methylformamido)propyl]ammonium bromide starting with N,N - bis[3 - (N-methylformamido)propyl]methylamine and 2-(4-methyl-3-nitrophenyl)ethyl bromide;

N-(3-Amino - 4 - methoxybenzyl)-N-2-(N-isopropyl-acrylamido)ethylpiperidinium chloride starting with N-isopropyl-N-(2-piperidinoethyl)acrylamide and 4-methoxy-3-nitrobenzyl chloride;

N,N-Di-*n*-propyl-N-(4-amino - N -methyl - 2 - chlorophenylcarbamyl)methyl - N - 1 - methyl-2-(N-ethyl-*p*-nitrobenzamido)ethylammonium chloride starting with 2,2'-dichloro-N-methyl-4'-nitroacetanilide and N-ethyl-N - (2 - di - *n* - propylamino-2-methylethyl)p-nitrobenzamide;

N - Methyl-N-2-(N-methylacetamido)ethyl-N-2-ethyl-4-(3-chloro - 4 - aminophenyl)butyl-N-3-(N-methylacetamido)propylammonium chloride starting with N-[3-(N-methylacetamido)propyl] - N - [2-(N-methylacetamido)ethyl]methylamine and 2-ethyl-4-(3-chloro-5-nitrophenyl)butyl chloride;

N-(4-Amino - N - methyl - 2 - chlorophenylcarbamyl)methyl - N - 3 - (N-methyl-*n*-valeramido)propylpyrrolidinium chloride starting with N-methyl-N-(3-pyrrolidinylpropyl)valeramide and 2,2'-dichloro-N-methyl-4'-nitroacetanilide;

N-Allyl-N-ethyl - N - 6 -(N-ethyl-4-aminophenylcarbamyl)hexyl - N - 2 - (4-chlorobenzamido)ethylammonium chloride starting with N - [2 - (N - allyl-N-ethyl)aminoethyl]p-chlorobenzamide and 7-chloro-N-ethyl-4'-nitroheptanoanilide;

N-Methyl-N-2-(N-*n*-propyl - 4-aminophenylcarbamyl)-2-*n*-propylethyl - N - 2 - acetamidoethyl-N-3-acetamidopropylammonium chloride starting with N-[3-(N-methyl-N-2-acetamidoethyl)aminopropyl]acetamide and 3-chloro-, 2-di(*n*-propyl)-4'-nitropropionanilide;

N-(3-Amino - 4 - methoxybenzyl)-N-2-acrylamidoethylpiperidinium chloride starting with N-(2-piperidinoethyl)acrylamide and 4-methoxy-3-nitrobenzyl chloride;

N-*n*-Butyl - N - isopropyl-N-[4-(3-amino-4-isobutylphenylcarbamyl)]*n*-butyl - N - phenylacetamidoethylammonium chloride starting with N-[2-(N-*n*-butyl-N-isopropyl)aminoethyl]phenylacetamide and 5-chloro-4'-*iso*-butyl-3'-nitrovalerylanilide;

N-(4-Amino - N - methyl - 2-chlorophenylcarbamyl)methyl - N - 3-*n*-valeramidopropylpyrrolidinium chloride starting with N-(3-pyrrolidinylpropyl)valeramide and 2,2'-dichloro-N-methyl-4'-nitroacetanilide;

N,N-Diallyl - N - 1 - methyl-3-(4-amino-3-bromophenyl)propyl - N - 2 - phenylpropionamidoethyl ammonium chloride starting with N-(2-diallylaminoethyl)phenylpropionamide and 1-methyl-3-(3-bromo-4-nitrophenyl)propyl chloride;

N,N-Diethyl - N - 2,2 - dimethyl-2-(4-amino-2-*n*-butoxyphenylcarbamyl)ethyl - N - 5 - (2-methylacrylamidopentyl)ammonium chloride starting with N-(2-diethylaminopentyl) - 2 - methylacrylamide and 3-chloro-2,2-dimethyl-2'-n-butoxy-4'-nitropropionanilide;

N,N-Diisopropyl - N - 2 - ethyl-4-(5-amino-3-chlorophenyl)butyl - N - 2-(4-methoxybenzamido)ethylammonium chloride starting with N-(2-diisopropylaminoethyl)p-methoxybenzamide and 2-ethyl - 4 - (3-chloro-5-nitrophenyl)butyl chloride;

N,N-Diisopentyl - N - 5 - (5-amino-2-propoxyphenylcarbamyl)pentyl - N-2-butyramidoethylammonium chloride starting with N-(2-diisopentylaminoethyl)butyramide and 6-chloro-2'-*n*-propoxy-5'-nitrohexanoanilide;

N,N - Dihexylamino-N-6-(3-amino-4-methoxyphenyl)hexyl-N-2-*n*-caproamidoethylammonium chloride starting with N-(2-dihexylaminoethyl)*n*-caproamide and 6-(4-methoxy-3-nitrophenyl)hexyl chloride;

1-Benzyl - 4 - formyl - 1-(4-amino-2-chlorophenylcarbamyl)polypiperazinium chloride starting with 1-benzyl-4-formyl piperazine and 2',4-dichloro-4'-nitrobutyranilide;

N,N-Diisobutyl - N - 2-(3-amino-4-methylphenyl)ethyl-N-6-acetamidohexylammonium chloride starting with N-(6-diisobutylaminohexyl)acetamide and 2-(4 - methyl-3-nitrophenyl)ethyl chloride;

N,N-Diethyl-N-1-methyl - 3 - (3-bromo-4-aminophenyl)propyl-N-3-methyl - 3 - acrylamidopropylammonium chloride starting with N-(1-methyl-3-diethylaminopropyl)acrylamide and 1-methyl-3-(3-bromo-4-nitrophenyl)propyl chloride;

1 - Ethyl - 4 - propionyl-1-(4 - aminophenylcarbamylmethyl)piperazinium chloride starting with 1-ethyl-4-propionyl piperazine and 2-chloro-4'-nitroacetanilide;

N,N-di-*n*-propyl-N-(3 - amino - 4 - methoxybenzyl)-N-1-methyl-2-(*p*-nitrobenzamido)ethylammonium chloride starting with N-(2-di-*n*-propylamino-2-methylethyl)-*p*-nitrobenzamide and 4-methoxy-3-nitrobenzyl chloride;

N-Methyl-N-(4 - amino - 2 - iodobenzyl)-N,N'-bis(3-formamidopropyl)ammonium chloride starting with N,N-bis(3-formamidopropyl)methylamine and 4-nitro-2-iodobenzyl bromide;

N,N-Diethyl-N-6-(3 - amino - 4 - butoxyphenyl)hexyl-N-3-formamidopropylammonium chloride starting with N-(3-diethylaminopropyl)formamide and 6-(4 - butoxy-3-nitrophenyl)hexyl chloride;

N-Ethyl-N-1-methylbutyl-N-1-methyl - 3 - (4-amino-3-bromophenyl)propyl-N-2 - propionamidoethylammonium chloride starting with N-[2-N-ethyl-N - 1-methylbutyl)aminoethyl]propionamide and 1 - methyl-3-(3-bromo-4-nitrophenyl)propyl chloride;

N-(2-(4 - amino-3-*n*-butylphenyl)ethyl-N-2-(N - isopropylacrylamido)ethylpiperidinium bromide starting with N-isopropyl-N-(2 - piperidinoethyl)acrylamide and 2-(3-*n*-butyl-4-nitrophenyl)ethyl bromide;

N,N-Diallyl-N-4-amino - 3 - fluorobenzyl-N-2-phenylpropionamidoethylammonium chloride starting with N-(2-diallylaminoethyl)phenylpropionamide and 3-fluoro-4-nitrobenzyl chloride;

N - Methyl-N-ethyl-N-3-amino - 5 - ethylbenzyl-N-2-(N-methylpropionamido)ethylammonium chloride starting with N-methyl-N-[2-(N-ethyl-N-methyl)aminoethyl]propionamide and 2-ethyl-5-nitrobenzyl chloride;

N,N - Bis(2 - hydroxyethyl)-N-2(N-*n*-propyl-4-aminophenylcarbamyl) - 2 - *n* - propylethyl-N-2,2-dimethyl-2-benzamidoethylammonium chloride starting with N-(2-diethanolamino-1,1 - dimethylethyl)phenylacetamide and 3-chloro-N,2-di(*n* - propyl) - 4' - nitropropionanilide;

1-(2-Hydroxyethyl) - 4 - (3-methylbenzamido)-1-[6-(3-amino - 4 - methoxyphenyl)hexyl]piperazinium chloride starting with 1-(2-hydroxyethyl)-4-(*m*-toluoyl)piperazine and 6-(4-methoxy-3-nitrophenyl)hexyl chloride;

N - Methyl - N - isopropyl-N-2-ethyl-4-(3-chloro-4-aminophenyl)butyl - N - 3-salicylamidopropylammonium chloride starting with N-[3 - (N-isopropyl-N-methyl)aminopropyl]salicylamide and 2-ethyl-4-(3-chloro-5-nitrophenyl)butyl chloride; and 1-Methallyl -4 - valeryl-1-[2-(3-amino-4-methylphenyl)ethyl]piperazinium chloride starting with 1-methallyl-4-valeryl-piperazine and 2 - (4-methyl-3-nitrophenyl)ethyl chloride.

The foregoing N-R¹-N-[(lower-alkylene)¹-Y¹NH₂]-N-R²-N-[(lower-alkylene) - NR⁰COR] ammonium halide intermediates are of course, useful for preparing the compounds of Formula VII in which Y is —COR. In addition, they may be hydrolyzed by a procedure similar to that in C–4 hereinabove to obtain the corresponding N-R¹-N-[(lower - alkylene)¹-Y¹NH₂] - N-R²-N-[(loweralkylene)-NR⁰H]ammonium halide intermediates which are useful for and afford an alternate method for preparing the final products of Formula VII in which Y is hydrogen.

D. N-R¹-N-[(Lower - Alkylene)¹-Y²-H]-N-R²-N-[(Lower-Alkylene)-NR⁰Y]Quaternary Ammonium Intermediates (Formula XI)

1. N,N-Dimethyl-N-2-(N'-ethylanilino)ethyl-N-3-formamidopropylammonium chloride

A stirred mixture of 157 parts of N-(3-dimethylaminopropyl)formamide in 20.0 parts of water was heated to 80° C. and over a period of one and one half hours there was added 171 parts of N-ethyl-N-(2-chloroethyl) aniline. The reaction mixture was heated at 95–100° C. until a small sample when diluted with water gave a clear solution. After about seven hours of heating at 95–100° C. there was obtained N,N-dimethyl-N-2-(N'-ethylanilino)ethyl-N-3 - formamidopropylammonium chloride in the form of an aqueous solution.

2. N,N-Dimethyl-N-2-(N'-ethylanilino)ethyl-N3-aminopropylammonium chloride

Dilute hydrochloric acid hydrolysis of N,N-dimethyl-N - 2 - (N' - ethylanilino)ethyl-N-3-formamidopropylammonium chloride following a procedure similar to that of C–4 above gives N,N-dimethyl-N-2-(N' - ethylanilino) ethyl-N-3-aminopropylammonium chloride.

When the indicated tert. amino compound is quaternized with the indicated N-R⁷-N-(halo-lower-alkylene)-substituted aniline or aminonaphthalene according to a procedure similar to that of D–1 above, the following N-R¹-N-[(lower-alkylene)¹-Y²-H] - N - R² - N - [(lower-alkylene)NR⁰COR]ammonium halide intermediates are obtained:

N-Ethyl-N-1 - methylbutyl-N - 4 - (N-ethylanilino)butyl-N-2-(N - propylpropionamido)ethylammonium chloride from N-[2-N-ethyl-N-1-methylbutyl]aminoethyl]propionamide and N-ethyl-N-(4-chlorobutyl)aniline;

N,N-Dimethyl-N-3-ethyl - 4 - (N-methylanilino)butyl-N-6-iso-butyramidohexylammonium chloride from N-(6-dimethylaminohexyl)iso-butyramide and N-methyl-N-(2-ethyl-4-chlorobutyl)aniline;

N-6-(N - Propylanilino)hexyl - N - 2-acrylamidoethylpiperidinium chloride from N-(2-piperidinoethyl)acrylamide and N-n-propyl-N-(6-chlorohexyl)aniline;

N-2-(N - Ethylanilino)ethyl-N-3-valeramidopropylpyrrolidinium chloride from N-(3-pyrrolidinylpropyl)valeramide and N-ethyl-N-(2-chloroethyl)aniline;

N,N - Diallyl - N - 2,2-dimethyl-3-anilinopropyl-N-2-phenylpropionamidoethylammonium chloride from N-(2-diallylaminoethyl)phenylpropionamide and N-(2,2-dimethyl-3-chloropropyl)aniline;

1-Benzyl - 4 - formyl-1-[4-(N-n-butylanilino)-2,3-dimethylbutyl]piperazinium chloride from 1-benzyl-4-formyl piperazine and N-n-butyl-N-(2,3-dimethyl-4-chlorobutyl)aniline;

N,N - Diethyl-N-3-(2 - naphthylamino)propyl - N - 3-methyl-3-acrylamidopropylammonium chloride from N-(1-methyl - 3-diethylaminopropyl)acrylamide and N-(3-chloropropyl)-2-naphthylamide;

1 - (2 - Hydroxyethyl)-4-(m-toluoyl)-1-(2-methyl-N-ethyl-1-naphthylamino)propylpiperazinium chloride from 1 - (2 - hydroxyethyl)-4-(m-toluoyl)piperazine and N-ethyl-N-(2-methyl-3-chloropropyl)-1-naphthylamine;

N,N - Bis(2 - hydroxyethyl)-N-5-(N-isopentylanilino) pentyl - N - 2,2 - dimethyl-2-phenylacetamidoethylammonium chloride from N-(2 - diethanolamino-1,1-dimethylethyl)phenylacetamide and N - isopentyl - N-(5-chloropentyl)aniline;

N - Methyl - N-isopropyl-N-5-(N-methyl-1-naphthylamino) - pentyl-N-3-salicylamidopropylammonium chloride from N - [3-(N-isopropyl-N-methyl)aminopropyl] salicylamide and N-methyl-N-(5-chloropentyl) - 1-naphthylamine;

N - Methyl - N-3-formamidopropyl-N-2-(N-tert.-butyl-2 -naphthylamino)ethyl - N - 3-formamidopropylammonium chloride from N,N-bis(3-formamidopropyl)methylamine and N - tert.-butyl-N-(2-chloroethyl)-2-naphthylamine;

N - Methyl-N-4-(N-ethylanilino)butyl-N-2-acetamidoethyl - N-3-acetamidopropylammonium chloride from N-[3 - (N-methyl-N-2-acetamidoethyl)aminopropyl]acetamide and N-ethyl-N-(4-chlorobutyl)-aniline;

N,N - Dimethyl-N-4-(N-ethylanilino)butyl-N-3-[N-(3-hydroxypropyl)formamido]propylammonium chloride from N - (3-hydroxypropyl)-N-(3-dimethylaminopropyl) formamide and N-ethyl-N-(4-chlorobutyl)aniline;

N - Methyl - N-3-ethyl-4-(N-methylanilino)butyl-N,N-bis-[3-(N-methylformamido)propyl]ammonium chloride from N,N - bis[3-(N-methylformamido)propyl]methylamine and N - methyl-N-(2-ethyl-4-chlorobutyl)aniline; and N,N - Di-n-propylamino-N-2,2-dimethyl-3-anilinopropyl-N-1 - methyl - 2-(N-ethyl-p-nitrobenzamido)ethylammonium bromide from N-ethyl-N-(2-di-n-propylamino-2-methylethyl)p - nitrobenzamide and N-(2,2-dimethyl-3-chloropropyl)aniline.

The foregoing N-R¹-N-[(lower-alkylene)¹-Y²-H]-N-R²-N-[(lower-alkylene)NR⁰COR]ammonium halide intermediates can of course, be used directly to produce the compounds of Formula VIII in which Y is —COR. Additionally, they may be hydrolyzed by a procedure similar to that described in C–4 hereinabove to obtain the corresponding N - R¹-N-[(lower-alkylene)¹-Y²-H]-N-R²-N-[(lower-alkylene)NR⁰H]ammonium halide intermediates which are useful for and afford an alternate method for preparing the final products of Formula VIII in which Y is hydrogen.

E. N-R⁸-N-[(Lower-Alkylene)-Y³-NH₂]-N-R⁹-N-R¹⁰ Quaternary Ammonium Intermediates (Formula XII)

1. N-(3-amino-4-methoxybenzyl)-N,N,N-trimethylammonium chloride (a) To a stirred solution of 35.0 parts of trimethylamine in 105 parts of water there was added over a one and one-half hour period 100.8 parts of 4-methoxy-3-nitrobenzyl chloride. The reaction mixture was heated at approximately 50° C. for three and a half hours and was then diluted with an additional 50 parts of water. The solution was allowed to cool to about 25° C. and the pH was adjusted to 4.9 by the addition of dilute acetic acid. The solution was clarified by filtration and was used directly for reduction of the thus obtained N-(3-nitro-4-methoxybenzyl) - N,N,N-trimethylammonium chloride dissolved therein.

(b) The aqueous solution of N - (3-nitro-4-methoxybenzyl)-N,N,N-trimethylammonium chloride obtained in (a) was heated to approximately 85° C. Then 110 parts of iron powder was added at a rate sufficient to maintain a temperature in the range 85°–90° C. without further external heating. At the end of the addition, heating was resumed at 85°–90° C. for one hour and then the reaction was set aside at room temperature overnight. The reaction mixture was heated to 80° C. and the pH adjusted to approximately 8.0 by the addition of a dilute aqueous solution of sodium carbonate. The mixture was allowed to cool to approximately 45° C. and was then filtered with the aid of 3 parts of decolorizing charcoal. A sample of the clear solution was analyzed for free amine content by diazotization using a standardized sodium nitrite solution. The analytical results showed that N-(3-amino - 4 - methoxybenzyl)-N,N,N-trimethylammonium chloride was obtained in nearly quantitative yield. The product was used directly in the form of its aqueous solution without isolation.

2. N-(3-amino-4-methoxybenzyl)-N-(2-hydroxyethyl)-N,N-dimethylammonium chloride (a) A stirred solution of 46.4 parts of dimethylaminoethanol in 50 parts of water was heated to 50° C. and over a period of two hours there was added 100.8 parts of 4-methoxy-3-nitrobenzyl chloride. The reaction mixture was heated at 50°–55° C. for three hours longer and then set aside at room temperature overnight. The mixture was filtered and the clear filtrate containing the product, N - (3-nitro-4-methoxybenzyl)-N-(2-hydroxyethyl) - N,N-dimethylammonium chloride, was used directly for reduction of the nitro group.

(b) A mixture of 150 parts of iron powder, 80 parts of water and 10 parts of concentrated hydrochloric acid was stirred vigorously and heated to 90° C. Heating was stopped and 259.1 parts of the aqueous solution of N-(3 - nitro-4-methoxybenzyl)-N-(2-hydroxyethyl)-N,N-dimethylammonium chloride obtained in (a) above was added at a rate sufficient to maintain the temperature at 85°–90° C. After the addition was complete, heating at 85°–90° C. was continued for one hour. Then 6.0 parts of sodium carbonate was added and the mixture was cooled to 40° C. and filtered. A sample of the solution was analyzed for free amine content by diazotization using a standardized sodium nitrite solution. The analytical results showed that the solution contained 113.6 parts of the product, N-(3-amino-4-methoxybenzyl)-N-(2-hydroxyethyl) - N,N-dimethylammonium chloride. The product was used directly in the form of its aqueous solution without isolation.

3. N-(3-amino-4-methoxybenzyl)-N,N-bis(2-hydroxyethyl)-N-methylammonium chloride (a) A stirred solution of 61.9 parts of N-methyl diethanolamine in 100 parts of water was heated to 50° C. and over a period of one and a half hours there was added 201.6 parts of 4-methoxy-3-nitrobenzyl chloride. The reaction mixture was heated at 55°–60° C. for approximately six hours while adding in small amounts a total of 23.1 parts of N-methyl diethanolamine as needed in order to keep the reaction slightly alkaline. At the end of the heating period, the reaction mixture was diluted with 100 parts of water and was set aside at room temperature overnight. The next day the resulting slurry was filtered. The solid removed by filtration was dried to recover 61.2 parts of unreacted 4-methoxy-3-nitrobenzyl chloride. The clear filtrate containing the product, N-(3-nitro - 4 - methoxybenzyl)-N,N-bis(2-hydroxyethyl)-N-methylammonium chloride, was used directly for reduction of the nitro group.

(b) The aqueous solution of N-(3-nitro-4-methoxybenzyl)-N,N-bis(2-hydroxyethyl)-N - methylammonium chloride obtained in 3a above was made slightly alkaline by the addition of a small amount of 5 percent aqueous sodium hydroxide. Then 42 parts of sodium acetate were added to the solution and the mixture was heated to 65° C. Heating was stopped and 210 parts of iron powder were added to the stirred reaction mixture at a rate such as to maintain the temperature at 65°–70° C. without external heating. At the end of the addition, heating was resumed at 65°–70° C. for four hours. The reaction mixture was then treated with 7 parts of decolorizing charcoal and filtered to obtain an amber solution. A sample of the solution was analyzed for free amine content by diazotization using a standardized sodium nitrite solution. The analytical results showed that the solution contained 165 parts of N-(3-amino-4-methoxybenzyl)-N,N - bis(2 - hydroxyethyl)-N-methylammonium chloride. The product was used directly in the form of its aqueous solution without isolation.

4. N-(3-amino-4-methoxybenzyl)-N-(2-hydroxypropyl)-N,N-dimethylammonium chloride (a) Proceeding in a manner similar to that described above in 1a, 16 parts of 1-dimethylamino-2-propanol and 32 parts of 4-methoxy-3-nitrobenzyl chloride were interacted in 14 parts of water to obtain N-(3-nitro-4-methoxybenzyl)-N-(2-hydroxypropyl)-N,N - dimethylammonium chloride. The product was not isolated but was used directly in solution for reduction of the nitro group.

(b) Following a procedure similar to that described above in 1b, and using 33 parts of iron powder and 6 parts of acetic acid, the N-(3-nitro-4-methoxybenzyl)-N-(2-hydroxypropyl)-N,N-dimethylammonium chloride obtained in the form of its aqueous solution from 4a above was reduced to obtain 39.6 parts of N-(3-amino-4-methoxybenzyl)-N-(2-hydroxypropyl)-N,N-dimethylaminonium chloride in the form of an aqueous solution.

In addition to those for which detailed preparations are given above, the following N-$R^8$-N-[(lower-alkylene)-$Y^3$-$NH_2$]-N-$R^9$-N-$R^{10}$ quaternary ammonium intermediates are obtained when the indicated nitrophenyl-substituted quaternizing agent is interacted with the indicated tertiary amino compound according to a procedure similar to those given under 1a, 2a and 3a and the resulting nitro-substituted compound is reduced by a procedure similar to those given under 1b, 2b and 3b:

N-(4-amino-2-iodobenzyl)-N,N,N-tri - n - hexylammonium bromide starting with trihexylamine and 4-nitro-2-iodobenzyl bromide;

N-Methyl-N-n-propyl-N-6-(3-amino-4 - butoxyphenyl)hexyl-N-n-hexylammonium chloride starting with N-methyl-N-propylhexylamine and 6-(4-butoxy - 3 - nitrophenyl)hexyl chloride;

N,N-Diethyl-N-allyl-N-1-methyl-3-(4-amino-3 - bromophenyl)propylammonium chloride starting with N,N-diethylallylamine and 1-methyl-3-(3-bromo-4-nitrophenyl)propyl chloride;

N,N-Di-n-butyl-N-3-hydroxypropyl-N-2-(4 - amino - 3 - n-butylphenyl)ethylammonium bromide starting with 3-di-n-butylamino-1-propanol and 2-(3-n-butyl - 4 -nitrophenyl)ethyl bromide;

N-Methyl-N-allyl-N-6-n-hydroxyhexyl-N-4-amino - 3 - fluorobenzylammonium chloride starting with 6-methylallylamino-1-hexanol and 3-fluoro-4-nitrobenzyl chloride;

N,N-Di(3-hexenyl)-N-2-hydroxyethyl-N-3 - amino - 5 - ethylbenzylammonium chloride starting with 2-di(3-hexenyl)aminoethanol and 2-ethyl-5-nitrobenzyl chloride;

N-(2-Butenyl)-N-n-pentyl-N-vinyl-N-1-methyl - 3 - (4-amino-3-bromophenyl)propylammonium bromide starting with N-2-butenyl-N-vinyl-n-pentylamine and 1-methyl - 3-(3-bromo-4-nitrophenyl)propyl bromide;

N-n-Propyl-N-2-hydroxyethyl-N-3 - hydroxypropyl - N-4-(4-aminophenyl)butylammonium chloride starting with 3-(N-n-propyl-N-2-hydroxyethyl)amino-1 - propanol and 4-(4-nitrophenyl)butyl chloride;

N,N-Di(2-hydroxyethyl)-N-allyl-N-2-ethyl-4-(3-amino-5-chlorophenyl)butylammonium chloride starting with N-allyl diethanolamine and 2-ethyl-4-(3-chloro-5-nitrophenyl)butyl chloride;

N,N-Di-n-butyl-N-2-hydroxypropyl-N-2-(3 - amino - 4 - methylphenyl)ethylammonium chloride starting with 3-dibutylamino-2-propanol and 2-(4-methyl-3-nitrophenyl)ethyl chloride;

N-Methyl-N-isobutyl-N-3-hydroxybutyl-N - 4 - aminobenzylammonium iodide starting with N-3-hydroxybutyl-N-isobutylmethylamine and 4-nitrobenzyl iodide;

N-Methyl-N-tert.-butyl-N-methallyl-N-3 - amino - 4 - methoxybenzylammonium chloride starting with N-methallyl-N-methyl-tert.-butylamine and 4-methoxy-3 - nitrobenzyl chloride.

PREPARATION OF THE PHTHALOCYANINE DYESTUFFS AND TESTING PROCEDURES

Example 1

To a solution containing 180 parts of N-(3-dimethylaminopropyl)formamide in 785 parts of isopropyl alcohol were added 179.4 parts of tetrakis(chloromethyl)copper phthalocyanine. The mixture was heated under reflux with constant stirring for 3 hours, after which time the mixture was allowed to cool and the lumpy solid was removed by filtration. The filter cake was washed well with isopropyl alcohol. The resulting highly water-soluble, brilliant turquoise powder was purified by dissolving it in water, precipitating the dye with acetone, and collecting the product by filtration. The filter cake was washed well with isopropyl alcohol and was dried at 75–80° C. Chemical analysis of the product showed that an average of approximately two of the chloromethyl groups reacted to form quaternary ammonium groups and an average of approximately two of the chloromethyl groups reacted with the isopropyl alcohol solvent to form isopropoxy groups.

Chromaticity data were determined by test procedures outlined below on handsheets dyed with the dyestuff prepared as above by incorporating the dyestuff with aqueous slurries of paper-pulp in an amount equal to about 0.1 percent by weight based upon the weight of dry pulp. These data showed that the dominant wavelength (shade) of the dyed handsheet was 486.4 millimicrons and the excitation purity was 24.2. The tristimulus Y value (brightness to the eye) was 63.1.

An aqueous solution containing 0.03 g. of this dyestuff per liter of solution had two maxima in the visible absorption spectrum: at 618 millimicrons, $A=1.27$ and at 665 millimicrons, $A=0.88$.

In the bleach test described below, papers dyed with this dyestuff were found to be highly bleachable. The dye was found to bleed slightly in the water-bleed test and in the soap-bleed test.

When the above preparation was repeated using dimethylformamide as the reaction medium, the product again precipitated from the reaction mixture as quaternization proceeded. The resulting product contained an average of between two and three quaternary ammonium groups of the formula

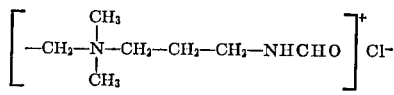

When the reaction was conducted in ethylene glycol, the dyestuff above, containing in addition a minor quantity of hydroxyethoxymethylene substitution, was obtained.

When the reaction was conducted in water, the quaternized final product remained in solution and more complete quaternization of the chloromethyl was attained. However, it is likely that a certain amount of hydrolysis of chloromethyl substitutents to hydroxymethyl substituents occurred to yield predominately the dyestuff of the formula

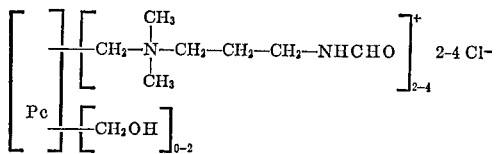

The dyestuff prepared in water was somewhat greener in shade than the dyestuff prepared in either isopropyl alcohol or dimethylformamide.

When this reaction is repeated and into the reaction medium is introduced a quantity of phenol, an amine, for example triethylamine, morpholine, ethanolamine, and dibutylamine, or a hydrazine, for example, hydrazine hydrate, unsymmetrical dimethylhydrazine, and isopropylhydrazine in an amount equivalent to one to two molecular equivalents for each molecular equivalent of phthalocyanine reactant, a dyestuff containing an average of from one to two phenoxy, amino, or hydrazino substituents, respectively, is obtained.

Testing procedures

The following test procedures were employed to determine the relative shades of the dyestuffs produced and to determine the resistance of the dyestuffs to bleed in moist paper, bleed from paper in the presence of soap, and to bleaching with hypochlorite bleach.

Shade

Chromaticity values of dominant wavelength and excitation purity are determined by measuring the reflectance tristimulus values of dyed handsheet paper on a General Electric recording spectrophotometer in combination with a Librascope automatic tristimulus integrator and plotting the points on a chromaticity diagram according to the procedure described by A. C. Hardy, "Handbook of Colorimetry," The Technology Press, Massachusetts Institute of Technology, Cambridge, Mass., 1936.

The dominant wavelength is a measure of the shade imparted to the paper by the dye, and the excitation purity is a measure of the saturation or depth of the color. Inasmuch as the eye is more sensitive to minor variations in color than the most sensitive instrument, the shades imparted to test papers were also compared visually.

In some cases absorbance of aqueous solutions in the visible light region were measured by standard methods on a Perkin-Elmer Model 4000A Spectracord.

Water "Bleed" Test

This procedure is a modification of the AATCC Standand Test Method 15–1962, "Colorfastness to Perspiration."

Test pieces 1⅛ inch in diameter (approximately one square inch area) are cut from the dyed paper to be tested and marked, with lead pencil, to indicate sample and wire (or felt) side. One or more dyed papers of known dye migration quality are included in the test series as standards.

The absorbent material consists of filter paper having at least one side with smooth finish (Eaton-Dikeman No. 613, or equivalent) cut to 2 inch by 3 inch rectangles. In addition, smooth, flat, glass or clear plastic plates of adequate stiffness, measuring 2½ inches wide and 3 to 4½ inches long, are required as separating plates. A 500 gram weight serves as a dead weight loading.

Two filter paper absorbent pieces are used for each dyed paper test circle, one for each side. These are marked on the smoother surface (with lead pencil) prior to beginning the test to indicate the sample and the sample surface (wire or felt) which it will contact.

The migration test "sandwich" is constructed as follows. A separating plate is placed on a horizontal support and one piece of the filter paper placed centrally on this plate with the smoother side up. The circular dyed paper test piece, held by tweezers, is immersed in water at room temperature for 3 seconds, drained for 3 seconds, and immediately centered on the filter paper, making sure that side (wire or felt) identifications are correct. Immediately, the second piece of filter paper, smoother side downward, is centered on the test circle and followed at once by another separating plate. This "sandwich" is pressed for a moment with the fingers, after which, without delay, a piece of filter paper is positioned on the top separating plate as before to receive a second test circle of wetted dyed paper. The above procedure is then repeated as rapidly as possible and without interruption, stacking one "sandwich" on the other, until all dyed paper test pieces have been put under test.

As soon as a stack is completed a 500 gram weight is centered on the top separating plate, and the assembly shrouded with moisture vapor resistant film to avoid undue drying. The stack is allowed to stand at room temperature for 4 hours, during which time ambient temperatures are occassionally recorded.

At the end of the migration period the stack is disassembled, and each dyed paper test circle and its two filter paper absorbents clipped to a supporting card. A separate card is used for each test circle. The dyed paper test circles and filter papers are air dried at room temperature for at least two hours before ranking. Relative degrees of dye migration, as compared to that from standard samples, are determined by visual ratings, under Macbeth Northlight, of the intensity of dye stain on the filter paper surface which had been in contact with the test circle. Migration from the wire and felt sides are ranked separately.

Soap Bleed Test

This test compares the degree to which dyed papers will discolor a soap solution in which the paper is immersed.

A stock supply of soap solution containing 0.5% soap by weight is prepared by adding neutral white soap flakes (a mixture of 80 percent sodium soap and 20 percent potassium soap produced from 70 percent tallow and 30 percent coconut oil glyceride blend; "Ivory" brand, Proctor and Gamble Co.) slowly with stirring to hot tap water and then heated further with occasional stirring to 70–75° C.

Portions of 400 ml. of this solution are measured into 1,000 ml. beakers (one beaker for each test), covered with a watch glass, and allowed to cool to 60–65° C. At this point approximately 1.5 grams of the dyed paper (one half of a 3.0 gram, 8 inch square handsheet) is crumpled and immersed in its soap test solution.

Soaking is allowed to continue for 20 to 24 hours, with gradual cooling to room temperature. During this period the paper is squeezed by hand while submerged (or stirred vigorously with a glass rod) on at least three occasions during the first five hours, and again about one hour before ending the test period.

At the end of the immersion period the beaker contents are stirred and enough immediately screened through a double screen of 100 mesh stainless steel screening to nearly fill a two ounce, square clear glass bottle, which is then capped. These filtrates are then visually rated for color intensity under laboratory ceiling fluorescent tube lights.

Bleach Test

This procedure compares the degree to which the color of dyed or shade papers would be discharged in a waste paper recovery operation employing hypochlorite bleach.

Test pieces measuring ¾ inch by 1½ inch are die cut from the papers to be compared and identified, using lead pencil markings.

A stock supply of hypochlorite bleach is prepared by diluting commercial hypochlorite bleach (nominal available chlorine content, 5.0%) with distilled water to a concentration of 0.09 grams available chlorine per 100 ml. solution. Before diluting this solution to final volume the pH is adjusted with dilute sulfuric acid to pH 4.0 to 4.5.

Portions of 20 ml. each of the hypochlorite stock solution, at room temperature, are measured into test tubes 1 inch in diameter and 7 to 8 inches long, one tube for each test specimen. An extra such tube is prepared, fitted with a thermometer extending into the bleach solution, to follow the rise in bleach temperature.

One paper test piece is then dropped into each tube and submerged in the bleach liquor, adding all pieces as quickly as possible. The tubes are immediately stoppered and all simultaneously placed in a water bath previously heated to 54 to 56° C. (129 to 133° F.).

The test pieces are observed, especially during the very early minutes of bleaching, for obvious differences in the rate of color discharge. The temperature of the bleach liquors rises rapidly during the first 5 minutes.

While maintaining the water bath temperature in the 54 to 56° C. range, the bleach tubes remain, without agitation of the test pieces, in the water bath for 30 minutes. Occasional readings of the temperature of the "blank" bleach tube during this period are recorded.

At the end of this time all tubes are removed from the water bath, immediately filled with cold tap water, and the test pieces rinsed as quickly as possible, with cold tap water, into a large Buchner funnel (with no filter paper disk) where they are thoroughly washed with running cold tap water. The washed test pieces are finally placed on a blotter and air dried at room temperature.

The relative degree of bleaching is judged by visually ranking, under Macbeth Northlight, the intensity of residual color in the dry test pieces.

Example 2

An aqueous solution of copper phthalocyanine bis(isopropoxymethyl) bis(methylene 3-formamidopropyl dimethylammonium chloride) prepared in isopropyl alcohol as described in Example 1B from 89.4 parts of tetrakis (colormethyl)copper phthalocyanine and 21.2 parts of N-(3 - dimethylaminopropyl)formamide was heated in 75 parts of water containing 12 parts of concentrated hydrochloric acid for about two hours. The reaction mixture was then neutralized with 50 percent aqueous sodium hydroxide. A portion of this solution was filtered through diatomaceous earth, and isopropyl alcohol was slowly added to the filtrate until precipitation just started. When precipitation of the product was complete, the solid was collected on a filter, washed with isopropyl alcohol, and dried at 85° C. Elemental analysis of this product showed that it consisted of a mixture of copper phthalocyanines substituted by an average of approximately two

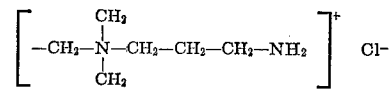

moieties and approximately two isopropoxymethyl moieties.

Chromaticity data based on the spectral reflectance of paper handsheets prepared as described above showed a dominant wavelength of 486.6 millimicrons (slightly greener than the formamide derivative of Example 1) and an excitation purity of 24.4. The tristimulus Y value of brightness was 62.6.

In the bleach test, this dye was found to have excellent bleachability properties not significantly different from the formyl-substituted dyestuff described in Example 1. However, compared to said formyl-substituted dyestuff, this dyestuff showed significantly superior resistance to bleed in both the water bleed and the soap bleed tests.

Example 3

Seven parts of tetrakis(chloromethyl)copper phthalocyanine and 12 parts of N-(3-dimethylaminopropyl)formamide were refluxed in 32 parts of dry methanol for three hours. The reaction mixture was then cooled and filtered through diatomaceous earth. The filtrate was poured into 400 ml. of isopropyl alcohol and the precipitate was collected on a filter, washed well with isopropyl alcohol, and dried. Elemental analysis showed that this product was essentially the tetrakis(quaternary ammonium) compound of the formula

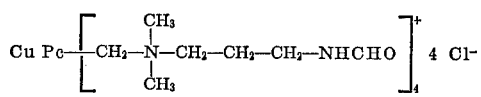

The dyestuff was highly water-soluble and imparted a brilliant turquoise color to paper.

The visible absorption spectrum of an aqueous solution of this dyestuff containing 0.03 g. of dye per liter of solution had two maxima: at 626 millimicrons, A=1.14; at 672 millimicrons, A=1.375.

Hydrolysis of the above product according to the procedure described in Example 2 yields the compound copper phthalocyanine tetrakis(methylene dimethyl 3-aminopropylammonium chloride) of the formula

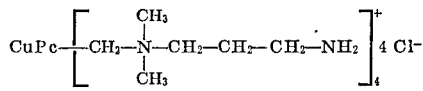

When this reaction is carried out using tetrakis(chloromethyl)phthalocyanine (unmetallized) the corresponding unmetallized water-soluble tetrakis(quaternary ammonium)phthalocyanine dyestuff is obtained.

Example 4

Following the procedure given in Example 1, tetrakis (chloromethyl)copper phthalocyanine was caused to react with six molecular equivalents of 1-methyl-4-formyl-piperazine in acetonitrile by heating the mixture at reflux for 27 hours. The mixture was allowed to cool, and the precipitated product was collected on a filter and washed thoroughly with isopropyl alcohol.

The product, which was highly water-soluble, consisted of a mixture of copper phthalocyanine substituted with from two to four (methylene 4-formyl-1-methylpiperazinium chloride) radicals, and having the formula

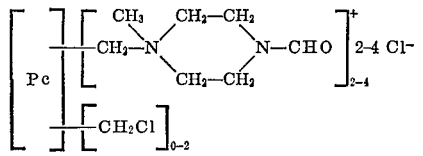

The visible absorption spectrum of an aqueous solution of this dyestuff, containing 0.03 g. of dye per liter of solution, showed two maxima: at 614 millimicrons, A=1.16; at 670 millimicrons, A=0.68.

Hydrolysis of the above-mentioned formamide compound according to the method described in Example 2 yielded a mixture of copper phthalocyanines substituted with from two to four (methylene 4-methylpiperazinium chloride) radicals, and having the formula

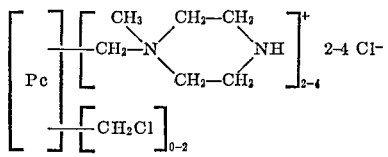

The visible absorption spectrum of an aqueous solution of this dyestuff, containing 1.5 g. of dye per liter of solution, showed two maxima: at 613 millimicrons, A=1.35; at 670 millimicrons, A=0.69.

Example 5

Following the procedure given in Example 1, tetrakis (chloromethyl)copper phthalocyanine was refluxed in isopropyl alcohol with six molecular equivalents of N-(3-dimethylaminopropyl)acetamide for three hours. When cool, the reaction mixture was poured into acetone to precipitate the partially-soluble product, which was then collected on a filter and washed well with acetone. The resulting product, consisting primarily of a dyestuff of the formula

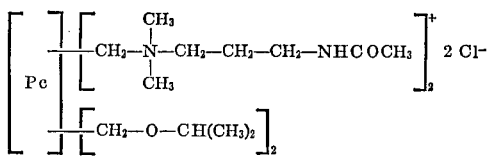

was a brilliant blue powder which was readily soluble in water, leaving no residue.

The visible absorption spectrum of an aqueous solution of this dyestuff containing 0.04 g. of dye per liter of solution showed two maxima: at 620 millimicrons, A=1.4; and at 668 millimicrons, A=1.22.

Chromaticity values of paper handsheets prepared as described in Example 1 showed that the dominant wavelength was 986.6 millimicrons and the excitation purity was 24.0. The tristimulus Y value of brightness was 63.7.

No significant difference was found on the bleachability of paper dyed with this dyestuff in comparison with the dyestuffs described in Examples 1 and 2. In the soap bleed test, this dyestuff showed somewhat less resistance to bleed than did the dyestuff of Example 1.

Example 6

Following the procedure given in Example 1, tetrakis (chloromethyl)copper phthalocyanine was caused to react with six molecular equivalents of N-(4-diethylamino-1-methylbutyl)formamide in acetonitrile by heating the mixture at reflux for 24 hours. The mixture was allowed to cool, and the precipitated product was collected on a filter and washed with acetone.

The water-soluble product consisted of a mixture of copper phthalocyanines substituted with from two to four

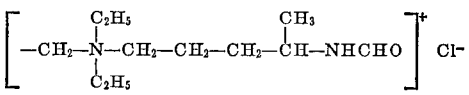

moieties and with 0 to 2 chloromethyl moieties.

The visible absorption spectrum of an aqueous solution of this dyestuff, containing 0.03 g. of dye per liter of solution showed two maxima: at 619 millimicrons, A=1.04; at 670 millimicrons, A=0.705.

Hydrolysis of the above-mentioned formamide compound according to the method described in Example 2 yielded a mixture of copper phthalocyanines having the formula

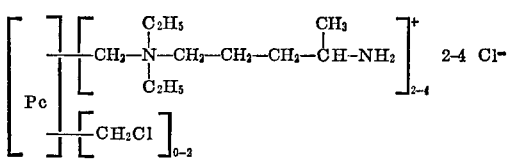

The visible absorption spectrum of an aqueous solution of this dyestuff, containing 0.75 g. of dye per liter of solution showed two maxima: at 624 millimicrons, A=1.262; at 671 millimicrons, A=1.08.

Example 7

Following the procedure given in Example 1, a mixture of tetrakis(chloromethyl)copper phthalocyanine and six molecular equivalents of N-(3-diethylaminopropyl) formamide in acetonitrile was heated at reflux for 14 hours. The mixture was allowed to cool, and the precipitated product was collected on a filter. After drying there was obtained a mixture of copper phthalocyanines substituted with from two to four

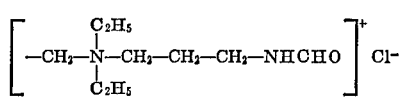

moieties and from 0 to 2 chloromethyl moieties.

The visible absorption spectrum of an aqueous solution of this dyestuff, containing 0.03 g. of dye per liter of solution showed two maxima: at 615 millimicrons, A=1.09; at 670 millimicrons, A=0.64.

Hydrolysis of the above-mentioned formamide compound according to the method described in Example 2 yielded a mixture of copper phthalocyanines having the formula $$\left[Pc\right]\left[\begin{array}{c}-CH_2-N(C_2H_5)-CH_2-CH_2-CH_2NH_2\\C_2H_5\end{array}\right]_{2-4}^+\left[-CH_2Cl\right]_{0-2} \quad 2-4\ Cl^-$$

The visible absorption spectrum of an aqueous solution of this dyestuff, containing 0.75 g. of dye per liter of solution, showed two maxima: at 618 millimicrons, $A=1.16$; at 670 millimicrons, $A=0.72$.

Example 8

Proceeding in a manner similar to that described above in Example 1, a mixture of tetrakis(chloromethyl)copper phthalocyanine and six molecular equivalents of N,N-bis(3-formamidopropyl)methylamino in acetonitrile was heated at reflux for four hours. The mixture was allowed to cool and the coagulated product was collected on a filter, and washed with isopropyl alcohol. The product was dried at 90° C. *in vacuo* to obtain a product consisting primarily of a dyestuff of the formula $$\left[Pc\right]\left[-CH_2-N\begin{array}{c}CH_3\\ \\CH_2-CH_2-CH_2-NHCHO\\CH_2-CH_2-CH_2-NHCHO\end{array}\right]_2^+\left[-CH_2Cl\right]_2 \quad 2Cl^-$$

which was a water-soluble blue powder.

The visible absorption spectrum of an aqueous solution of this dyestuff containing 0.04 g. of dye per liter of solution showed two maxima: at 612 millimicrons, $A=1.292$; and at 668 millimicrons, $A=1.22$.

Hydrolysis of this formamide compound following a procedure similar to that described in Example 2, yielded a product consisting primarily of a dyestuff of the formula $$\left[Pc\right]\left[-CH_2-N\begin{array}{c}CH_3\\ \\CH_2-CH_2-CH_2-NH_2\\CH_2-CH_2-CH_2-NH_2\end{array}\right]_2^+\left[-CH_2Cl\right]_2 \quad 2Cl^-$$

The visible absorption spectrum of an aqueous solution of this dyestuff, containing 0.75 g. of dye per liter of solution, showed two maxima: at 625 millimicrons, $A=1.218$; at 671 millimicrons, $A=1.00$.

Example 9

A mixture of 32.7 parts of tetrakis(chloromethyl)-copper phthalocyanine, 11.9 parts of N-(3-dimethylaminopropyl)formamide, and 125 parts of isopropyl alcohol was stirred and heated at 75–80° C. for 45 minutes. To the mixture there was added 5.2 parts of 1,1-dimethylhydrazine and heating was continued for two hours. The mixture was allowed to cool and the solid was removed by filtration, washed with isopropyl alcohol and dried at 85° C. The resulting product, consisting primarily of a dyestuff of the formula $$\left[Pc\right]\left[-CH_3-N(CH_3)-CH_2-CH_2-CH_2-NHCO\right]_2^+ \ 2Cl^-$$
$$\left[-CH_3-N(CH_3)-NH_2\right]_2^+ \ 2Cl^-$$

was a blue solid which was readily soluble in water.

The visible absorption spectrum of an aqueous solution of this dyestuff containing 0.02 g. of dye per liter of solution showed two maxima: at 625 millimicrons, $A=0.887$; and at 670 millimicrons, $A=0.68$.

Example 10

When a procedure similar to that described in Example 1 is followed for the condensation of N-[2-(N-ethyl-N-1-methylbutyl)aminoethyl]propionamide with bromomethyl copper phthalocyanine, the product obtained is the copper phthalocyanine dyestuff having a single group of the formula $$\left[-CH_2-N\begin{array}{c}C_2H_5\\ \\CH-(CH_2)_2CH_3\\CH_3\end{array}-CH_2-CH_2-NHCO-CH_2-CH_3\right]^+ Br^-$$

Hydrolysis of the above-mentioned carboxylic acylamino compound according to the method described in Example 2 yields the copper phthalocyanine dyestuff having a single group of the formula $$\left[-CH_2-N\begin{array}{c}C_2H_5\\ \\CH-(CH_2)CH_3\\CH_3\end{array}-CH_2-CH_2-NH_2\right]^+ Br^-$$

Example 11

Following a procedure similar to that employed in Example 1 hereinabove, tetrakis(chloromethyl)copper phthalocyanine was condensed with N-(2-dimethylaminoethyl)formamide to obtain the copper phthalocyanine dyestuff having from one to four groups of the formula $$\left[-CH_2-N(CH_3)(CH_3)-CH_2-CH_2-NHCHO\right]^+ Cl^-$$

The visible absorption spectrum of an aqueous solution of this dyestuff containing 0.03 g. of dye per liter of solution, showed a maximum at 618 millimicrons, $A=1.235$.

Hydrolysis of the above-mentioned carboxylic acylamino compound according to the method described in Example 2 yielded the copper phthalocyanine dyestuff having from one to four groups of the formula $$\left[-CH_2-N(CH_3)(CH_3)-CH_2-CH_2-NH_2\right]^+ Cl^-$$

The visible absorption spectrum of an aqueous solution of this dyestuff, containing 0.75 g. of dye per liter of solution showed two maxima: at 623 millimicrons, $A=1.44$; at 670 millimicrons, $A=0.98$.

Example 12

When a procedure similar to that described in Example 1 is followed for the condensation of N-(6-dimethylaminohexyl)isobutyramide with bis(bromomethyl)cobalt phthalocyanine the product obtained is the cobalt phthalocyanime dyestuff having one or two groups of the formula $$\left[-CH_2-N(CH_3)(CH_3)-CH_2-(CH_2)_4-CH_2NHCO-CH_2CH(CH_3)(CH_3)\right]^+ Br^-$$

Hydrolysis of the above-mentioned carboxylic acylamino compound according to the method described in Example 2 yields the cobalt phthalocyanine dyestuff having one or two groups of the formula $$\left[-CH_2-N(CH_3)(CH_3)-CH_2-(CH_2)_4-CH_2NH_2\right]^+ Br^-$$

Example 13

Following a procedudre similar to that employed in Example 1 hereinabove, tetrakis(chloromethyl)copper phthalocyanine was condensed with N-[2-(4-formylpiperazinoethyl)formamide to obtain the copper phthalocyanine dyestuff having from one to four groups of the formula $$\left[-CH_2-N\begin{array}{c}-CH_2-CH_2NHCHO\\CH_2\ \ \ CH_2\\ |\ \ \ \ \ \ \ \ |\\CH_2\ \ \ CH_2\\ \diagdown\ \diagup\\N\\ |\\CHO\end{array}\right]^+ Cl^-$$

The visible absorption spectrum of an aqueous solution of this dyestuff, containing 0.03 g. of dye per liter of solution, showed two maxima: at 614 millimicrons, A=1.16; at 670 millimicrons, A=0.68.

Hydrolysis of the above-mentioned carboxylic acylamino compound according to the method described in Example 2 yielded the copper phthalocyanine dyestuff having from one to four groups of the formula $$\left[-CH_2-N\begin{array}{c}-CH_2-CH_2-NH_2\\CH_2\ \ \ CH_2\\ |\ \ \ \ \ \ \ \ |\\CH_2\ \ \ CH_2\\ \diagdown\ \diagup\\N\\ |\\H\end{array}\right]^+ Cl^-$$

The visible absorption spectrum of an aqueous solution of this dyestuff, containing 1.5 g. of dye per liter of solution, showed two maxima: at 613 millimicrons, A=1.35; at 670 millimicrons, A=0.69.

Example 14

When a procedure similar to that described in Example 1 is followed for the condensation of N-(2-piperidinoethyl)acryl-amide with tris(bromomethyl)nickel phthalocyanine, the product obtained is the nickel phthalocyanine dyestuff having from one to three groups of the formula $$\left[-CH_2-N\begin{array}{c}-CH_2-CH_2-NHCO-CH=CH_2\\CH_2\ \ \ CH_2\\ |\ \ \ \ \ \ \ \ |\\CH_2\ \ \ CH_2\\ \diagdown\ \diagup\\CH_2\end{array}\right]^+ Br^-$$

Hydrolysis of the above-mentioned carboxylic acylamino compound according to the method described in Example 2 yields the nickel phthalocyanine dyestuff having from one to three groups of the formula $$\left[-CH_2-N\begin{array}{c}-CH_2-CH_2-NH_2\\CH_2\ \ \ CH_2\\ |\ \ \ \ \ \ \ \ |\\CH_2\ \ \ CH_2\\ \diagdown\ \diagup\\CH_2\end{array}\right]^+ Br^-$$

Example 15

Following a procedure similar to that employed in Example 1 hereinabove, tetrakis(chloromethyl)copper phthalocyanine was condensed with N-(3-diethanolaminopropyl)formamide to obtain the copper phthalocyanine dyestuff having from one to four groups of the formula $$\left[-CH_2-\underset{\underset{C_2H_4-OH}{|}}{\overset{\overset{C_2H_4-OH}{|}}{N}}-CH_2-CH_2-CH_2-NHCHO\right]^+ Cl^-$$

Hydrolysis of the above-mentioned carboxylic acylamino compound according to the method described in Example 2 yields the copper phthalocyanine dyestuff having from one to four groups of the formula $$\left[-CH_2-\underset{\underset{C_2H_4-OH}{|}}{\overset{\overset{C_2H_4-OH}{|}}{N}}-CH_2-CH_2-CH_2-NH_2\right]^+ Cl^-$$

Example 16

When a procedure similar to that described in Example 1 is followed for the condensation of N-(3-pyrrolidinylpropyl)valeramide with tetrakis(bromomethyl)iron phthalocyanine, the product obtained is the iron phthalocyamine dyestuff having from one to four groups of the formula $$\left[-CH_2-N\begin{array}{c}-CH_2-CH_2-CH_2-NHCO-CH_2-(CH_2)_2-CH_3\\CH_2\ \ \ CH_2\\ |\ \ \ \ \ \ \ \ |\\CH_2-CH_2\end{array}\right]^+ Br^-$$

Hydrolysis of the above-mentioned carboxylic acylamino compound according to the method described in Example 2 yields the iron phthalocyanine dyestuff having from one to four groups of the formula $$\left[-CH_2-N\begin{array}{c}-CH_2-CH_2-CH_2-NH_2\\CH_2\ \ \ CH_2\\ |\ \ \ \ \ \ \ \ |\\CH_2-CH_2\end{array}\right]^+ Br^-$$

Example 17

When a procedure similar to that described in Example 1 is followed for the condensation of N-(1-methyl-3-diethylaminopropyl)acrylamide with pentakis(bromomethyl)zinc phthalocyanine, the product obtained is the zinc phthalocyanine dyestuff having from one to five groups of the formula $$\left[-CH_2-\underset{\underset{C_2H_5}{|}}{\overset{\overset{C_2H_5}{|}}{N}}-CH_2-CH_2-\underset{\underset{CH_3}{|}}{CH}-NHCOCH=CH_2\right]^+ Br^-$$

Hydrolysis of the above-mentioned carboxylic acylamino compound according to the method described in Example 2 yields the zinc phthalocyanine dyestuff having from one to five groups of the formula $$\left[-CH_2-\underset{\underset{C_2H_5}{|}}{\overset{\overset{C_2H_5}{|}}{N}}-CH_2-CH_2-\underset{\underset{CH_3}{|}}{CH}-NH_2\right]^+ Br^-$$

Example 18

Following a procedure similar to that employed in Example 1 hereinabove, tetrakis(chloromethyl)copper phthalocyanine was condensed with N-(3-dimethylaminopropyl)benzamide to obtain the copper phthalocyanine dyestuff having from one to four groups of the formula $$\left[-CH_2-\underset{\underset{CH_3}{|}}{\overset{\overset{CH_3}{|}}{N}}-CH_2-CH_2-CH_2-NHCO-\bigcirc\right]^+ Cl^-$$

The visible absorption spectrum of an aqueous solution of this dyestuff, containing 0.1 g. of dye per liter of solution showed two maxima: at 607 millimicrons, A=0.65; at 680 millimicrons, A=1.105.

Hydrolysis of the above-mentioned carboxylic acylamino compound according to the method described in Example 2 yields the copper phthalocyanine dyestuff having from one to four groups of the formula $$\left[-CH_2-\underset{\underset{CH_3}{|}}{\overset{\overset{CH_3}{|}}{N}}-CH_2-CH_2-CH_2-NH_2\right]^+ Cl^-$$

Example 19

When a procedure similar to that described in Example 1 is followed for the condensation of 1-ethyl-4-propionyl piperazine with tetrachloro-tetrakis(chloromethyl)copper phthalocyanine, the product obtained is the tetrachloro substituted copper phthalocyanine dyestuff having from one to four groups of the formula

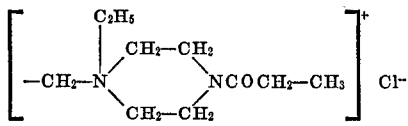

Hydrolysis of the above-mentioned carboxylic acylamino compound according to the method described in Example 2 yields the tetrachloro-substituted copper phthalocyanine dyestuff having from one to four groups of the formula

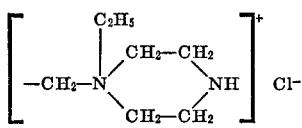

Example 20

When a procedure similar to that described in Example 1 is followed for the condensation of N-(2-diethanolamino - 1,1 - dimethylethyl)phenylacetamide with tetraphenyl-tetrakis(bromomethyl) - copper phthalocyanine, the product obtained is the tetraphenyl-substituted copper phthalocyanine dyestuff having from one to four groups of the formula

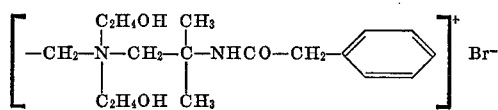

Hydrolysis of the above-mentioned carboxylic acylamino compound according to the method described in Example 2 yields the tetraphenyl-substituted copper phthalocyanine dyestuff having from one to four groups of the formula

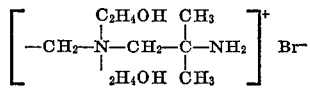

Example 21

Following a procedure similar to that employed in Example 1 hereinabove, tetrakis(chloromethyl)copper phthalocyanine was condensed with N-(3-dimethylaminopropyl)phthalamic acid to obtain the copper phthalocyanine dyestuff having from one to four groups of the formula

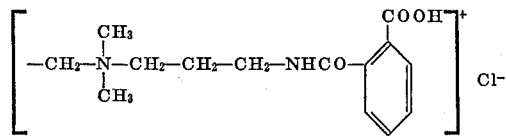

The visible absorption spectrum of an aqueous solution of this dyestuff, containing 0.03 g. of dye per liter of solution, showed two maxima: at 628 millimicrons, A=0.79; at 678 millimicrons, A=1.06.

Hydrolysis of the above-mentioned carboxylic acylamino compound according to the method described in Example 2 yields the copper phthalocyanine dyestuff having from one to four groups of the formula

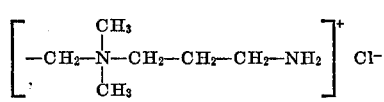

Example 22

When a procedure similar to that described in Example 1 is followed for the condensation of 1-(2-hydroxyethyl)-4-(m - toluoyl)piperazine with pentakis(chloromethyl)copper phthalocyanine, the product obtained is the copper phthalocyanine dyestuff having from one to five groups of the formula

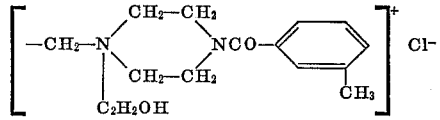

Hydrolysis of the above-mentioned carboxylic acylamino compound according to the method described in Example 2 yields the copper phthalocynanine dyestuff having from one to five groups of the formula

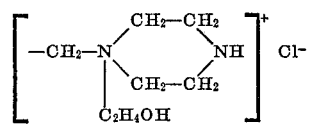

Example 23

When a procedure similar to that described in Example 1 is followed for the condensation of N-(2-dihexylaminoethyl)n-caproamide with tris(chloromethyl)copper phthalocyanine, the product obtained is the copper phthalocyanine dyestuff having from one to three groups of the formula

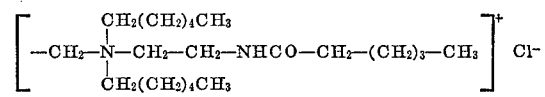

Hydrolysis of the above-mentioned carboxylic acylamine compound according to the method described in Example 2 yields the copper phthalocyanine dyestuff having from one to three groups of the formula

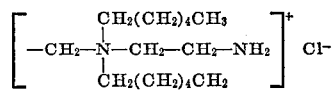

Example 24

When a procedure similar to that described in Example 1 is followed for the condensation of N-[3-(N-methyl - N - 2 - acetamidoethyl)aminopropyl]acetamide with bromomethyl copper phthalocyanine the product obtained is the copper phthalocyanine dyestuff having a single group of the formula

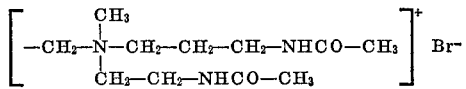

Hydrolysis of the above-mentioned carboxylic acylamino compound according to the method described in Example 2 yields the copper phthalocyanine dyestuff having a single group of the formula

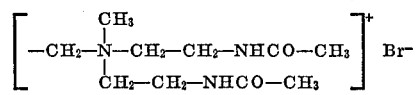

When the procedure outlined in the foregoing Examples is followed for the condensation of tetrakis(chloromethyl)copper phthalocyanine with the following compounds, there is obtained a copper phthalocyanine dyestuff having from one to four of the indicated substituents.

| Reactant | Substituent in dyestuff product |
|---|---|
| N-methyl-N-(3-pyrrolidinylpropyl)valeramide | $$\left[\begin{array}{c}\phantom{x}\\-CH_2-N-CH_2-CH_2-CH_2-N-CO\\ \phantom{-CH_2-}H_2C\diagup\phantom{x}\diagdown CH_2 \phantom{xxxxxxx} (CH_2)_3\\ \phantom{-CH_2-}H_2C-----CH_2 \phantom{xxxxxxxx} CH_3\end{array}\begin{array}{c}CH_3\\ \phantom{x}\end{array}\right]^+ Cl^-$$ |
| N-(3-hydroxypropyl)-N-(3-dimethylaminopropyl)formamide | $$\left[\begin{array}{cc}CH_3 & CH_2-CH_2-OH\\ -CH_2-N-CH_2-CH_2-CH_2-N-CHO\\ CH_3 & \end{array}\right]^+ Cl^-$$ |
| N,N-bis[3-(N-methylformamido)propyl]methylamine | $$\left[\begin{array}{cc}CH_3 & CH_3\\ -CH_2-N-CH_2-CH_2-CH_2-N-CHO\\ CH_2-CH_2-CH_2-N-CHO\\ \phantom{xxxxxxxxxxx}CH_3 & \end{array}\right]^+ Cl^-$$ |
| N-ethyl-N-(2-di-n-propylamino-2-methylethyl)-p-nitrobenzamide | $$\left[\begin{array}{cc}C_3H_7 & C_2H_5\\ -CH_2-N-CH(CH_3)-CH_2-N-CO\\ C_3H_7 & \bigcirc\\ & NO_2\end{array}\right]^+ Cl^-$$ |
| N-n-hexyl-N-[2-(N-ethyl-N-methyl)aminoethyl]propionamide | $$\left[\begin{array}{cc}CH_3 & CH_2(CH_2)_4CH_3\\ -CH_2-N-CH_2-CH_2-N-CO-CH_2-CH_3\\ CH_2-CH_3 & \end{array}\right]^+ Cl^-$$ |

When the procedure outlined in the foregoing Examples is followed for the condensation of tetrakis(chloromethyl)copper phthalocyanine with the following compounds and the acylamino moiety is hydrolyzed as hereinbefore described, there is obtained a copper phthalocyanine dyestuff having from one to four of the indicated substituents:

| Reactant | Substituent in dyestuff product |
|---|---|
| N-methyl-N-[2-(N-ethyl-N-methyl)aminoethyl]propionamide | $$\left[\begin{array}{cc}CH_3 & CH_3\\ -CH_2-N-CH_2-CH_2-NH\\ C_2H_5 & \end{array}\right]^+ Cl^-$$ |
| N-(3-hydroxypropyl)-N-(3-dimethylaminopropyl)formamide | $$\left[\begin{array}{cc}CH_3 & CH_2-CH_2-CH_2-OH\\ -CH_2-N-CH_2-CH_2-CH_2-N-H\\ CH_3 & \end{array}\right]^+ Cl^-$$ |
| N-isopropyl-N-(2-piperidinoethyl)acrylamide | $$\left[\begin{array}{c}i\text{-}C_3H_7\\ -CH_2-N-CH_2-CH_2-N-H\\ H_2C\diagup\phantom{x}\diagdown CH_2\\ H_2C\phantom{xxx}CH_2\\ \diagdown C\diagup\\ H_2\end{array}\right]^+ Cl^-$$ |
| N-[3-(N-methylacetamido)propyl]-N-[2-(N-methylacetamido)ethyl]methylamine. | $$\left[\begin{array}{cc}CH_3 & CH_3\\ -CH_2-N-CH_2-CH_2-CH_2-N-H\\ CH_2-CH_2-N-H\\ \phantom{xxxxxxx}CH_3 & \end{array}\right]^+ Cl^-$$ |

PREPARATION OF THE AROMATIC AZO DYESTUFFS

Example 25

A. To a solution of 30.8 parts of N,N-dimethyl-N-(3 - amino - 4 - methoxybenzyl) - N-3-formamidopropylammonium chloride in 130 parts of water at 0° C., there was added with stirring, 30 parts of concentrated hydrochloric acid. The amine was then diazotized at a temperature between 0–5° C. by adding 7.0 parts of solid sodium nitrite in small portions. The reaction mixture was stirred at less than 5° C. for ten minutes. The excess nitrite was then removed by the addition of an aqueous solution of sulfamic acid until nitrite ion could no longer be detected by testing with starch-iodide paper, and the mixture was made slightly alkaline to Congo Red test paper by the addition of 20.0 parts of sodium acetate.

In a separate container, 13.4 parts of N,N-diacetoacet-p-phenylenediamine, was mixed with sufficient 2-ethoxy ethanol to form a paste. The paste was slurried in 300 parts of water at 70° C. and to the slurry there was added with stirring 6.0 parts of a 50 percent aqueous solution of sodium hydroxide. A solution resulted which was then added in a thin stream to the cold diazonium solution. The reaction mixture was stirred for four hours at 20° C. and then the resulting clear yellow solution was evaporated to dryness to obtain chiefly a highly water-soluble yellow dyestuff having the formula

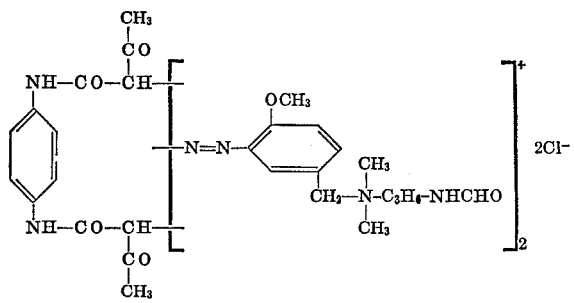

The visible absorption spectrum of an aqueous solution of this dyestuff, containing 0.10 g. of dye per liter of solution, showed a maximum at 399 millimicrons, A=1.275.

In the bleach test described above, paper dyed with this dyestuff was found to be highly bleachable. The dye was found to bleed slightly in the water-bleed test and in the soap bleed test.

B. A mixture of 6.0 parts of concentrated hydrochloric acid, 250 parts of water and 35 parts of the above product from A was heated at reflux for three hours. The mixture was cooled to 25° C. and the pH adjusted to 7.0 with aqueous alkali. Thus there was obtained in the form of an aqueous solution a yellow, highly water-soluble dyestuff of the formula

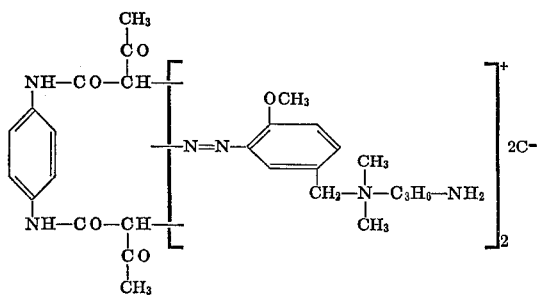

An aqueous solution of this dyestuff, containing 0.06 g. of dye per liter of solution, showed a maximum at 393.5 millimicrons, A=1.01.

The bleachability properties of this dye were found to be essentially the same as for the formyl-substituted dyestuff of A. However, compared to said formyl-substituted dyestuff, this dyestuff exhibited significantly superior resistance to bleed in both the water bleed and the soap bleed tests.

Example 26

Following the procedure described above in Example 25, 16.7 parts of N-methyl-N-(3-amino-4-methoxybenzyl)-N,N-bis(3 - formamidopropyl)ammonium chloride in a solution of 135 parts of water and 19 parts of concentrated hydrochloric acid was diazotized with 3.5 parts of sodium nitrite at 0° C. In a separate container, 9.1 parts of 4,4'-bi-o-acetoacetotoluidide (Naphthol AS–G) was mixed with sufficient 2-ethoxyethanol to form a paste. The paste was slurried in 150 parts of water at 70° C. and to the slurry there was added with stirring 6 parts of a 50 percent aqueous solution of sodium hydroxide. A solution resulted which was then added in a thin stream to the cold diazonium solution. The reaction mixture was allowed to warm to 30° C. and was then stirred for one hour after which it was heated at 60° C. for one hour. The reaction mixture, now a solution, was used directly for hydrolysis which was accomplished by the addition of 11.9 parts of concentrated hydrochloric acid followed by heating at reflux for three hours. The reaction mixture was then cooled and neutralized with 50 percent aqueous sodium hydroxide. There was thus obtained an aqueous solution of a bright yellow, water-soluble dyestuff having the formula

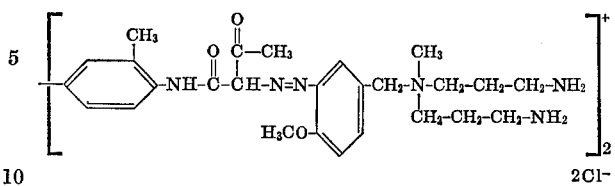

The visible absorption spectrum of an aqueous solution of this dyestuff containing 0.375 g. of dye per liter of solution had a maximum at 390 millimicrons, A=1.236.

Paper dyed with this dyestuff in the bleach test hereinbefore described, was found to be readily bleachable. The dye was found to bleed slightly in the soap bleed and to about the same extent in the water bleed test.

Example 27

A solution of 7.5 parts of N,N-dimethyl-N-(3-amino-4-methoxybenzyl)-N-3 - formamidopropylammonium chloride in 40 parts of water containing 10 parts of concentrated hydrochloric acid was heated at reflux for two hours. To the solution which was chilled in an ice bath, there was then added an additional 1.2 parts of concentrated hydrochloric acid followed by the gradual addition of 1.75 parts of sodium nitrite. After stirring for ten minutes, excess nitrite was removed by the addition of an aqueous solution of sulfamic acid, and the solution was made neutral to Congo Red by the addition of sodium acetate. In a separate container there was prepared a coupler solution consisting of 6.4 parts of 2'-chloro-4'-nitroacetoacetanilide dissolved in a mixture of 6.3 parts of isopropyl alcohol, 0.8 parts of sodium hydroxide and 81 parts of hot water. The coupler solution was added in a thin stream to the cold, stirred diazonium solution. Stirring was continued for two hours while allowing the mixture to warm to 25° C. The mixture was then heated at 50° C. for thirty minutes and then stirred for fifteen hours at 25° C. The pH was adjusted to 6.0 by the addition of 50 percent aqueous solution of sodium hydroxide and the reaction mixture then poured into 785 parts of stirred isopropyl alcohol. After stirring the mixture for two hours, the separated yellow solid was collected, washed with fresh isopropyl alcohol, and dried in vacuo to obtain the yellow, water-soluble dyestuff of the formula

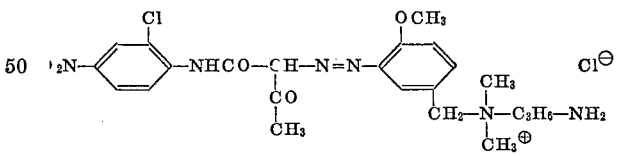

The visible absorption spectrum of an aqueous solution of this dyestuff, containing 0.02 g. of dye per liter of solution, showed a maximum at 400 millimicrons, A=0.975.

Example 28

Following the procedure described above in Example 25, part A, 16.5 parts of N,N-dimethyl-N-(4-aminophenyl)carbamylmethyl-N - 3 - formamidopropylammonium chloride in a solution of 140 parts of water and 36 parts of concentrated hydrochloric acid was diazotized with 3.64 parts of sodium nitrite at 0° C. To the cold diazonium solution thus prepared, there was added in a thin stream, a coupler solution prepared by dissolving 7.2 parts of 2-naphthol in 50 parts of water containing 4.5 parts of a 50 percent aqueous sodium hydroxide solution. The resulting reaction mixture was stirred until all of the diazotized compound was consumed and then was heated to 60° C. To the red mixture there was added 15 parts of sodium chloride and the reaction mixture was allowed to cool to 20° C. The solid was collected and washed with a 10 percent aqueous sodium chloride solution. The product was dried in a vacuum oven at 75° C. to obtain chiefly the red, highly water-soluble dyestuff having the formula

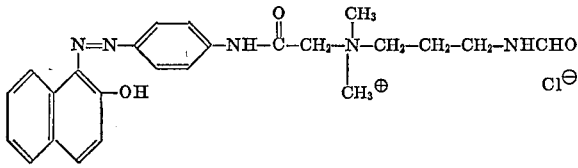

The visible absorption spectrum of an aqueous solution of this dyestuff containing 0.04 g. of dye per liter of solution had a maximum at 380 millimicrons, A=1.05.

Hydrolysis of the formamide moiety in the above-shown product according to the procedure described in Example 25, part B, yields the corresponding —NH$_2$ substituted compound.

Example 29

A solution of the diazonium compound prepared by treating 8.3 parts of 2-chloro-4-nitroaniline in a solution of 50 parts of water and 10.8 parts of concentrated hydrochloric acid with a solution of 3.5 parts of sodium nitrite in 10 parts of water according to the procedure described in Example 25, part A, was added to a solution of 57.7 parts of N,N-dimethyl-N - 2 - (N'-ethylanilino)ethyl-N-3-formamidopropylammonium chloride in 42 parts of water. The reaction mixture was stirred at 25° C. until the diazonium compound was completely consumed and then 20 parts of sodium chloride was added to the red solution. The reaction was heated to 50° C. and then cooled. The resulting slurry was filtered, and the collected solid washed with a small amount of water and dried in vacuo at 75° C. to obtain 24.0 parts of a red, water-soluble dyestuff having the formula

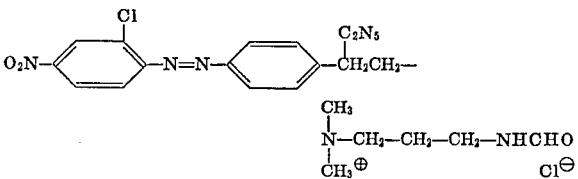

The visible absorption spectrum of an aqueous solution of this dyestuff containing 0.02 g. of dye per liter of solution had a maximum at 492.5 millimicrons, A=1.025.

Hydrolysis of the formamido moiety in the above-shown product according to the procedure described in Example 25, part B, yields the corresponding —NH$_2$ substituted compound.

Example 30

Proceeding in a manner similar to that described above in Example 25, part A, for diazotizing N,N-dimethyl-N-(3-amino-4-methoxybenzyl - N - 3 - formamidopropylammonium chloride and coupling with 3-carbamyl-1-phenyl-2-pyrazolin-5-one, there was obtained the orange-red dyestuff having the formula

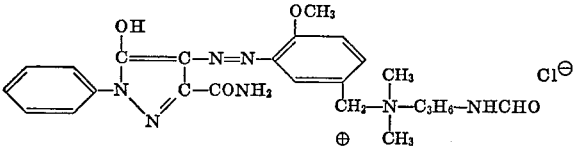

The visible absorption spectrum of an aqueous solution of this dyestuff, containing 0.03 g. of dye per liter of solution, showed a maximum at 450 millimicrons, A=1.05.

Hydrolysis of the formamido moiety in the above-shown product according to the procedure described in Example 25, part B, yields the corresponding —NH$_2$ substituted compound.

Example 31

Proceeding in a manner similar to that described above in Example 25, part A, for diazotizing N,N-dimethyl-N-(3-amino - 4 - methoxybenzyl) - N - 3 - formamidopropyl-ammonium chloride and coupling with 3-methyl-1-(o-tolyl)-2-pyrazolin-5-one, there was obtained the orange dyestuff having the formula

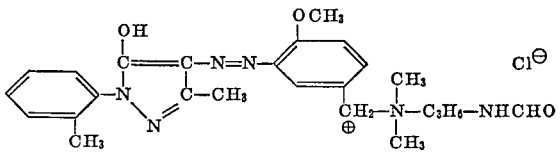

The visible absorption spectrum of an aqueous solution of this dyestuff, containing 0.03 g. of dye per liter of solution, showed a maximum at 412 millimicrons, A=1.223.

Hydrolysis of the formamide moiety in the above-shown product according to the procedure described in Example 25, part B, yielded the corresponding —NH$_2$ substituted compound, an orange, water-soluble dyestuff. An aqueous solution of this dyestuff, containing 0.03 g. of dye per liter of solution, showed a maximum at 414 millimicrons, A=1.097.

Example 32

When a procedure similar to that described above in Example 25, part A, is followed for diazotization of N-methyl-N-2-(N-n-propyl - 4 - aminophenylcarbamyl)-2-n-propylethyl-N-2-acetamidoethyl - N - 3-acetamidopropyl-ammonium chloride and coupling with 3-methyl-1-(2-ethoxy-5-nitrophenyl)-2-pyrazolin-5-one, there is obtained the dyestuff having the formula

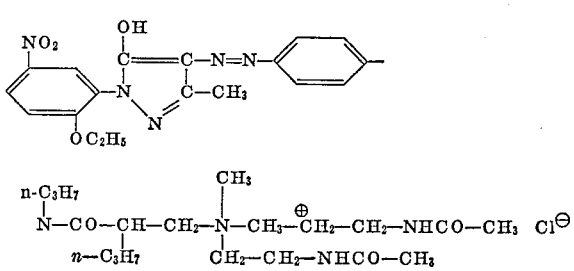

Hydrolysis of the two acetamido moieties in the above-shown product according to the procedure described in Example 25, part B, yields the corresponding di(—NH$_2$) substituted compound.

Example 33

When a procedure similar to that described above in Example 25, part A, is followed for diazotization of N-(4-amino-N-methyl - 2 - chlorophenylcarbamyl)methyl-N-3-n-valeramidopropylpyrrolidinium chloride and coupling with 3-methyl-1-(4-aminophenyl)-2-pyrazolin-5-one, there is obtained the dyestuff having the formula

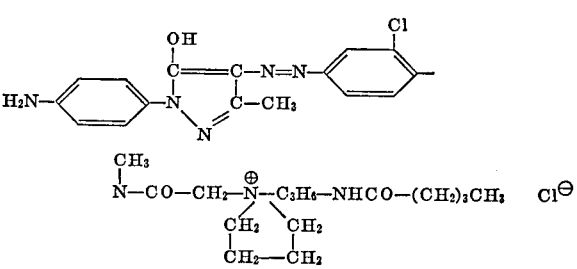

Hydrolysis of the valeramido moiety in the above-shown product according to the procedure described in Example 25, part B, yields the corresponding —NH$_2$ substituted compound.

Example 34

When a procedure similar to that described above in Example 25, part A, is followed for diazotization of N-methyl-N-isopropyl-N-2-ethyl - 4 - (3 - chloro-4-aminophenyl)butyl-N - 3 - salicylamidopropylammonium chloride and coupling with 3-methyl-1-(4-carbethoxyphenyl)-

2-pyrazolin-5-one, there is obtained the dyestuff having the formula

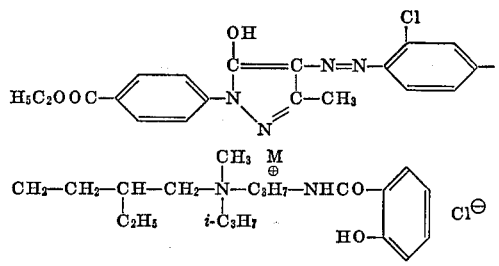

Hydrolysis of the salicylamido moiety in the above-shown product according to the procedure described in Example 25, part B, yields the corresponding —NH₂ substituted compound.

Example 35

When a procedure similar to that described above in Example 25, part B is followed for diazotization of N,N-dimethyl-N-3-(4-aminophenyl)propyl-N - 6 - iso-butyramidohexylammonium chloride and coupling with 3-carbethoxy-1-(2-hydroxyphenyl) - 2 - pyrazolin-5-one, there is obtained the dyestuff having the formula

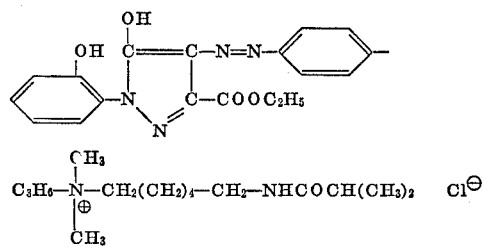

Hydrolysis of the iso-butyramido moiety in the above-shown product according to the procedure described in Example 25, part B, yields the corresponding —NH₂ substituted compound.

Example 36

Proceeding in a manner similar to that described above in Example 25, part A, for diazotizing N,N-dimethyl-N-(3-amino-4-methoxybenzyl)-N - 3 - formamidopropylammonium chloride and coupling with 3-methyl-1-(p-carbamylphenyl)-2-pyrazolin-5-one, there was obtained the orange dyestuff having the formula

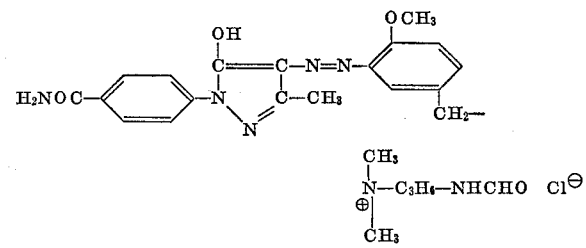

The visible absorption spectrum of an aqueous solution of this dyestuff, containing 0.03 g. of dye per liter of solution, showed a maximum at 412 millimicrons, A=0.986.

This dye was found to have a moderate tendency to bleed each in the water bleed and the soap bleed test.

Hydrolysis of the formamido moiety in the above-shown product according to the procedure described in Example 25, part B, yields the corresponding —NH₂ substituted compound.

Example 37

Proceeding in a manner similar to that described above in Example 25, part A, for diazotizing N,N-dimethyl-N-(3-amino - 4 - methoxybenzyl)-N-3-formamidopropylammonium chloride and coupling with 3-methyl-1-(p-sulfamylphenyl)-2-pyrazolin-5-one, there was obtained the yellow dyestuff having the formula

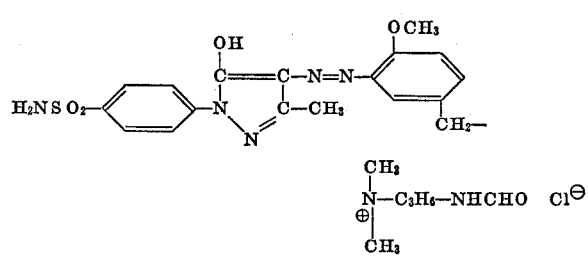

The visible absorption spectrum of an aqueous solution of this dyestuff, containing 0.03 g. of dye per liter of solution, showed a maximum at 415 millimicrons, A=1.12.

Hydrolysis of the formamido moiety in the above-shown product according to the procedure described in Example 25, part B, yields the corresponding —NH₂ substituted compound.

Example 38

Proceeding in a manner similar to that described above in Example 26, N,N-dimethyl-N-(3 - amino-4-methoxybenzyl)-N-3-formamidopropylammonium chloride was diazotized and coupled with 3 - methyl-1-(2,5-dichlorophenyl)-2-pyrazolin-5-one, and the product hydrolyzed to obtain the orange, water-soluble dyestuff having the formula

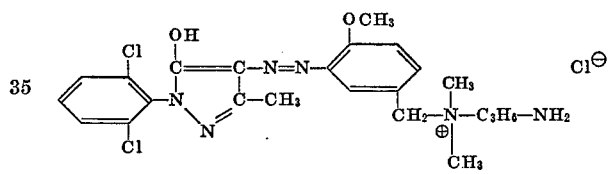

Example 39

Proceeding in a manner similar to that described above in Example 25, part A, for diazotizing N,N-dimethyl-N-(3-amino - 4 - methoxybenzyl)-N-3-formamidopropylammonium chloride and coupling with 2-naphthol, there was obtained the bright red dyestuff having the formula

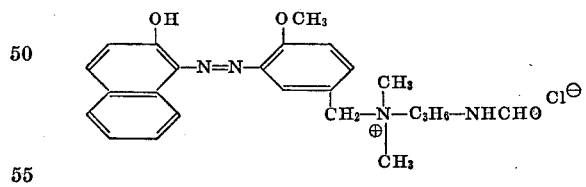

The visible absorption spectrum of an aqueous solution of this dyestuff, containing 0.03 g. of dye per liter of solution, showed a maximum at 494 millimicrons, A=1.192.

Hydrolysis of the formamido moiety in the above-shown product according to the procedure described in Example 25, part B, yielded the corresponding —NH₂ substituted compound, a red, water-soluble dyestuff. An aqueous solution of this dyestuff, containing 0.04 g. of dye per liter of solution, showed a maximum at 497 millimicrons, A=0.995.

Example 40

Proceeding in a manner similar to that described above in Example 27, N,N-dimethyl-N-(3-amino-4-methoxybenzyl)-N-3-formamidopropylammonium chloride was hydrolyzed and the resulting N,N-dimethyl-N-(3-amino-4 - methoxybenzyl)-N-3-aminopropylammonium chloride was diazotized and coupled with 3-(benzoxazol)-2-yl)-2- naphthol to obtain the red-brown, water-soluble dyestuff having the formula

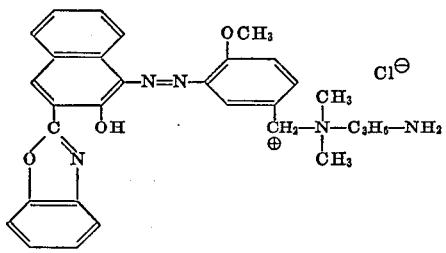

The visible absorption spectrum of an aqueous solution of this dyestuff, containing 0.16 g. of dye per liter of solution, showed two maxima: at 520 millimicrons, A=0.96; and at 546 millimicrons, A=0.94.

In the bleach test described above, paper dyed with this dyestuff was found to be highly bleachable. The dye was found to bleed slightly and to approximately the same extent each in the water bleed test and the soap bleed test.

Example 41

Proceeding in a manner similar to that described above in Example 27, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3-aminopropylammonium chloride was diazotized and coupled with 3-(benzimidazol-2-yl)-2-naphthol to obtain the red, water-soluble dyestuff having the formula

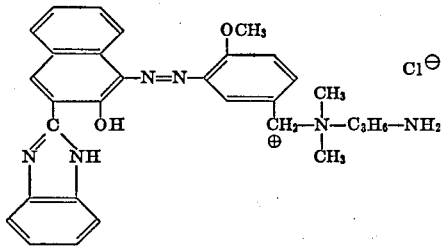

The visible absorption spectrum of an aqueous solution of this dyestuff, containing 0.75 g. of dye per liter of solution, showed a maximum at 520 millimicrons, A=1.138.

Example 42

Proceeding in a manner similar to that described above in Example 26, N,N-dimethyl-N-(3-amino-4-methoxybenzyl)-N-3-formamidopropylammonium chloride was diazotized and coupled with 4'-chloro-2'5'-dimethoxyacetoacetanilide (Naphthol AS 13GH) and the product hydrolyzed to obtain the yellow water-soluble dyestuff having the formula

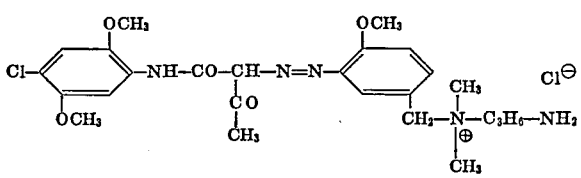

An aqueous solution of this dyestuff, containing 0.10 g. of dye per liter of solution, showed a maximum at 395 millimicrons, A=1.082.

This dyestuff was found to bleed slightly in the soap bleed test and the water bleed test.

Example 43

When a procedure similar to that described in Example 25, part A, is followed for diazotization of 1-(2-hydroxyethyl) - 4 - (m-toluyl)-1-[6-(3-amino-4-methoxyphenyl)hexyl]-piperazinium chloride and coupling with 2'-nitro-4'-butoxyacetoacetanilide, there is obtained the dyestuff having the formula

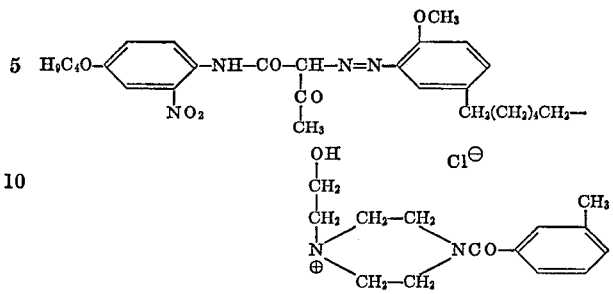

Hydrolysis of the m-toluyl moiety in the above-shown product according to the procedure described in Example 25, part B, yields the corresponding >NH compound.

Example 44

Proceeding in a manner similar to that described above in Example 25, part A, for diazotizing N,N-dimethyl-N-(3 - amino - 4-methoxybenzyl)-N-3-formamidopropylammonium chloride and coupling with 4,4'-bi-o-acetoacetotoluidide (Naphthol AS–G) there was obtained the yellow dyestuff having the formula

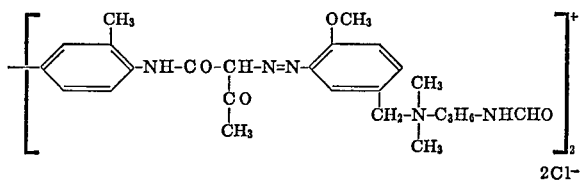

The visible absorption spectrum of an aqueous solution of this dyestuff, containing 0.03 g. of dye per liter of solution, showed a maximum at 399 millimicrons, A=1.175.

Hydrolysis of the formamido moieties in the above-shown product according to the procedure described in Example 25, part B, yielded the corresponding di(—NH$_2$) substituted compound, an orange, highly water-soluble dyestuff. An aqueous solution of this dyestuff, containing 1.0 g. of dye per liter of solution, showed a maximum at 392 millimicrons, A=1.32.

This dyestuff was found to bleed slightly in the water bleed test and somewhat less in the soap bleed test.

Example 45

Proceeding in a manner similar to that described above in Example 25, part A, for diazotizing N,N-dimethyl-N-(3 - amino-4-methoxybenzyl)-N-3-formamidopropylammonium chloride and coupling with 4,4'-bi-o-acetoacetanisidide, there was obtained the yellow dyestuff having the formula

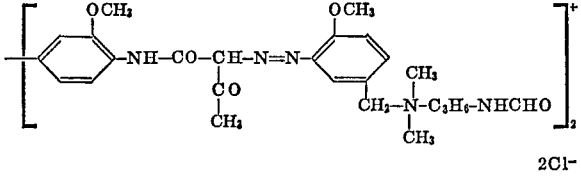

The visible absorption spectrum of an aqueous solution of this dyestuff, containing 0.03 g. of dye per liter of solution, showed a maximum at 406 millimicrons, A=1.2224.

Hydrolysis of the formamido moieties in the above-shown product according to the procedure described in Example 25, part B, yielded the corresponding di(—NH$_2$) substituted compound, an orange, highly water-soluble dyestuff. An aqueous solution of this dyestuff, containing 0.04 g. of dye per liter of solution, showed a maximum at 386 millimicrons, A=0.92.

In the bleach test described above, paper dyed with this dyestuff was found to be highly bleachable. The dye was found to bleed slightly in the soap bleed test but substantially less in the water bleed test.

Example 46

When a procedure similar to that described above in Example 25, part A, is followed for diazotization of N,N-dimethyl-N - 2-(3-amino-4-methylphenyl)ethyl-N-3-formamidopropylammonium chloride and coupling with 2′,2′′′-diethoxy-4′,4′′′-biacetoacetanilide, there is obtained the dyestuff having the formula

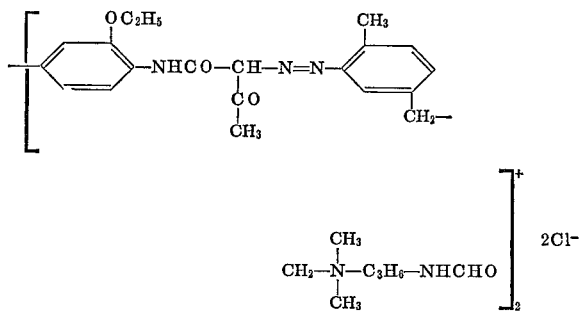

Hydrolysis of the formamido moieties in the above-shown product according to the procedure described in Example 25, part B, yields the corresponding di(—$NH_2$) substituted compound.

Example 47

When a procedure similar to that described above in Example 25, part A, is followed for diazotization of N,N-diallyl-N - 1 - methyl-3-(4-amino-3-bromophenyl)propyl-N-2-phenylpropionamidoethylammonium chloride and coupling with 2′,2′′′-dichloro-4′,4′′′-biacetoacetanilide, there is obtained the dyestuff having the formula

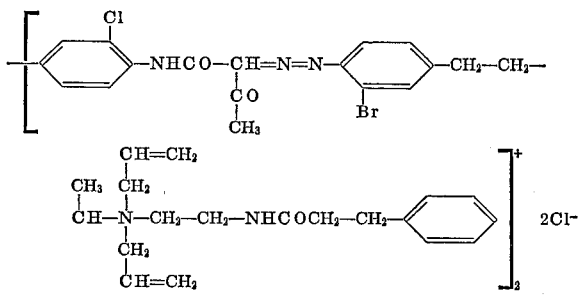

Hydrolysis of the phenylpropionamido moieties in the above-shown product according to the procedure described in Example 25, part B, yields the corresponding di(—$NH_2$) substituted compound.

Example 48

Proceeding in a manner similar to that described above in Example 25, part A, for diazotizing N,N-dimethyl-N-(3 - amino - 4 - methoxybenzyl)-N-3-formamidopropyl-ammonium chloride and coupling with 3-hydroxy-2-naphthanilide (Naphthol AS), there was obtained the orange-red dyestuff having the formula

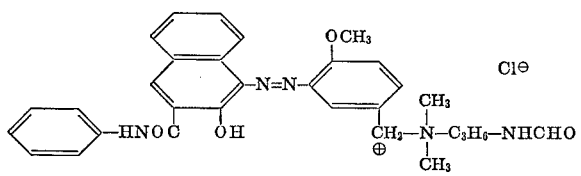

The visible absorption spectrum of an aqueous solution of this dyestuff, containing 0.04 g. of dye per liter of solution, showed a maximum at 514 millimicrons, A=0.838.

Hydrolysis of the formamido moiety in the above-shown product according to the procedure described in Example 25, part B, yielded the corresponding —$NH_2$ substituted compound, a red, water-soluble dyestuff. An aqueous solution of this dyestuff, containing 0.06 g. of dye per liter of solution, showed a maximum at 514 millimicrons, A=1.223.

Example 49

Proceeding in a manner similar to that described above in Example 25, part A, for diazotizing N,N-dimethyl-N-(3 - amino - 4-methoxybenzyl)-N-3-formamidopropylammonium chloride and coupling with 3-hydroxy-2-naptho-o-toluidide (Naphthol AS–D), there was obtained the dark red dyestuff having the formula

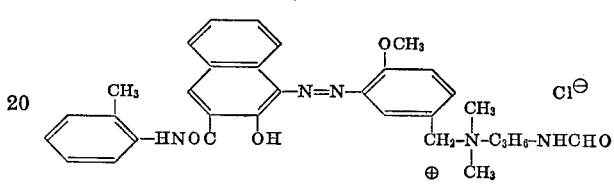

The visible absorption spectrum of an aqueous solution of this dyestuff, containing 0.06 g. of dye per liter of solution, showed a maximum at 518 millimicrons, A=1.285.

Hydrolysis of the formamido moiety in the above-shown product according to the procedure described in Example 25, part B, yielded the corresponding —$NH_2$ substituted compound, a red, water-soluble dyestuff. An aqueous solution of this dyestuff, containing 0.10 g. of dye per liter of solution, showed a maximum at 520 millimicrons, A=0.995.

Example 50

Proceeding in a manner similar to that described above in Example 25, part A, for diazotizing N,N-dimethyl-N-(3 - amino - 4-methoxybenzyl)-N-3-formamidopropylammonium chloride and coupling with 3-hydroxy-2-naphth-p-anisidide (Naphthol AS–RL), there was obtained the red, water-soluble dyestuff having the formula

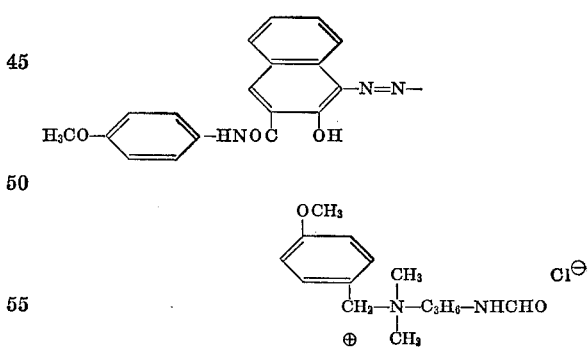

The visible absorption spectrum of an aqeuous solution of this dyestuff, containing 0.06 g. of dye per liter of solution, showed a maximum at 515 millimicrons, A=1.14.

Hydrolysis of the formamido moiety in the above-shown product according to the procedure described in Example 25, part B, yielded the corresponding —$NH_2$ substituted compound, a red, water-soluble dyestuff. An aqueous solution of this dyestuff, containing 0.05 g. of dye per liter of solution, showed a maximum at 517 millimicrons, A=0.90.

Example 51

Proceeding in a manner similar to that described above in Example 25, part A, for diazotizing N,N-dimethyl-N-(3 - amino - 4 - methoxybenzyl)-N-3-formamidopropyl-ammonium chloride and coupling with 3 - hydroxy - 2 - naphth - o - anisidide (Naphthol AS–OL), there was obtained the dark red, water-soluble dyestuff having the formula

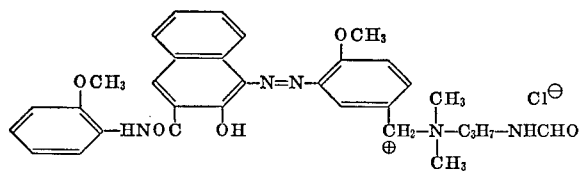

The visible absorption spectrum of an aqueous solution of this dyestuff, containing 0.04 g. of dye per liter of solution, showed a maximum at 514 millimicrons, A=0.995.

Hydrolysis of the formamido moiety in the above-shown product according to the procedure described in Example 25, part B, yielded the corresponding —$NH_2$ substituted compound, a red, water-soluble dyestuff. An aqueous solution of this dyestuff, containing 0.04 g. of dye per liter of solution, showed a maximum at 517 millimicrons, A=0.895.

Example 52

Proceeding in a manner similar to that described above in Example 25, part A, for diazotizing N,N-dimethyl-N-(3 - amino - 4-methoxybenzyl)-N-3-formamidopropylammonium chloride and coupling with 3-hydroxy-2-naphtho-o-phenetidide (Naphthol AS–PH), there was obtained the red, water soluble dyestuff having the formula

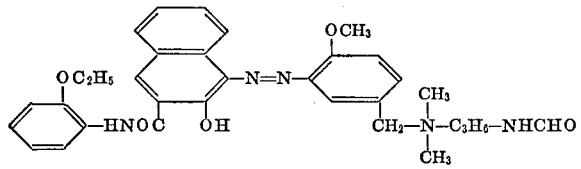

The visible absorption spectrum of an aqueous solution of this dyestuff, containing 0.05 g. of dye per liter of solution, showed a maximum at 512.5 millimicrons, A=1.1.

Hydrolysis of the formamido moiety in the above-shown product according to the procedure described in Example 25, part B, yielded the corresponding —$NH_2$ substituted compound, a turquoise blue, water-soluble dyestuff. An aqueous solution of this dyestuff, containing 0.10 g. of dye per liter of solution, showed a maximum at 625 millimicrons, A=1.28.

Example 53

Proceeding in a manner similar to the described above in Example 27, N,N - dimethyl - N-(3-amino-4-methoxybenzyl) - N-3-formamidopropylammonium chloride was hydrolyzed and the resulting N,N-dimethyl-N-(3-amino-4 - methoxybenzyl)-N-3-aminopropylammonium chloride was diazotized and coupled with 3-hydroxy-2-naphtho-2,4-xylidide (Naphthol AS-MX), to obtain the red, water-soluble dyestuff having the formula

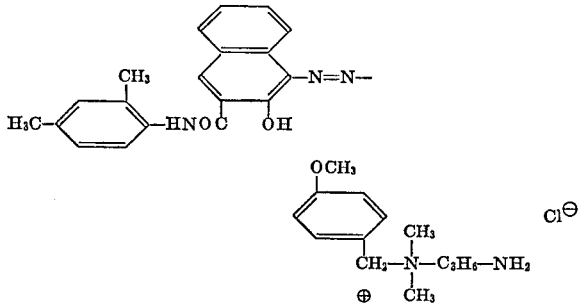

The visible absorption spectrum of an aqueous solution of this dyestuff, containing 0.06 g. of dye per liter of solution, showed two maxima: at 518 millimicrons, A=1.03; and at 545 millimicrons, A=1.02.

In the bleach test described above, paper dyed with this dyestuff was found to be readily bleachable. The dye was found to bleed slightly in the water bleed test with substantially less bleeding in the soap bleed test.

Example 54

Proceeding in a manner similar to that described above in Example 27, N,N - dimethyl-N-(3-amino-4-methoxybenzyl) - N-3-formamidopropylammonium chloride was hydrolyzed and the resulting N,N-dimethyl-N-(3-amino-4 - methoxybenzyl)-N-3-aminopropylammonium chloride was diazotized and coupled with 5'-chloro-3-hydroxy-2'-methyl-2-naphthanilide (Naphthol AS-KB), to obtain the red, water-soluble dyestuff having the formula

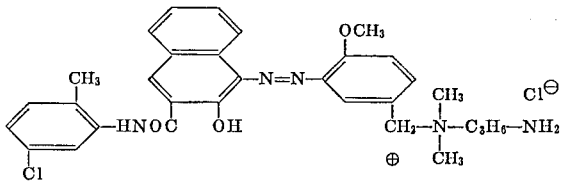

The visible absorption spectrum of an aqueous solution of this dyestuff, containing 0.05 g. of dye per liter of solution, showed two maxima: at 521 millimicrons, A=1,283; and at 548 millimicrons, A=1.32.

Example 55

Proceeding in a manner similar to that described above in Example 27, N,N - dimethyl-N-(3-amino-4-methoxybenzyl) - N-3-formamidopropylammonium chloride was hydrolyzed and the resulting N,N-dimethyl-N-(3-amino-4 - methoxybenzyl)-N-3-aminopropylammonium chloride was diazotized and coupled with 3-hydroxy-3'-nitro-2-naphthanilide (Naphthol AS-BS), to obtain the red, water-soluble dyestuff having the formula

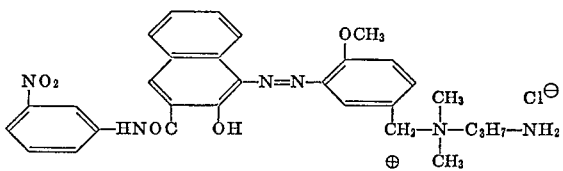

The visible absorption spectrum of an aqueous solution of this dyestuff, containing 0.06 g. of dye per liter of solution, showed two maxima: at 521 millimicrons, A=1.385; and at 545 millimicrons, A=1.39.

In the bleach test described above, paper dyed with this dyestuff was found to be readily bleachable. The dye was found to bleed slightly and to approximately the same extent each in the water bleed test and the soap bleed test.

Example 56

Proceeding in a manner similar to that described above in Example 27, N,N - dimethyl - N-(3-amino-4-methoxybenzyl) - N-3-formamidopropylammonium chloride was hydrolyzed and the resulting N,N-dimethyl-(3-amino-4-methoxybenzyl) - N - 3-aminopropylammonium chloride was diazotized and coupled with 3-hydroxy-2',5'-dimethoxy-2-naphthanilide (Naphthol AS-BG), to obtain the red, water-soluble dyestuff having the formula

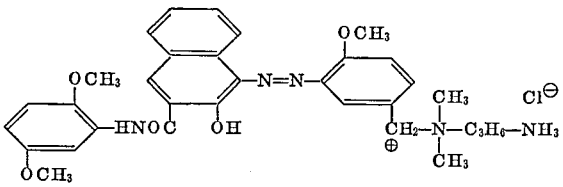

The visible absorption spectrum of an aqueous solution of this dyestuff, containing 0.04 g. of dye per liter of solution, showed two maxima: at 517.5 millimicrons, A=1.25; and at 543 millimicrons, A=1.23.

In the bleach test described above, paper dyed with this dyestuff was found to be readily bleachable. The dye was found to bleed slightly and to approximately the same extent each in the water bleed test and the soap bleed test.

Example 57

Proceeding in a manner similar to that described above in Example 27, N,N - dimethyl-N-(3-amino-4-methoxybenzyl)-N - 3 - formamidopropylammonium chloride was hydrolyzed and the resulting N,N-dimethyl-N-(3-amino-4-methoxybenzyl) - N-3-aminopropylammonium chloride was diazotized and coupled with 5'-chloro-3-hydroxy-2'-methoxy-2-naphthanilide (Naphthol AS-EL) to obtain the red, water-soluble dyestuff having the formula

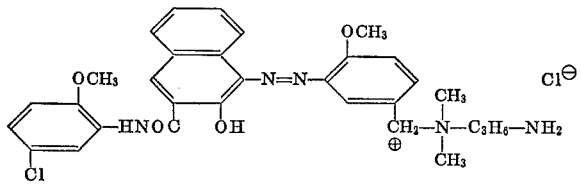

The visible absorption spectrum of an aqueous solution of this dyestuff, containing 0.06 g. of dye per liter of solution, showed two maxima: at 518 millimicrons, A=1.07; and at 545 millimicrons, A=1.08.

In the bleach test described above, paper dyed with this dyestuff was found to be readily bleachable. The dye was found to bleed slightly in the soap bleed test but significantly less in the water bleed test.

Example 58

Proceeding in a manner similar to that described above in Example 27, N,N-dimethyl-N-(3-amino-4-methoxybenzyl) - N,-3-formamidopropylammonium chloride was hydrolyzed and the resulting N,N-dimethyl-N-(3-amino-4-methoxybenzyl) - N-3-aminopropylammonium chloride was diazotized and coupled with 5'-chloro-3-hydroxy-2', 4 '- dimethoxy-2-naphthanilide (Naphthol AS-ITR), to obtain the red, water-soluble dyestuff having the formula

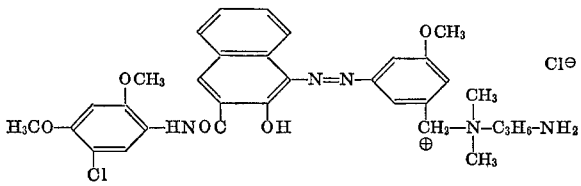

The visible absorption spectrum of an aqueous solution of this dyestuff, containing 0.05 g. of dye per liter of solution, showed two maxima: at 519 millimicrons, A=0.885; and at 545 millimicrons, A=0.86.

Example 59

Proceeding in a manner similar to that described above in Example 27, N,N - dimethyl - N-(3-amino-4-methoxybenzyl) - N-3-formamidopropylammonium chloride was hydrolyzed and the resulting N,N-dimethyl-N-(3-amino-4-methoxybenzyl) - N - 3-aminopropylammonium chloride was diazotized and coupled with 3-hydroxy-N-1-naphthyl-2-naphthamide (Naphthol AS-BO), to obtain the red, water-soluble dyestuff having the formula

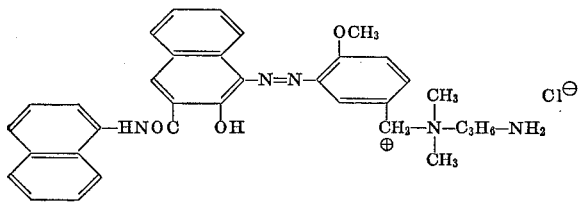

The visible absorption spectrum of an aqueous solution of this dyestuff, containing 0.08 g. of dye per liter of solution, showed two maxima: at 521 millimicrons, A=1.478; and at 547 millimcrons, A=1.434.

In the bleach test described above, paper dyed with this dyestuff was found to be readily bleachable. The dye was found to bleed slightly in the soap bleed test but significantly less in the water bleed test.

Example 60

Proceeding in a manner similar to that described above in Example 26, N,N - dimethyl-N-(3-amino-4-methoxybenzyl) - N-3-formamidopropylammonium chloride was diazotized and coupled with N,N' - p-phenylenebis(3-hydroxy-2-naphthamide) and the product hydrolyzed to obtain the maroon, water-soluble dyestuff having the formula

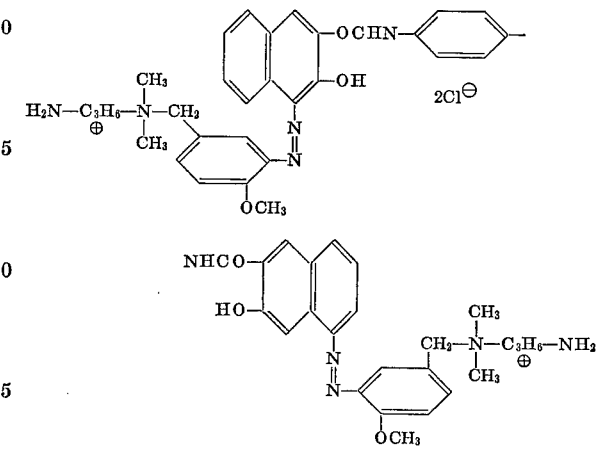

An aqueous solution of this dyestuff, containing 0.06 g. of dye per liter of solution, showed a maximum at 512 millimicrons, A=1.095.

Example 61

Proceeding in a manner similar to that described above in Example 25, part A, for diazotizing N,N-dimethyl-N-(3 - amino-4-methoxybenzyl)-N-3-formamidopropylammonium chloride and coupling with 2,4-dihydroxyquinoline, there was obtained the yellow, water-soluble dyestuff having the formula

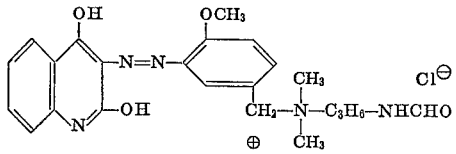

The visible absorption spectrum of an aqueous solution of this dyestuff, containing 0.03 g. of dye per liter of solution, showed a maximum at 422 millimicrons, A=1.28.

Hydrolysis of the formamido moiety in the above-shown product according to the procedure described in Example 25, part B, yields the corresponding —NH₂ substituted compound.

Example 62

Proceeding in a manner similar to that described above in Example 26, N-methyl-N-(3-amino-4-methoxybenzyl)-N,N-bis(3-formamidopropyl)ammonium chloride was diazotized and coupled with 3-methyl-1-(o-tolyl)-2-pyrazolin-5-one, and the product hydrolyzed to obtain the yellow, water-soluble dyestuff having the formula

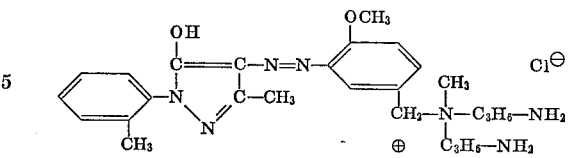

An aqueous solution of this dyestuff, containing 0.5 g. of dye per liter of solution, showed a maximum of 415 millimicrons A=1.21.

Example 63

Proceeding in a manner similar to that described above in Example 26, N-methyl-N-(3-amino-4-methoxybenzyl)-

N,N-bis(3-formamidopropyl)ammonium chloride was diazotized and coupled with 2-naphthol, and the product hydrolyzed to obtain the red, water-soluble dyestuff having the formula

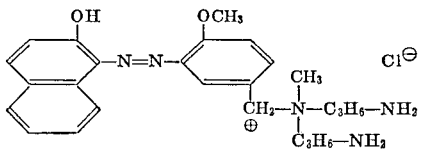

An aquous solution of this dyestuff, containing 0.04 g. of dye per liter of solution, showed a maximum at 500 millimicrons, A=0.912.

Example 64

Proceeding in a manner similar to that described above in Example 27, N-methyl-N-(3-amino-4-methoxybenzyl)-N,N-bis(3-formamidopropyl)ammonium chloride was hydrolyzed and the resulting N-methyl-N-(3-amino-4-methoxybenzyl) - N,N - bis(3-aminopropyl)ammonium chloride was diazotized and coupled with 3-(benzimidazol-2-yl)-2-naphthol, to obtain the red, water-soluble dyestuff having the formula

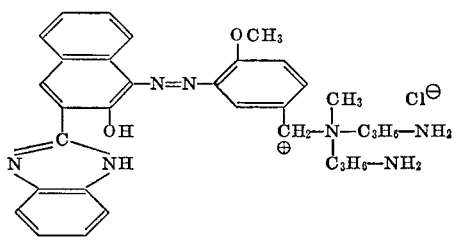

The visible absorption spectrum of an aqueous solution of this dyestuff, containing 1.0 g. of dye per liter of solution, showed a maximum at 526 millimicrons, A=1.05.

Example 65

Proceeding in a manner similar to that described above in Example 26, N-methyl-N-(3-amino-4-methoxybenzyl)-N,N-bis(3-formamidopropyl)ammonium chloride was diazotized and coupled with 4'-chloro-2',5'-dimethoxy-acetoacetanilide (Naphthol ASI3GH), and the product hydrolyzed to obtain the yellow, water-soluble dyestuff having the formula

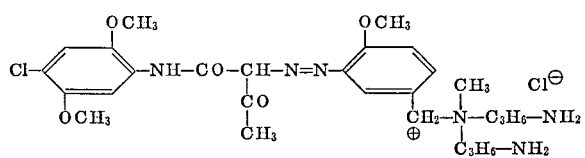

An aqueous solution of this dyestuff, containing 0.25 g. of dye per liter of solution, showed a maximum at 395.3 millimicrons, A=0.954.

In the bleach test described above, paper dyed with this dyestuff was found to be readily bleachable. The dye was found to bleed slightly and to approximately the same extent each in the water bleed test and the soap bleed test.

Example 66

Proceeding in a manner similar to that described above in Example 26, N-methyl-N-(3-amino-4-methoxybenzyl)-N,N-bis(3-formamidopropyl)ammonium chloride was diazotized and coupled with N,N'-diacetoacet-p-phenylene- diamine and the product hydrolyzed to obtain the yellow, water-soluble dyestuff having the formula

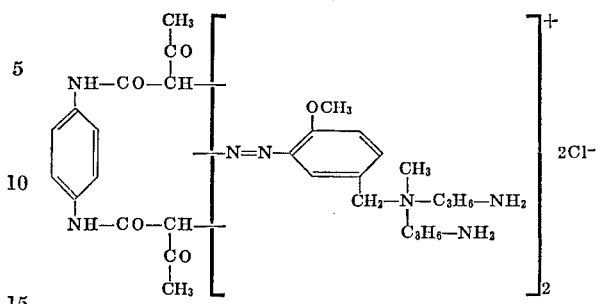

An aqueous solution of this dyestuff, containing 0.2 g. of dye per liter of solution, showed a maximum at 394 millimicrons, A=0.9.

In the bleach test described above, paper dyed with this dyestuff was found to be highly bleachable. The dye was found to bleed slightly in the water bleed test with substantially less bleeding in the soap bleed test.

Example 67

Proceeding in a manner similar to that described above in Example 25, part A, for diazotizing N-methyl-N-(3-amino-4-methoxybenzyl)-N,N-bis(3 - formamidopropyl)ammonium chloride and coupling with 4',4'''-bi-o-acetoacetanisidide, there was obtained the orange, water-soluble dyestuff having the formula

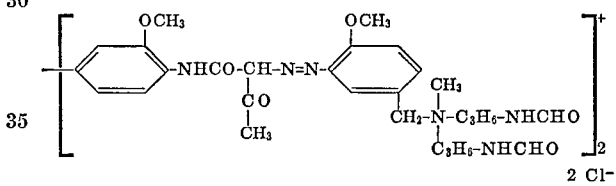

The visible absorption spectrum of an aqueous solution of this dyestuff, containing 0.03 g. of dye per liter of solution, showed a maximum at 412 millimicrons, A=1.255.

Hydrolysis of the four formamido moieties in the above-shown product according to the procedure described in Example 25, part B, yielded the corresponding tetra-(—NH$_2$) substituted compound, a yellow, highly water-soluble dyestuff. An aqueous solution of this dyestuff, containing 0.75 g. of dye per liter of solution, showed a maximum at 400 millimicrons, A=0.975.

In the bleach test described above, paper dyed with this dyestuff was found to be readily bleachable. The dye was found to bleed slightly in the soap bleed test with substantially less bleeding in the water bleed test.

Example 68

Proceeding in a manner similar to that described above in Example 26, N-methyl-N-(3-amino-4-methoxybenzyl)-N,N-bis(3-formamidopropyl)ammonium chloride was diazotized and coupled with 3-hydroxy-2-naphth-o-anisidide (Naphthol AS-OL), and the product hydrolyzed to obtain the red, water-soluble dyestuff having the formula

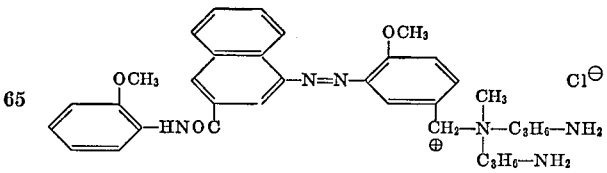

An aqueous solution of this dyestuff, containing 0.4 g. of dye per liter of solution, showed a maximum at 517 millimicrons, A=0.997.

Example 69

Proceeding in a manner similar to that described above in Example 26, N-methyl-N-(3-amino-4-methoxybenzyl)-

N,N-bis(3-formamidopropyl)ammonium chloride was diazotized and coupled with N,N'-p-phenylenebis(3-hydroxy-2-naphthamide), and the product hydrolyzed to obtain the dyestuff having the formula

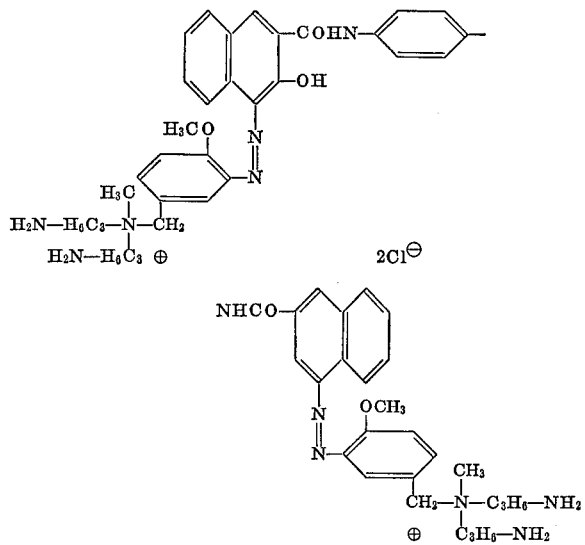

An aqueous solution of this dyestuff, containing 0.06 g. of dye per liter of solution, showed a maximum at 517 millimicrons, A=0.78.

Example 70

Proceeding in a manner similar to that described above in Example 25, part A, for diazotizing N,N-dimethyl-N-(4 - aminophenyl)carbamylmethyl-N-3-formamidopropylammonium chloride and coupling with 3-(benzimidazol-2-yl)-2-naphthol, there was obtained the red, water-soluble dyestuff having the formula

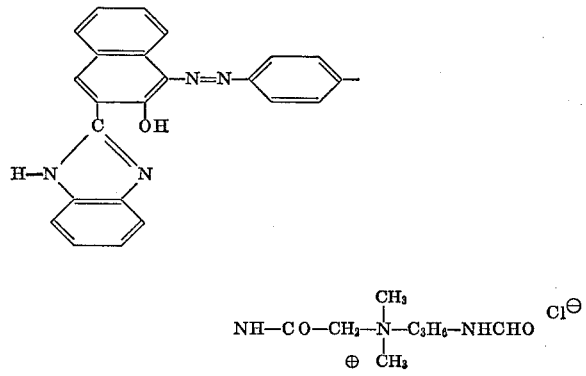

The visible absorption spectrum of an aqueous solution of this dyestuff, containing 1.0 g. of dye per liter of solution showed a maximum at 524 millimicrons, A=1.36.

Hydrolysis of the formamido moiety in the above-shown product according to a procedure described in Example 25, part B, yields the corresponding —NH$_2$ substituted compound.

Example 71

Proceeding in a manner similar to that described above in Example 25, part A, for diazotizing N,N-dimethyl-N-(4-aminophenyl)carbamylmethyl - N-3 - formamidopropylammonium chloride and coupling with 4,4'-bi-o-acetoacetotoluidide (Naphthol AS-G), there was obtained the yellow-brown, water-soluble dyestuff having the formula

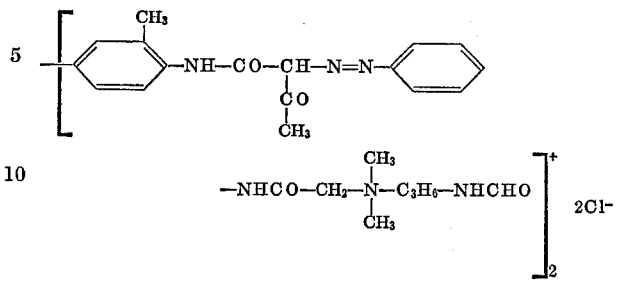

The visible absorption spectrum of an aqueous solution of this dyestuff, containing 0.02 g. of dye per liter of solution, showed a maximum at 395 millimicrons, A=0.855.

Hydrolysis of the formamido moieties in the above-shown product according to the procedure described in Example 25, part B, yields the corresponding di(—NH$_2$) substituted compound.

Example 72

Proceeding in a manner similar to that described above in Example 25, part A, for diazotizing N,N-dimethyl-N-(4-aminophenyl)carbamylmethyl - N-3 - formamidopropylammonium chloride and coupling with 3-hydroxy-2-naphth-o-anisidide (Naphthol AS-OL), there was obtained the red-brown, water-soluble dyestuff having the formula

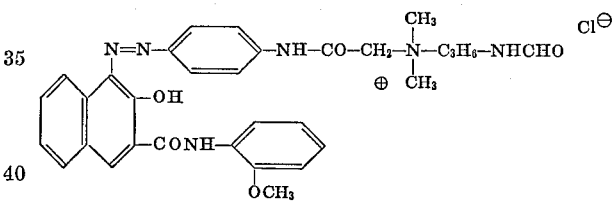

The visible absorption spectrum of an aqueous solution of this dyestuff, containing 0.04 g. of dye per liter of solution, showed a maximum at 516 millimicrons, A=1.095.

Hydrolysis of the formamido moiety in the above-shown product according to the procedure described in Example 25, part B, yields the corresponding —NH$_2$ substituted compound.

Example 73

Proceeding in a manner similar to that described above in Example 29, for diazotizing aniline and coupling with N,N-dimethyl-N-2-(N'-ethylanilino)ethyl - N - 3-formamidopropylammonium chloride, there was obtained the yellow, water-soluble dyestuff having the formula

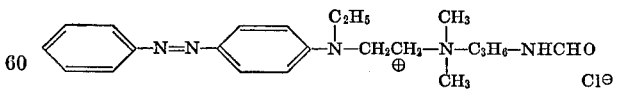

The visible absorption spectrum of an aqueous solution of this dyestuff, containing 0.156 g. of dye per liter of solution, showed a maximum at 410 millimicrons, A=0.92.

Hydrolysis of the formamido moiety in the above-shown product according to the procedure described in Example 25, part B, yields the corresponding —NH$_2$ substituted compound.

Example 74

Proceeding in a manner similar to that described above in Example 29, for diazotizing p-aminoacetanilide and coupling with N,N-dimethyl-N-2-(N'-ethylanilino)ethyl-N-3-formamidopropylammonium chloride, there was obtained the yellow, water-soluble dyestuff having the formula

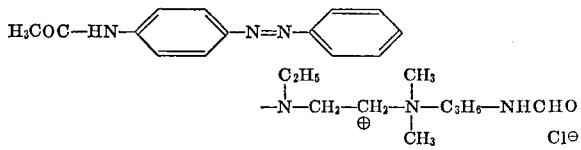

The visible absorption spectrum of an aqueous solution of this dyestuff, containing 0.375 g. of dye per liter of solution, showed a maximum at 424 millimicrons, A=0.985.

Hydrolysis of the formamido moiety in the above-shown product according to the procedure described in Example 25, part B, yields the corresponding —$NH_2$ substituted compound.

Example 75

Proceeding in a manner similar to that described above in Example 29, for diazotizing 4-o-tolylazo-o-toluidine and coupling with N,N-dimethyl-N-2-(N'-ethylanilino)ethyl-N-3-formamidopropylammonium chloride, there was obtained the brown, water-soluble dyestuff having the formula

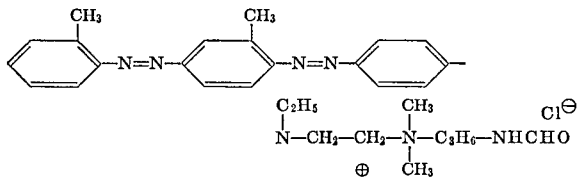

The visible absorption spectrum of an aqueous solution of this dyestuff, containing 0.625 g. of dye per liter of solution, showed a maximum at 455 millimicrons, A=1.085.

Hydrolysis of the formamido moiety in the above-shown product according to the procedure described in Example 25, part B, yields the corresponding —$NH_2$ substituted compound.

Example 76

Proceeding in a manner similar to that described above in Example 29, for diazotizing m-phenylene diamine and coupling with N,N-dimethyl-N-2-(N'-ethylanilino)ethyl-N-3-formamidopropylammonium chloride, there was obtained the yellow-brown, water-soluble dyestuff having the formula

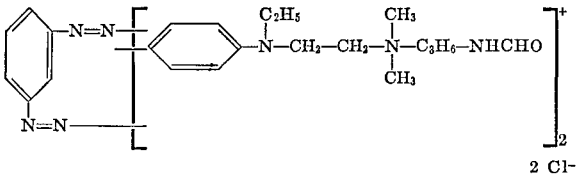

The visible absorption spectrum of an aqueous solution of this dyestuff, containing 0.25 g. of dye per liter of solution, showed a maximum at 427.5 millimicrons, A=1.21.

Hydrolysis of the formamido moieties in the above-shown product according to the procedure described in Example 25, part B, yields the corresponding di(—$NH_2$) substituted compound.

Example 77

Proceeding in a manner similar to that described above in Example 29, for diazotizing p-phenylenediamine and coupling with N,N-dimethyl-N-2-(N'-ethylanilino)ethyl-N-3-formamidopropylammonium chloride, there was ob-tained the brown, water-soluble dyestuff having the formula

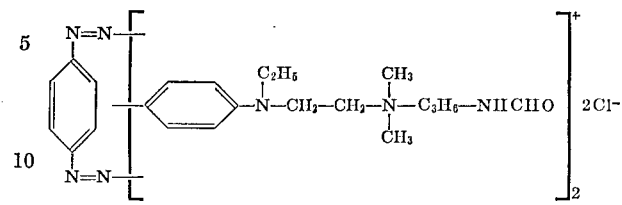

The visible absorption spectrum of an aqueous solution of this dyestuff, containing 0.8 g. of dye per liter of solution, showed a maximum at 437.5 millimicrons, A=1.62.

Hydrolysis of the formamido moieties in the above-shown product according to the procedure described in Example 25, part B, yields the corresponding di(—$NH_2$) substituted compound.

Example 78

Proceeding in a manner similar to that described above in Example 29, for diazotizing 3,3'-dichlorobenzidine and coupling with N,N-dimethyl-N-2-(N'-ethylanilino)ethyl-N-3-formamidopropylammonium chloride, there was obtained the orange-red, water-soluble dyestuff having the formula

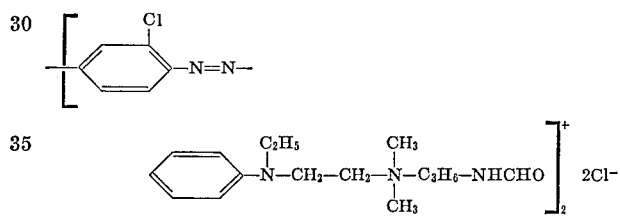

The visible absorption spectrum of an aqueous solution of this dyestuff, containing 0.15 g. of dye per liter of solution, showed a maximum at 486 millimicrons, A=1.19.

Hydrolysis of the formamido moieties in the above-shown product according to the procedure described in Example 2, yields the corresponding di(—$NH_2$) substituted compound.

Example 79

Proceeding in a manner similar to that described above in Example 27, N,N-dimethyl-N-2-(N'-ethylanilino)ethyl-N-3-formamidopropylammonium chloride was hydrolyzed and the resulting N,N-dimethyl-N-2-(N'-ethylanilino)ethyl-N-3-aminopropylammonium chloride was coupled with diazotized 3,3'-dichlorobenzidine to obtain the orange-red, water-soluble dyestuff having the formula

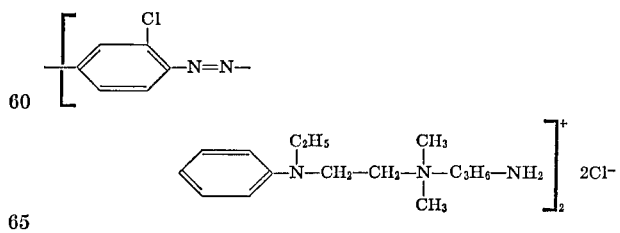

The visible absorption spectrum of an aqueous solution of this dyestuff, containing 0.125 g. of dye per liter of solution, showed a maximum at 487 millimicrons, A=1.245.

Example 80

Proceeding in a manner similar to that described above in Example 29, for diazotizing 3,3'-dimethoxybenzidine and coupling with N,N-dimethyl-N-2-(N'-ethylanilino)ethyl-N-3-formamidopropylammonium chloride, there was obtained the red-orange, water-soluble dyestuff having the formula

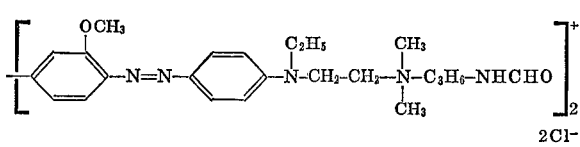

The visible absorption spectrum of an aqueous solution of this dyestuff, containing 0.1875 g. of dye per liter of solution, showed a maximum at 471 millimicrons, A=1.03.

Hydrolysis of the formamido moieties in the above-shown product according to the procedure described in Example 25, part B, yields the corresponding di(—$NH_2$) substituted compound.

Example 81

Proceeding in a manner similar to that described above in Example 29, for diazotizing 4,4'-diaminostilbene-2,2'-disulfonic acid and coupling with N,N-dimethyl-N-2-(N'-ethyl-analino)ethyl - N - 3 - formamidopropylammonium chloride, there was obtained the red, water-soluble dyestuff having the formula

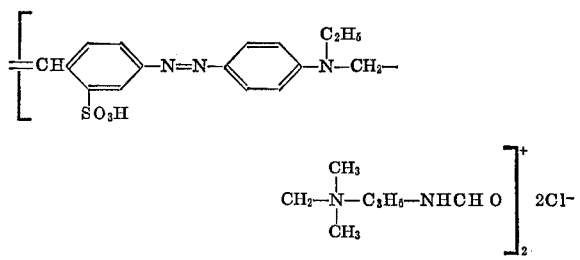

Hydrolysis of the formamido moieties in the above-shown product according to the procedure described in Example 25, part B, yields the corresponding di(—$NH_2$) substituted compound.

Example 82

Proceeding in a manner similar to that described above in Example 29, diazotizing 4,4'-methylenedianiline and coupling with N,N - dimethyl - N - 2 - (N'-ethylanilino) ethyl - N - 3 - formamidopropylammonium chloride yielded the yellow dyestuff having the formula

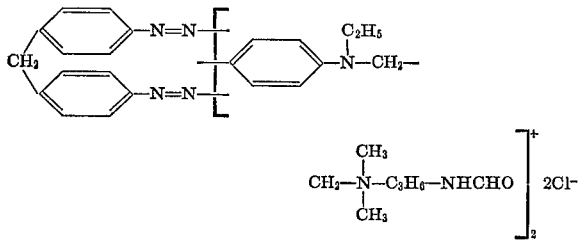

The visible absorption spectrum of an aqueous solution of this dyestuff, containing 0.1563 g. of dye per liter of solution, showed a maximum at 418 millimicrons, A=1.296.

Example 83

Proceeding in a manner similar to that described above in Example 27, N,N - dimethyl - N - 2 - (N'-ethylanilino) ethyl-N-3-formamidopropylammonium chloride was hydrolyzed and the resulting N,N-dimethyl-N-2-(N'-ethyanilino)ethyl - N - 3 - aminopropylammonium chloride was coupled with diazotized 4,4' - methylenedianiline to obtain the orange-yellow, water-soluble dyestuff having the formula

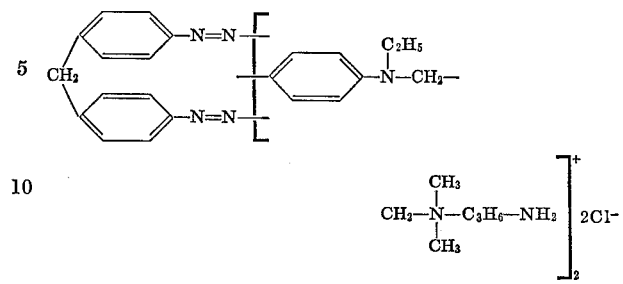

The visible absorption spectrum of an aqueous solution of this dyestuff, containing 0.1875 g. of dye per liter of solution, showed a maximum at 420 millimicrons, A=1.393.

Example 84

Proceeding in a manner similar to that described above in Example 27, N,N-dimethyl - N - 2 - (N' - ethylanilino)ethyl - N - 3 - formamidopropylammonium chloride was hydrolyzed and the resulting N,N - dimethyl - N - 2 - (N' - ethyanilino)ethyl - N - 3 - aminopropylammonium chloride was coupled with diazotized 4,4'-diaminodiphenylsulfide to obtain the orange-yellow, water-soluble dyestuff having the formula

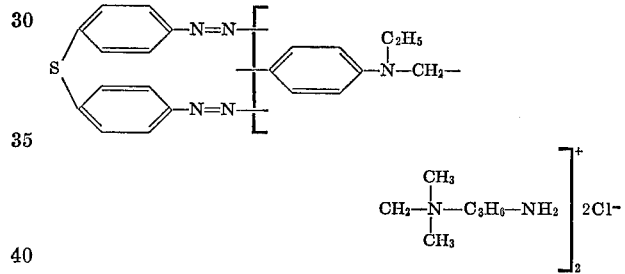

The visible absorption spectrum of an aqueous solution of this dyestuff, containing 0.102 g. of dye per liter of solution, showed a maximum at 435 millimicrons, A=1.015.

Example 85

Proceeding in a manner similar to that described above in Example 27, N,N-dimethyl-N - 2 - (N'-ethylanilino) ethyl-N-3-formamidopropylammonium chloride was hydrolyzed and the resulting N,N-dimethyl-N-2-(N'-ethyanilino)ethyl - N - 3 - aminopropylammonium chloride was coupled with diazotized 4,4'-diaminocarbanilide to obtain the dark-brown, water-soluble dyestuff having the formula

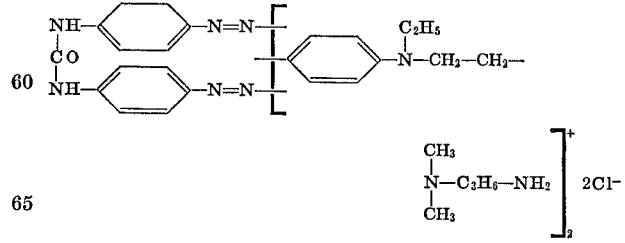

The visible absorption spectrum of an aqueous solution of this dyestuff, containing 0.03 g. of dye per liter of solution, showed a maximum at 423 millimicrons, A=1.37.

Example 86

Proceeding in a manner similar to that described above in Example 27, N,N-dimethyl-N-2-(N'-ethylanilino)ethyl-N-3-formamidopropylammonium chloride was hydrolyzed and the resulting N,N-dimethyl-N-2-(N'-ethylanilino)ethyl-N-3-aminopropylammonium chloride was coupled with diazotized 4,4'-azodianiline to obtain the brown, water-soluble dyestuff having the formula

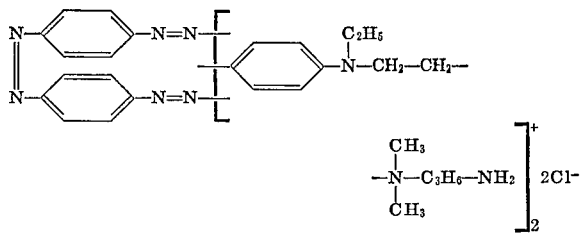

The visible absorption spectrum of an aqueous solution of this dyestuff, containing 0.25 g. of dye per liter of solution, showed a maximum at 494 millimicrons, A=1.05.

Example 87

Proceeding in a manner similar to that described above in Example 27, N,N-dimethyl-N-(3-amino-4-methoxybenzyl)-N-3-formamidopropylammonium chloride was hydrolyzed and the resulting N,N-dimethyl-N-(3-amino-4-methoxybenzyl)-N-3 - aminopropylammonium chloride was diazotized and coupled with N,N'-ethylenebis(3-hydroxy-2-naphthamide) to obtain the red-brown water-soluble dyestuff having the formula

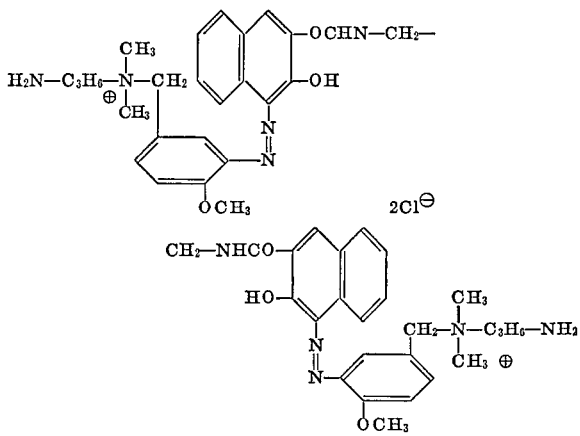

An aqueous solution of this dyestuff, containing 0.04 g. of dye per liter of solution, showed a maximum at 511 millimicrons, A=1.025.

Example 88

Proceeding in a manner similar to that described above in Example 27, N-(3-amino-4-methoxybenzyl)-N,N,N-triethylammonium chloride was diazotized and coupled with 4,4'-bi-o-acetoacetotoluidide (Naphthol AS-G) to obtain the orange, water-soluble dyestuff having the formula

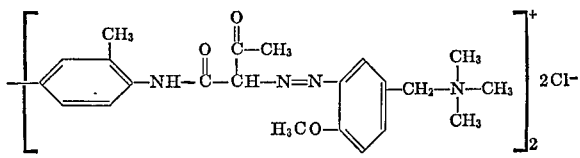

An aqueous solution of this dyestuff, containing 0.02 g. of dye per liter of solution, showed a maximum at 402 millimicrons, A=0.990.

Example 89

Proceeding in a manner similar to that described above in Example 27, N-(3-amino-4-methoxybenzyl)-N-(2-hydroxypropyl)-N,N-dimethylammonium chloride was diazotized and coupled with 4,4'-bi-o-acetoacetotoluidide (Naphthol AS-G) to obtain the yellow, water-soluble dyestuff having the formula

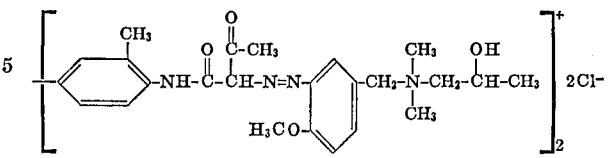

An aqueous solution of this dyestuff, containing 0.02 g. of dye per liter of solution, showed a maximum at 402 millimicrons, A=1.095.

Example 90

Proceeding in a manner similar to that described above in Example 27, N-(3-amino-4-methoxybenzyl)-4-(2-hydroxyethyl)-N,N-dimethylammonium chloride was diazotized and coupled with 4,4'-bi-o-acetotoluidide (Naphthol AS-G) to obtain the yellow, water-soluble dyestuff having the formula

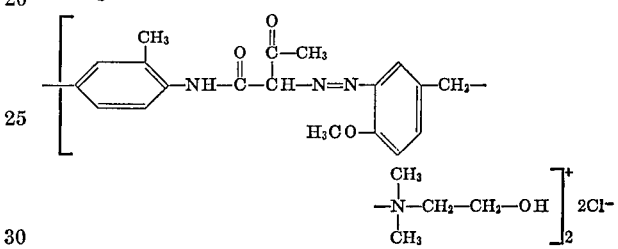

An aqueous solution of this dyestuff, containing 0.025 g. of dye per liter of solution, showed a maximum at 401 millimicrons, A=1.362.

Example 91

Proceeding in a manner similar to that described above in Example 27, N-(3-amino-4-methoxybenzyl)-N-(2-hydroxyethyl)-N,N-dimethylammonium chloride was diazotized and coupled with 4,4'-bi-o-acetoacetanisidide to obtain the yellow, water-soluble dyestuff having the formula

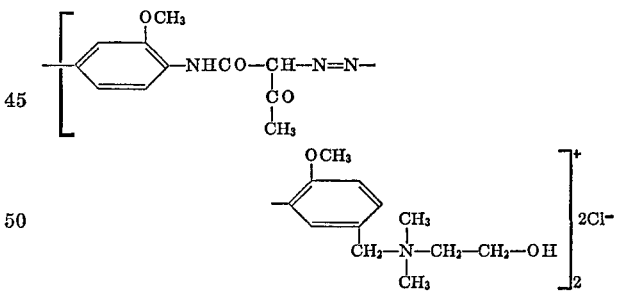

An aqueous solution of this dyestuff, containing 0.02 g. of dye per liter of solution, showed a maximum at 409 millimicrons, A=1.062.

Example 92

Proceeding in a manner similar to that described above in Example 27, N-(3 - amino-4-methoxybenzyl)-N,N-bis (2-hydroxyethyl)-N-methylammonium chloride was diazotized and coupled with 4,4'-bi-o-acetoacetotoluidide (Naphthol AS-G) to obtain the yellow, water-soluble dyestuff having the formula

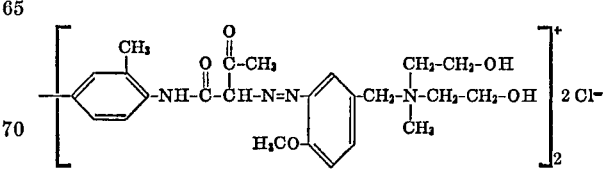

An aqueous solution of this dyestuff, containing 0.02 g. of dye per liter of solution, showed a maximum at 402 millimicrons, A=0.9.

Example 93

Proceeding in a manner similar to that described above in Example 27, N-(3-amino-4-methoxybenzyl)-N,N,N-trimethylammonium chloride was diazotized and coupled with 3-hydroxy-3'-nitro-2-naphthanilide (Naphthol AS-BS) to obtain the red, water-soluble dyestuff having the formula

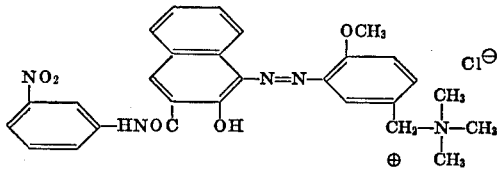

An aqueous solution of this dyestuff, containing 0.04 g. of dye per liter of solution showed two maxima: at 517 millimicrons, A=1.18; at 540 millimicrons, A=1.17.

Example 94

Proceeding in a manner similar to that described above in Example 27, N-(3-amino-4-methoxybenzyl)-N,N,N-trimethylammonium chloride was diazotized and coupled with 3-hydroxy-2-naphth-p-anisidide (Naphthol AS-RL) to obtain the red, water-soluble dyestuff having the formula

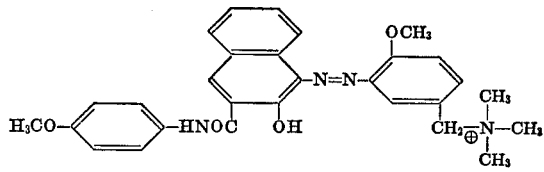

An aqueous solution of this dyestuff, containing 0.04 g. of dye per liter of solution, showed two maxima: at 513 millimicrons, A=1.22; at 538 millimicrons, A=1.165.

Example 95

Proceeding in a manner similar to that described above in Example 27, N-(3-amino-4-methoxybenzyl)-N,N,N-trimethylammonium chloride was diazotized and coupled with 3-hydroxy-2-naphth-o-anisidide (Naphthol AS-OL) to obtain the red, water-soluble dyestuff having the formula

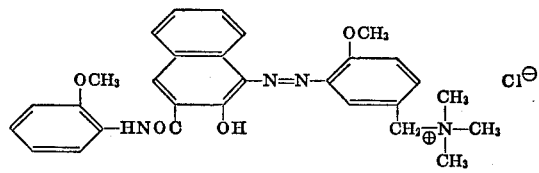

An aqueous solution of this dyestuff, containing 0.04 g. of dye per liter of solution, showed two maxima: at 512.5 millimicrons, A=1.46; at 540 millimicrons, A=1.44.

Example 96

Proceeding in a manner similar to that described above in Example 27, N-(3-amino-4-methoxybenzyl)-N-(2-hydroxyethyl)-N,N-dimethylammonium chloride was diazotized and coupled with 3-hydroxy-2-naphth-o-anisidide (Naphthol AS–OL) to obtain the red, water-soluble dyestuff having the formula

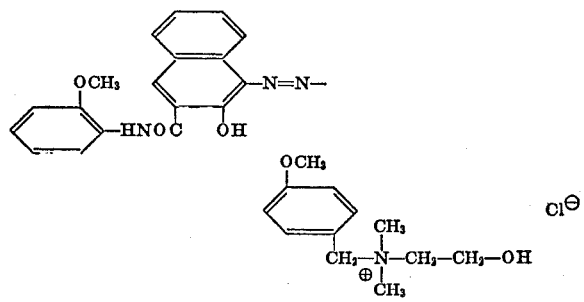

An aqueous solution of this dyestuff, containing 0.2 g. of dye per liter of solution, showed two maxima: at 515 millimicrons, A = 1.545; at 543 millimicrons, A = 1.51.

Example 97

Proceeding in a manner similar to that described above in Example 27, N-(3-amino-4-methoxybenzyl)-N,N-bis(2-hydroxyethyl)-N-methylammonium chloride was diazotized and coupled with 3-hydroxy-2-naphth-o-anisidide (Naphthol AS-OL) to obtain the red, water-soluble dyestuff having the formula

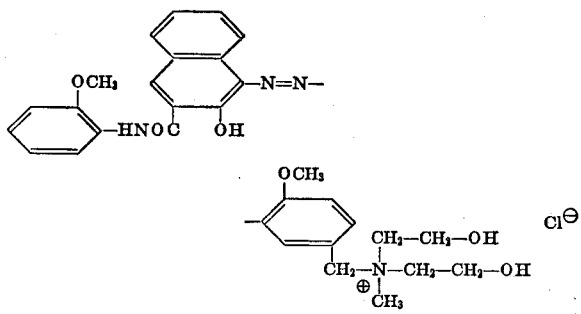

An aqueous solution of this dyestuff, containing 0.08 g. of dye per liter of solution, showed two maxima: at 514 millimicrons, A = 0.89; at 545 millimicrons, A = 0.87.

Example 98

When a procedure similar to that described in Example 27, is followed for diazotization of N-methyl-N-tert.-butyl-butyl-N-methallyl-N-3-amino - 4 - methoxybenzylammonium chloride and coupling with 3-methyl-1-(2,4-diiodophenyl)-2-pyrazolin-5-one, there is obtained the dyestuff having the formula

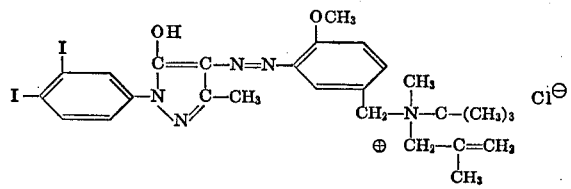

Example 99

When a procedure similar to that described in Example 27, is followed for diazotization of N-methyl-N-isobutyl-N-3-hydroxybutyl-N-4-aminobenzylammonium iodide and coupling with 3-butoxy-1-phenyl-2-pyrazolin-5-one, there is obtained the dyestuff having the formula

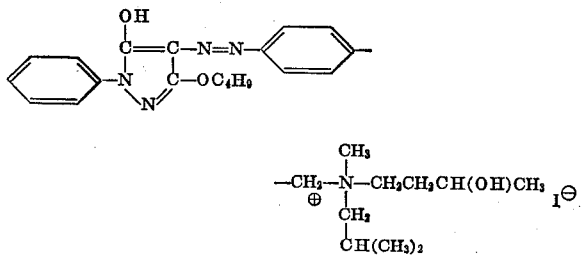

Example 100

When a procedure similar to that described in Example 27, is followed for diazotization of N,N-di-n-butyl-N-2-hydroxypropyl-N-2-(3-amino-4 - methylphenyl)ethylammonium chloride and coupling with 3-n-hexyl-1-phenyl-2-pyrazolin-5-one, there is obtained the dyestuff having the formula

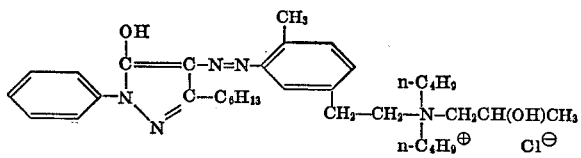

Example 101

When a procedure similar to that described in Example 27, is followed for diazotization of N-*n*-propyl-N-2-hydroxyethyl-N-3-hydroxypropyl-N - 4 - (4 - aminophenyl) butyl ammonium chloride and coupling with 3-methyl-1-(4-propoxyphenyl)-2-pyrazolin-5-one, there is obtained the dyestuff having the formula

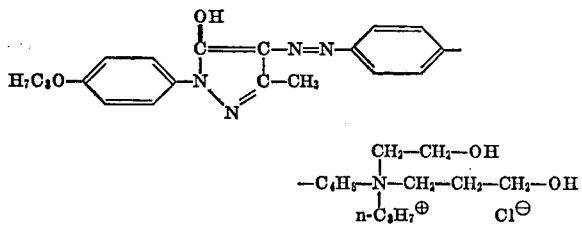

Example 102

When a procedure similar to that described in Example 27, is followed for diazotization of N,N-diethyl-N-allyl-N-1-methyl-3-(4-amino - 3 - bromophenyl)propylammonium chloride and coupling with 3-methyl-1-(3-bromophenyl)-2-pyrazolin-5-one, there is obtained the dyestuff having the formula

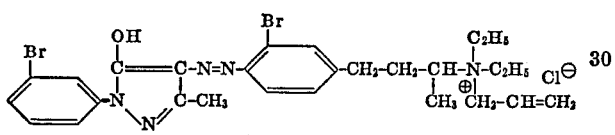

Example 103

When a procedure similar to that described in Example 25, part A, is followed for diazotization of N-(4-amino-2-iodobenzyl)-N,N,N-tri-*n* - hexylammonium bromide and coupling with 3',3'''-di-*tert*. butyl - 4',4'''-biacetoacetanilide, there is obtained the dyestuff having the formula

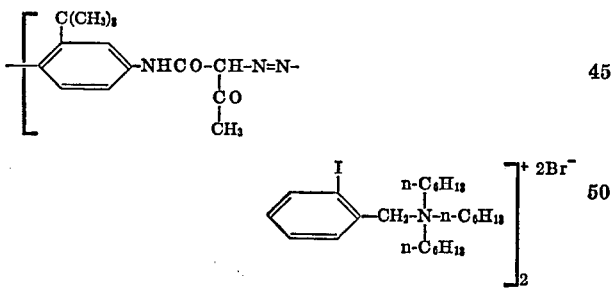

Example 104

When a procedure similar to that described in Example 25, part A, is followed for diazotization of N-methyl-N-allyl-N-6-*n*-hydroxyhexyl - N - 4 - amino-3-fluorobenzyl-ammonium chloride and coupling with 3',3'''-dibutoxy-4',4'''—biacetoacetanilide, there is obtained the dyestuff having the formula

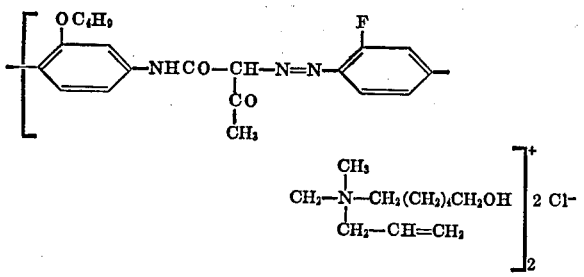

Example 105

When a procedure similar to that described in Example 25, part A, is followed for diazotization of N-(2-butenyl)-N-*n* - pentyl - N - vinyl - N-1-methyl-3-(4-amino-3-bromophenyl)propyl ammonium bromide and coupling with 2',2'''-diiodo-4',4'''-biacetoacetanilide, there is obtained the dyestuff having the formula

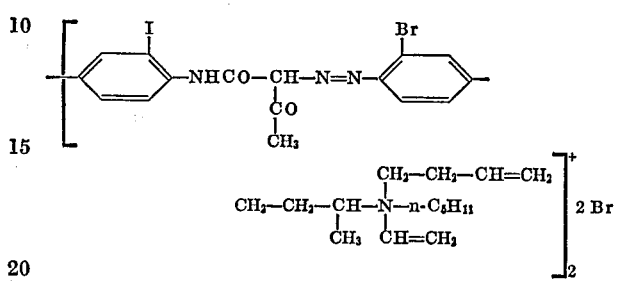

Example 106

When a procedure similar to that described in Example 25, part A, is followed for diazotization of N,N-di(3-hexenyl) - N - 2-hydroxyethyl-N-3-amino-5-ethylbenzyl-ammonium chloride and coupling with 2'-nitro-4'-*tert*.-butylacetoacetanilide, there is obtained the dyestuff having the formula

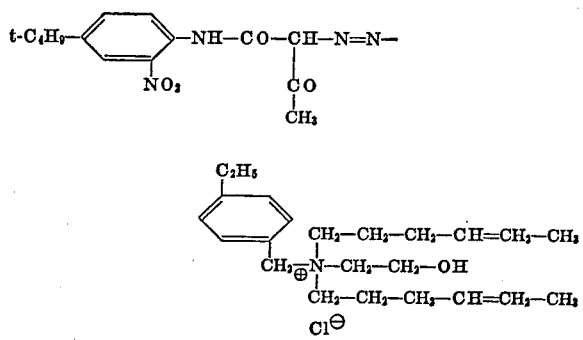

Example 107

When a procedure similar to that described in Example 25, part A, is followed for diazotization of N-methyl-N-*n* - propyl - N - 6 - (3-amino-4-butoxyphenyl)hexyl-N-*n*-hexylammonium chloride and coupling with 4'-fluoro-2'-nitroacetoacetanilide, there is obtained the dyestuff having the formula

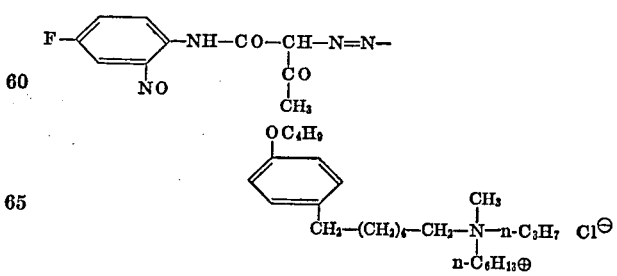

Example 108

When a procedure similar to that described in Example 26, is followed for diazotization of N-(3-amino-4-methoxybenzyl) - N - (2 - hydroxypropyl) - N,N-dimethyl-ammonium chloride and coupling with *o*-ethyl-N,N'-diacetoacet-p-phenylenediamine, there is obtained the dyestuff having the formula

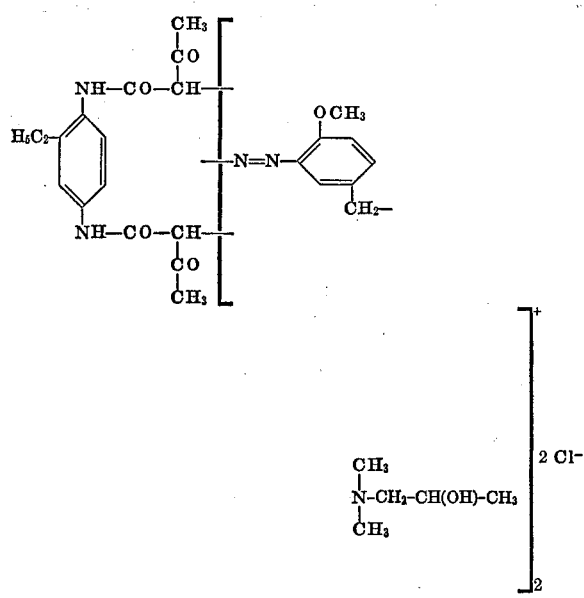

Example 109

When a procedure similar to that described in Example 26, is followed for diazotization of N-methyl-N-n-propyl-N-6-(3 - amino - 4 - butoxyphenyl)hexyl - N-n-hexyl-ammonium chloride and coupling with o-(n-butyl)-N,N'-diacetoacet-p-phenylenediamine, there is obtained the dyestuff having the formula

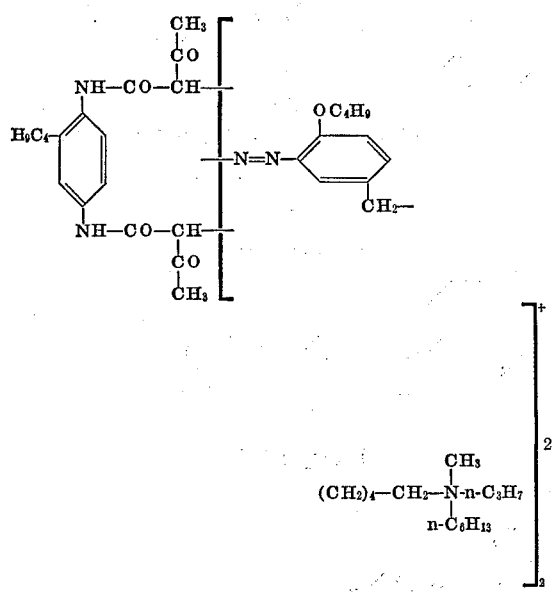

Example 110

When a procedure similar to that described in Example 26, is followed for diazotization of N,N-di-n-propyl-N-(3 - amino - 4 - methoxybenzyl) - N - ] - methyl-2-(p-nitrobenzamido)ethylammonium chloride and coupling with o-bromo-N,N'-diacetoacet - p - phenylenediamine, there is obtained the dyestuff having the formula

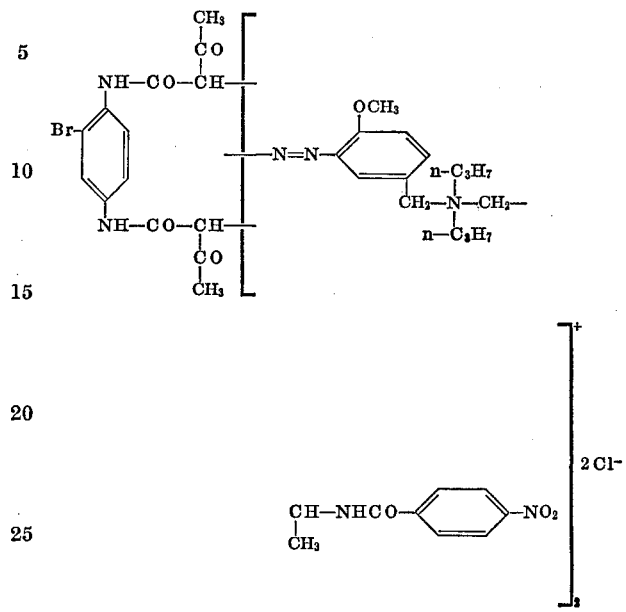

Hydrolysis of the p-nitrobenzamido moieties in the above-shown product according to the procedure described in Example 25, part B, yields the corresponding di(—NH$_2$) substituted compound.

Example 111

When a procedure similar to that described in Example 27, is followed for diazotization of 1-ethyl-4-propionyl-1-(4 - aminophenylcarbamylmethyl)piperazinium chloride and coupling with 3-hydroxy-7-bromo-5'-chloro-2',4-dimethoxy-2-naphthanilide, there is obtained the dyestuff having the formula

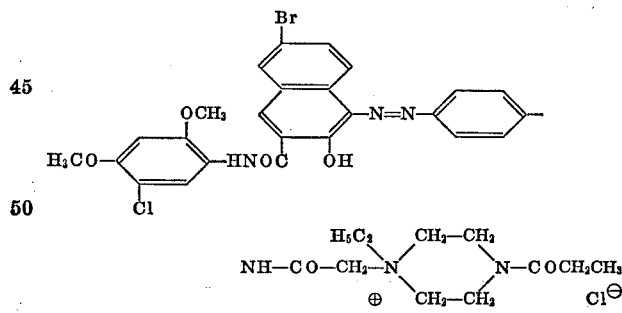

Hydrolysis of the propionamido moieties in the above-shown product according to the procedure described in Example 25, part B, yields the corresponding —NH substituted compound.

In addition to the dyestuffs shown in the foregoing Examples, the following aromatic azo quaternary ammonium dyestuffs are obtained by following the procedures of the instant invention for the coupling of the novel quaternary ammonium intermediates disclosed herein with a dyestuff residue.

Example 112

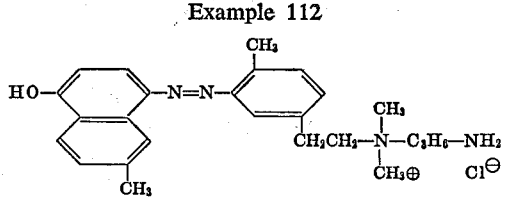

Example 113
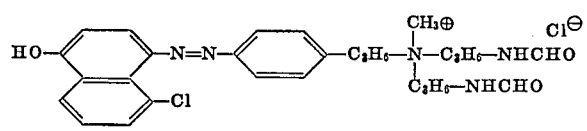
Example 114
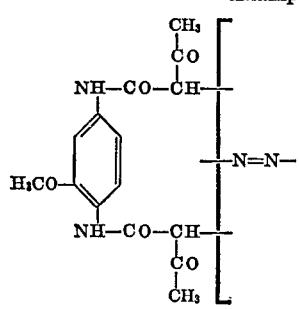
Example 115
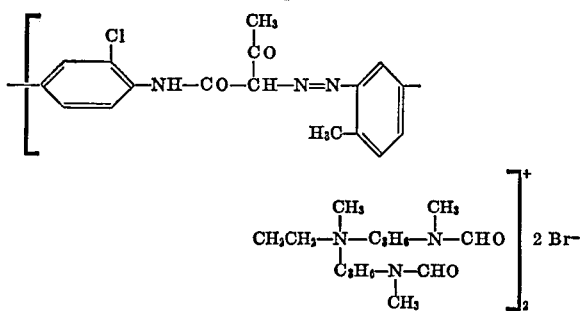
Example 116
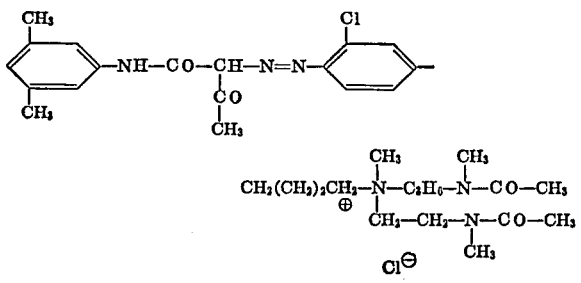
Example 117
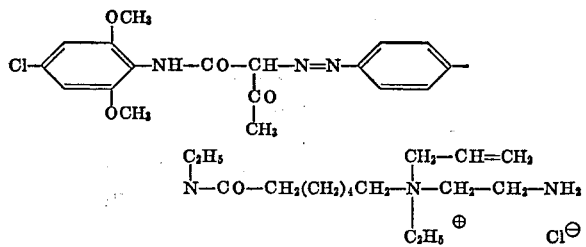
Example 118
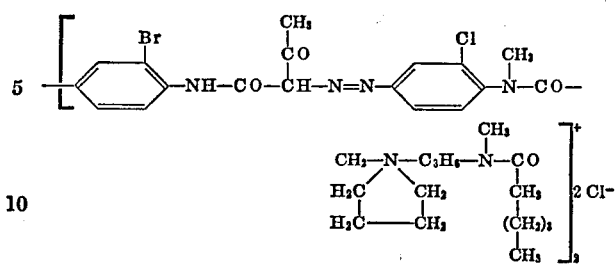
Example 119
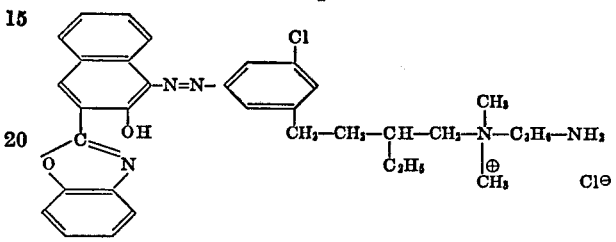
Example 120
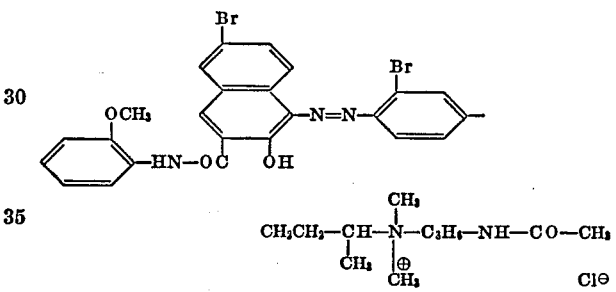
Example 121
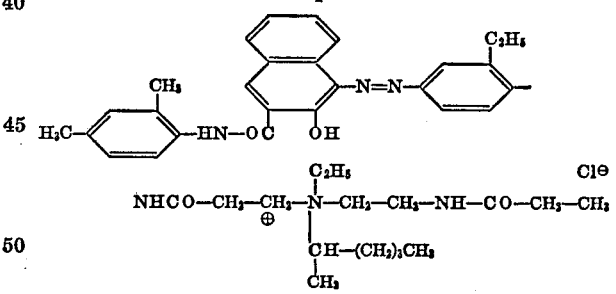
Example 122
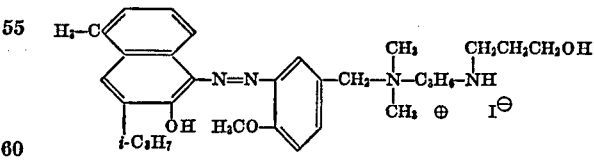
Example 123
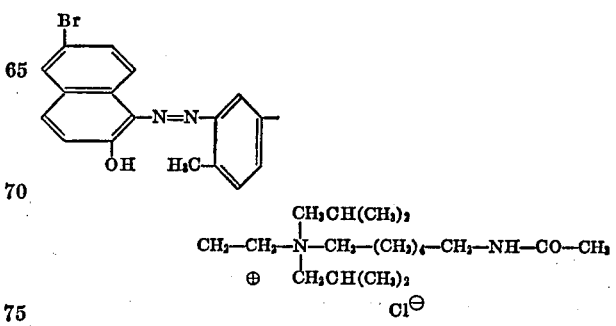

Example 124
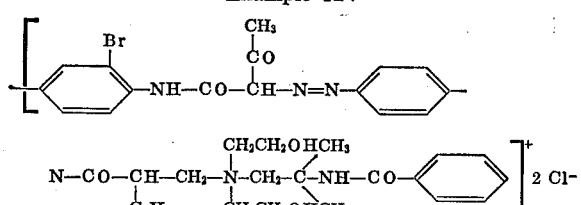
Example 125
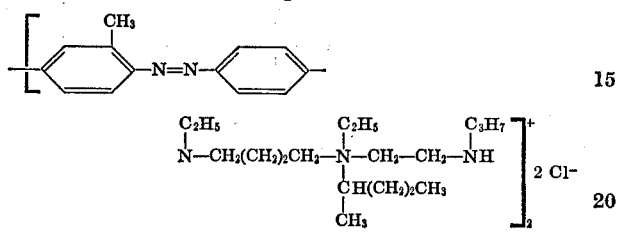
Example 126
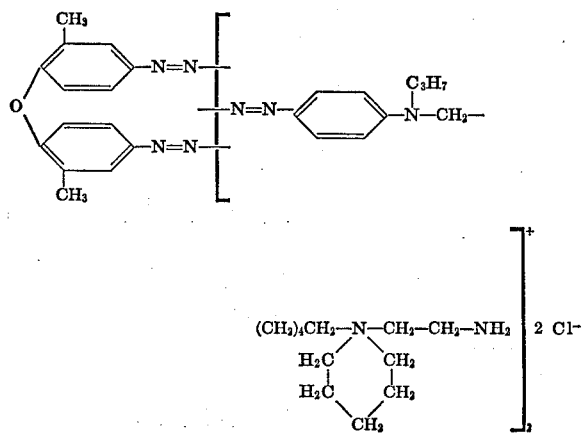
Example 127
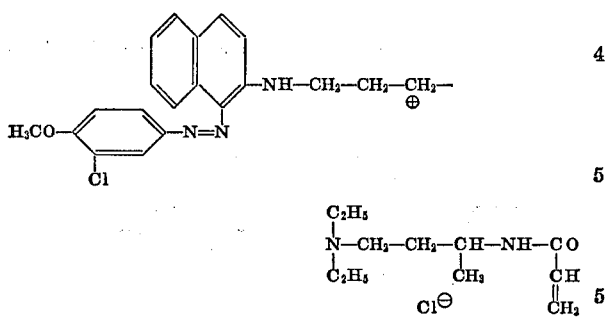
Example 128
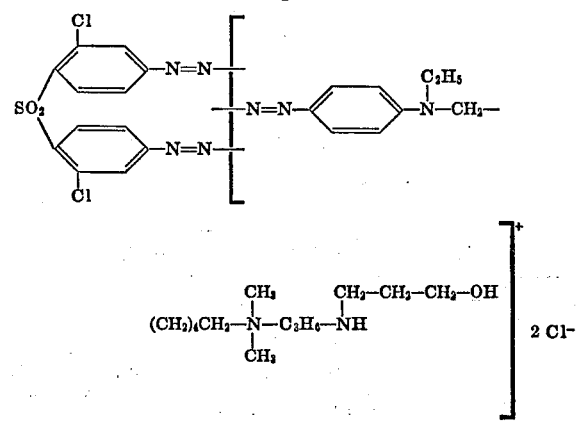
Example 129
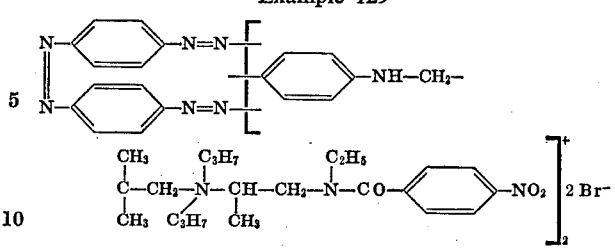
Example 130
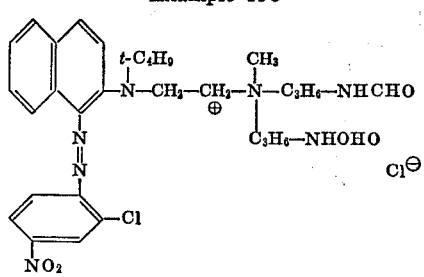
Example 131
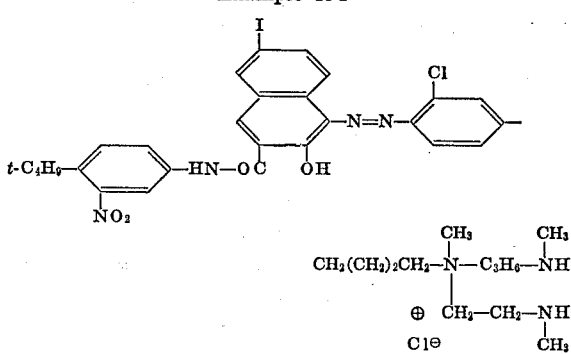
Example 132
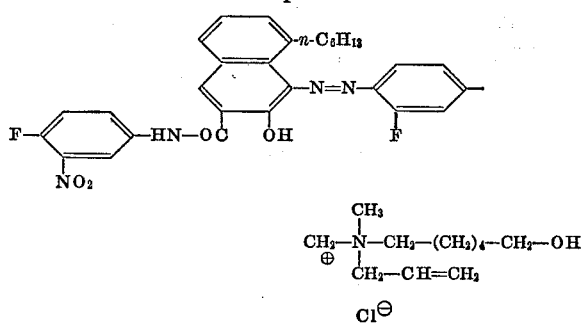
Example 133
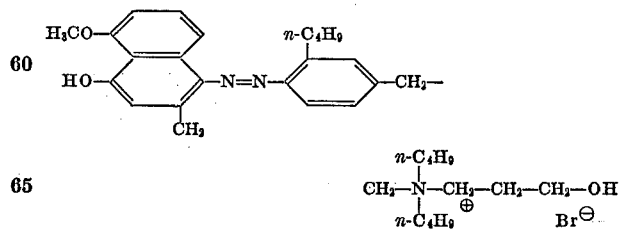
Example 134
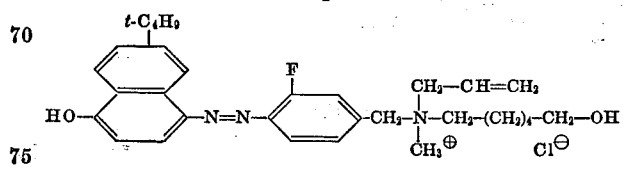

75
Example 135
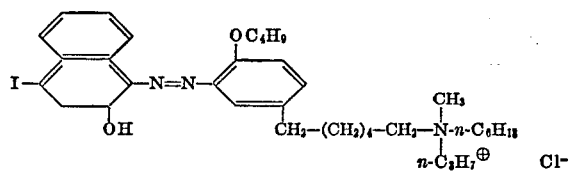
Example 136
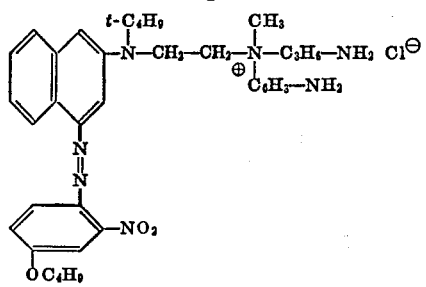
Example 137
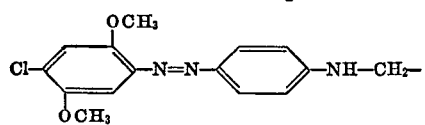
Example 138
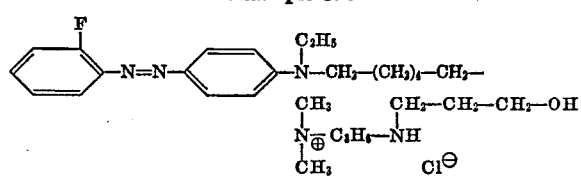
Example 139
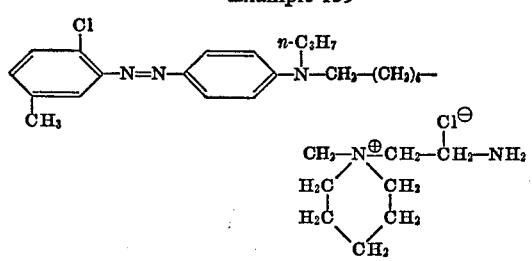
Example 140
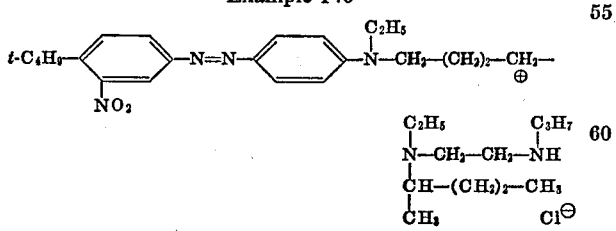
Example 141
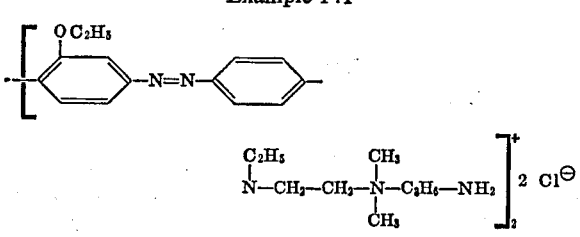
76
Example 142
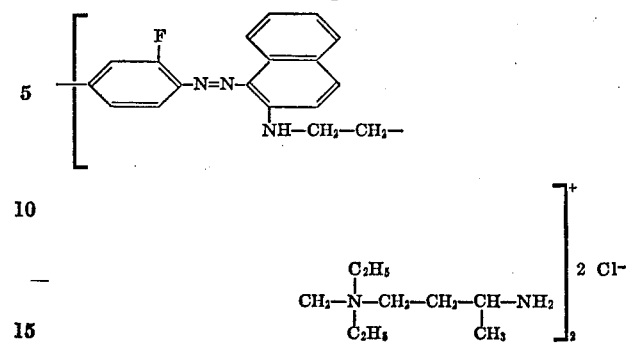
Example 143
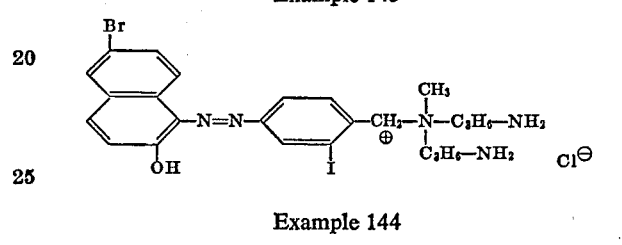
Example 144
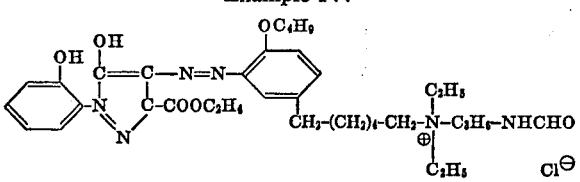
Example 145
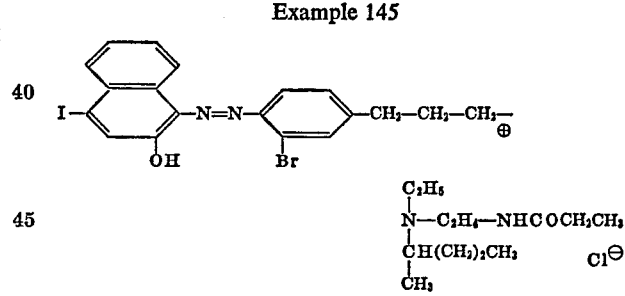
Example 146
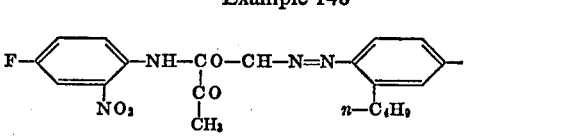
Example 147
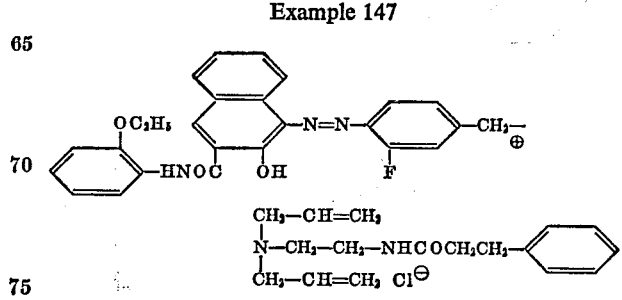

Example 148

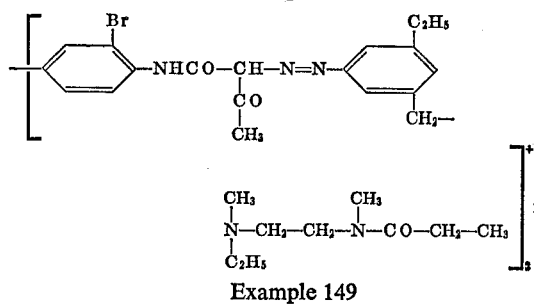

Example 149

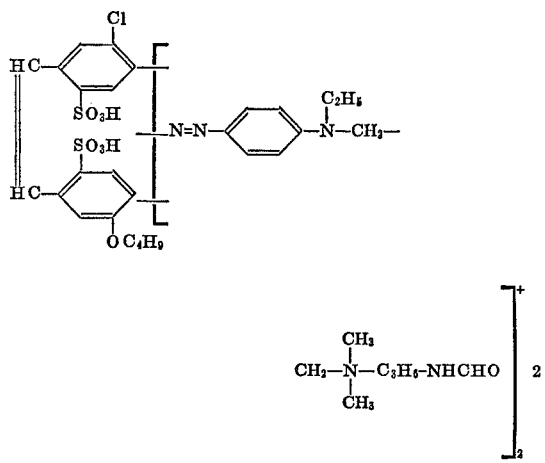

Example 150

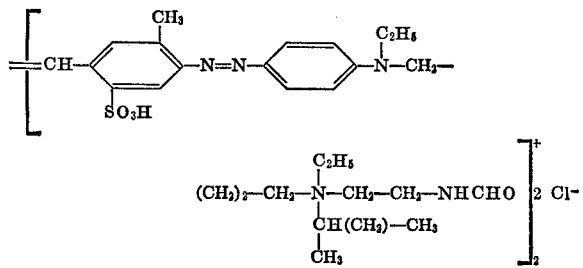

Example 151

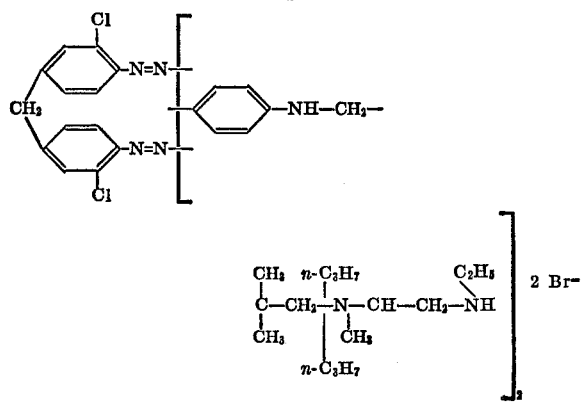

Example 152

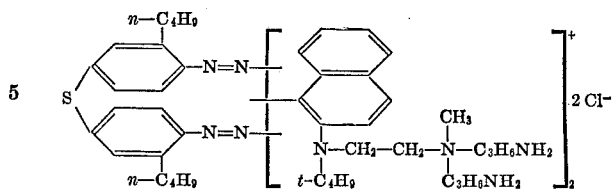

We claim:
1. A quaternary ammonium salt of the formula

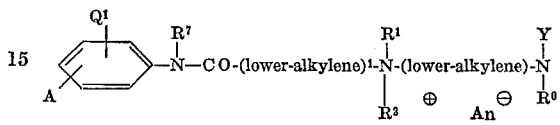

wherein:
A is nitro or amino;
$Q^1$ is hydrogen, lower-alkyl, lower-alkoxy or halogen;
$R^0$ is hydrogen, lower-alkyl or hydroxy-lower-alkyl;
$R^1$ is lower-alkyl, lower-alkenyl or hydroxy-lower-alkyl;
$R^2$ is lower-alkyl, lower-alkenyl, hydroxy-lower-alkyl or-(lower-alkylene)-$NR^0Y$; or
$R^1$ and $R^2$ together with the nitrogen atom are pyrrolidino, piperidino or 4-lower-alkanoyl piperazino;
$R^7$ is hydrogen or lower-alkyl;
Y is hydrogen or

wherein R is hydrogen, lower-alkyl, lower-alkenyl, phenyl or phenyl-lower-alkyl; and
An is an anion selected from the class consisting of halides, hydroxides, alkanoates, nitrate, phosphate, alkylsulfonates and arylsulfonates.

2. A quaternary ammonium salt according to Claim 1 wherein A is 4-amino; (lower-alkylene) is 1,3-propylene; (lower-alkylene)$^1$ is methylene; $Q^1$, $R^0$, and $R^7$ are each hydrogen; $R^1$ and $R^2$ are each methyl and Y is

wherein R is hydrogen.

References Cited
UNITED STATES PATENTS
3,268,577  8/1966  Hay _____ 260—562 N A
3,542,850  11/1970  Jansen et al. ____ 260—562 N X
3,631,105  12/1971  Bell et al. _____ 260—562 N X LEON ZITVER, Primary Examiner
G. A. SCHWARTZ, Assistant Examiner U.S. Cl. X.R.

106—23, 288, 308 Q; 260—157, 154, 155, 156, 157, 158, 160, 162, 163, 166, 167, 168, 169, 170, 172, 173, 174, 175, 176, 177, 184, 186, 187, 191, 193, 196, 197, 202, 203, 204, 205, 268 C, 293.77, 3.4.5, 558 A, 559 A, 326.85, 567.6 M, 562 N

UNITED STATES PATENT AND TRADEMARK OFFICE
CERTIFICATE OF CORRECTION

PATENT NO. : 3,839,426
DATED : October 1, 1974
INVENTOR(S) : Patrick J. Jefferies and Nathan N. Crounse It is certified that error appears in the above-identified patent and that said Letters Patent are hereby corrected as shown below:

Column 1, in Formula I, "An $\oplus$" should read -- An $\ominus$ --.

Column 1, in Formula Ia, "An $\oplus$" should read -- An $\ominus$ --.

Column 3, line 45, "-CH$_2$-CH$_2$" should read -- -CH$_2$-CH$_2$- --.

Column 4, in Formula IV, "$\begin{array}{c} R^1 \\ | \\ -N- \\ | \\ R \end{array}$" should read -- $\begin{array}{c} R^1 \\ | \\ -N- \\ | \\ R^2 \end{array}$ --, and "(lower alkylene)" should read -- (lower-alkylene) --.

Column 4, in Formula V, "mAn" should read -- m An$^-$ --.

Column 4, in Formula VI, "$\text{N}\begin{array}{c} \text{CH}_2\text{---CH}_2 \\ \text{CH}_3\text{---CH}_2 \end{array}\text{NH}$" should read -- $\text{N}\begin{array}{c} \text{CH}_2\text{---CH}_2 \\ \text{CH}_2\text{---CH}_2 \end{array}\text{NH}$ --.

Column 5, line 3, a comma should be inserted after -- acid --.

Column 5, line 53, "dyestucs" should read -- dyestuffs --.

UNITED STATES PATENT AND TRADEMARK OFFICE
CERTIFICATE OF CORRECTION

PATENT NO. : 3,839,426
DATED : October 1, 1974
INVENTOR(S) : Patrick J. Jefferies and Nathan N. Crounse It is certified that error appears in the above—identified patent and that said Letters Patent are hereby corrected as shown below:

Column 5, line 55, "akyl" should read -- alkyl --.

Column 6, first formula, "$R_3$" should read -- $R^3$ --.

Column 6, line 41, "reaction" should read -- reactions --.

Column 6, in Formula VII, "  " should read -- 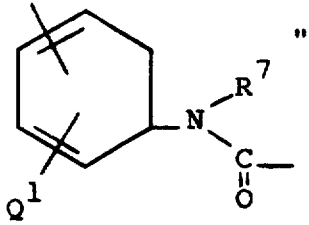 --.

Column 6, line 74, "in" should read -- an --.

Column 7, right-hand formula between lines 12-17, 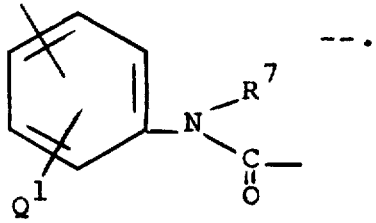

UNITED STATES PATENT AND TRADEMARK OFFICE
CERTIFICATE OF CORRECTION

PATENT NO. : 3,839,426
DATED : October 1, 1974
INVENTOR(S) : Patrick J. Jefferies and Nathan N. Crounse It is certified that error appears in the above-identified patent and that said Letters Patent are hereby corrected as shown below:

Column 8, lines 55-58, left-hand formula,

" 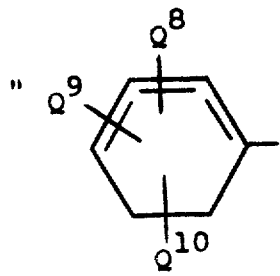   "   should read --  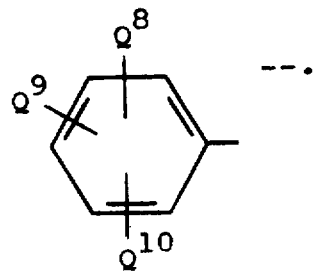  --.

Column 8, right-hand formula between lines 62 and 65,

" 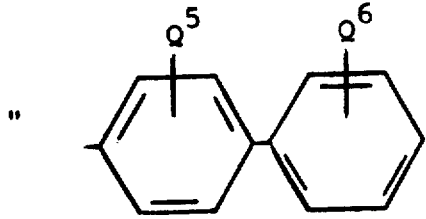   "   should read --  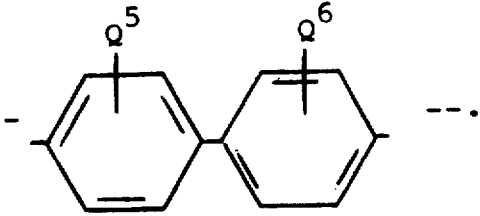  --.

Column 8, line 75, "(" should be deleted.

Column 9, line 5, "residues" should read -- resides --.

UNITED STATES PATENT AND TRADEMARK OFFICE
CERTIFICATE OF CORRECTION

PATENT NO. : 3,839,426

DATED : October 1, 1974

INVENTOR(S) : Patrick J. Jefferies and Nathan N. Crounse

It is certified that error appears in the above-identified patent and that said Letters Patent are hereby corrected as shown below:

Column 9, in Formula IX, "  " should read

-- 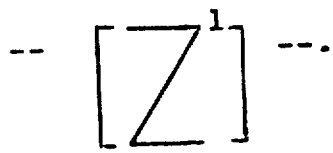 --.

Column 9, line 40, in the left-hand formula,

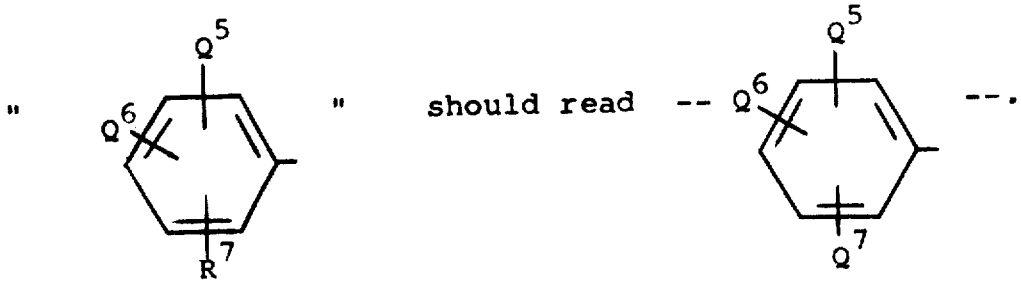

Column 10, in Formula X, "(lower-alkylene)$^2$" should read -- (lower-alkylene)$^1$ --.

Column 10, in Formula XI, "H-T$^2$-(lower-alkylene)$_1$" should read -- H-Y$^2$-(lower-alkylene)$^1$ --.

Column 10, line 25, "Anfi" should read -- An --.

Column 10, lines 26-27, "porportion" should read -- proportion --.

UNITED STATES PATENT AND TRADEMARK OFFICE
CERTIFICATE OF CORRECTION

PATENT NO. : 3,839,426
DATED : October 1, 1974
INVENTOR(S) : Patrick J. Jefferies and Nathan N. Crounse It is certified that error appears in the above-identified patent and that said Letters Patent are hereby corrected as shown below:

Column 10, in Formula XII, "$H_2N-T^3$" should read -- $H_2N-Y^3$ --.

Column 10, line 56, "diazoniuum" should read -- diazonium --.

Column 11, line 22, --also-- should be inserted after -- may --.

Column 11, line 51, "R" should read -- $R^7$ --.

Column 11, line 63, "formly" should read -- formyl --.

Column 12, line 7, "ether" should read -- either --.

Column 12, line 39, "siutable" should read -- suitable --.

Column 13, in the formula between lines 15-20, $$\begin{matrix} R^1 \\ | \\ N \\ | \\ R \end{matrix} \text{ "should read --- } \begin{matrix} R^1 \\ | \\ N \\ | \\ R^2 \end{matrix} \text{ ---.}$$

Column 13, line 34, "alkanyl" should read -- alkanoyl --.

Column 14, line 12, "of" should read -- or --.

Column 14, line 14, "hydroxylower" should read -- hydroxy-lower --.

Column 14, line 22, "substitute" should read -- substituted --.

UNITED STATES PATENT AND TRADEMARK OFFICE
CERTIFICATE OF CORRECTION

PATENT NO. : 3,839,426
DATED : October 1, 1974
INVENTOR(S) : Patrick J. Jefferies and Nathan N. Crounse It is certified that error appears in the above-identified patent and that said Letters Patent are hereby corrected as shown below:

Column 14, line 70, "amide" should read -- media --.

Column 14, line 72, "form" should read -- from --.

Column 15, in the formula between lines 16 and 20, "$F^0$" should read -- $R^0$ --.

Column 15, line 25, "pyrolidino" should read -- pyrrolidino --.

Column 15, line 38, "$N-R^7-$" should read -- $N-R^7-N-$ --.

Column 16, lines 4-5, "acrylamino" should read -- acylamino --.

Column 16, line 35, "analysis" should read -- analyses --.

Column 16, line 50, "bsi" should read -- bis --.

Column 17, lines 18-19, "3-pyrolidinopropylamine" should read -- 3-pyrrolidinopropylamine --.

Column 18, line 27, "formamidopropylammonim" should read -- formamidopropylammonium --.

Column 20, line 17, a hyphen should be inserted after -- amino --.

Column 22, line 12, "polypiperazinium" should read -- propylpiperazinium --.

UNITED STATES PATENT AND TRADEMARK OFFICE
CERTIFICATE OF CORRECTION

PATENT NO. : 3,839,426
DATED : October 1, 1974
INVENTOR(S) : Patrick J. Jefferies and Nathan N. Crounse It is certified that error appears in the above-identified patent and that said Letters Patent are hereby corrected as shown below:

Column 22, line 32, "-N,N' " should read -- -N,N --.

Column 22, line 42, "N-[2-N-ethyl" should read -- N-[2-(N-ethyl --.

Column 22, line 45, "N-(2-(4-" should read -- N-2-(4- --.

Column 23, line 29, "-N3-" should read -- -N-3- --.

Column 26, lines 21-22, "dimethylaminonium" should read -- dimethylammonium --.

Signed and Sealed this

Twentieth Day of June 1978

[SEAL]

Attest:

RUTH C. MASON
Attesting Officer

DONALD W. BANNER
Commissioner of Patents and Trademarks